United States Patent [19]

Kaufman et al.

[11] 4,124,889
[45] Nov. 7, 1978

[54] DISTRIBUTED INPUT/OUTPUT CONTROLLER SYSTEM

[75] Inventors: Phillip A. Kaufman, Irvine; Jerry R. Washburn, Alhambra, both of Calif.

[73] Assignee: Computer Automation, Inc., Irvine, Calif.

[21] Appl. No.: 644,412

[22] Filed: Dec. 24, 1975

[51] Int. Cl.² .................. G06F 3/02; G06F 15/16
[52] U.S. Cl. ................................................. 364/200
[58] Field of Search .................. 340/172.5; 445/1; 364/200 MS File, 900 MS File

[56] References Cited

U.S. PATENT DOCUMENTS

| | | | |
|---|---|---|---|
| 3,665,415 | 5/1972 | Beard et al. | 340/172.5 |
| 3,710,328 | 1/1973 | Hunter et al. | 340/172.5 |
| 3,742,457 | 6/1973 | Calle et al. | 364/200 |
| 3,810,105 | 5/1974 | England | 340/172.5 |
| 3,902,162 | 8/1975 | Parkinson et al. | 340/172.5 |
| 3,905,025 | 9/1975 | Davis et al. | 340/172.5 |
| 4,017,839 | 4/1977 | Calle et al. | 364/200 |

*Primary Examiner*—Mark E. Nusbaum
*Attorney, Agent, or Firm*—Reed C. Lawlor

[57] ABSTRACT

A distributed input/output system is disclosed for controlling numerous peripheral devices and the transfer of data signals and control signals between those devices and a general purpose digital computer. The control system described includes a multiplexer which can accommodate as many as eight input/output devices under the control of separate programmable microcoded peripheral-unit controllers. Each controller is adapted to be located at or on an individual peripheral device and each is connected to the multiplexer by an identical ribbon cable that is employed to carry both signals and power. Each controller employs a substantially identical microengine, that is, a microcoded processor, currently of five integrated circuit chips. The peripheral-unit controllers may be configured somewhat differently depending upon whether the peripheral device utilizes data signals in parallel or in series. Data may be transferred directly between a computer memory unit and the peripheral devices without requiring the use of any computer working registers and without requiring subroutines to preserve an ongoing main program. Each peripheral-device controller can issue interrupt signals which are processed by the computer on a priority basis when they occur simultaneously. Some microengines employ two sets of programmed microcodes and each set is selectable by a switch, such as a wire jumper, for controlling either of two different kinds of devices.

25 Claims, 42 Drawing Figures

Fig. 35.
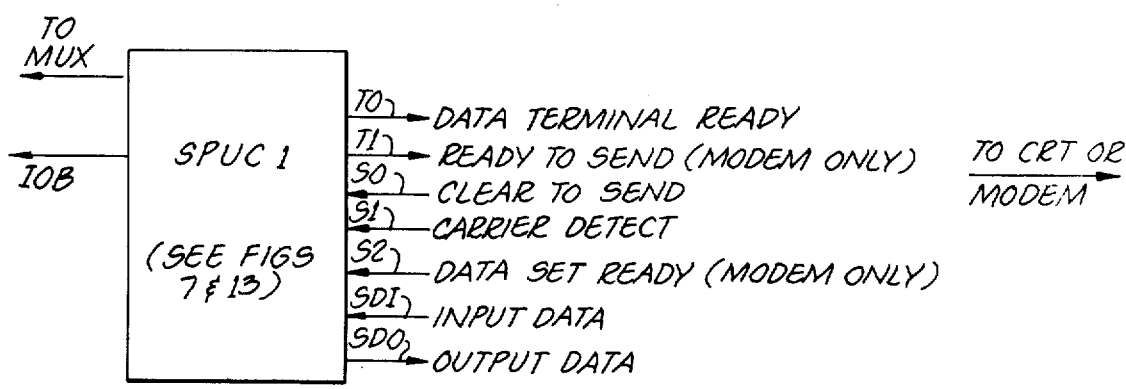
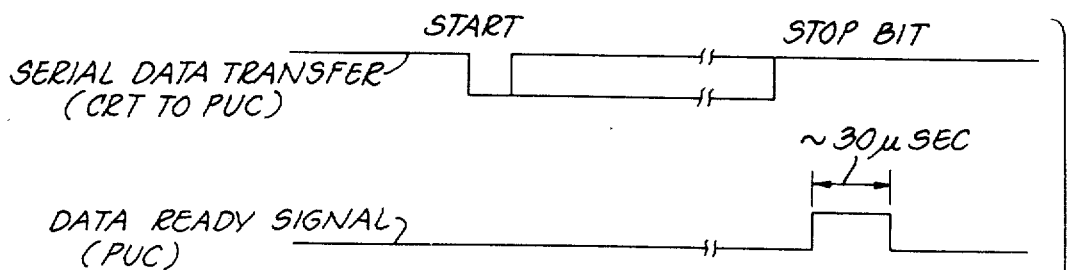
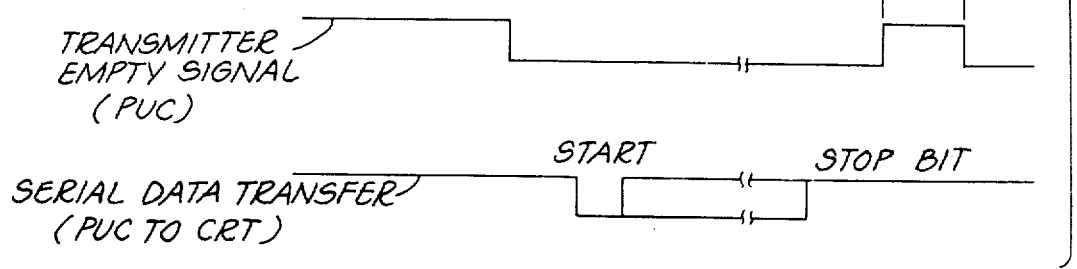
Fig. 38.

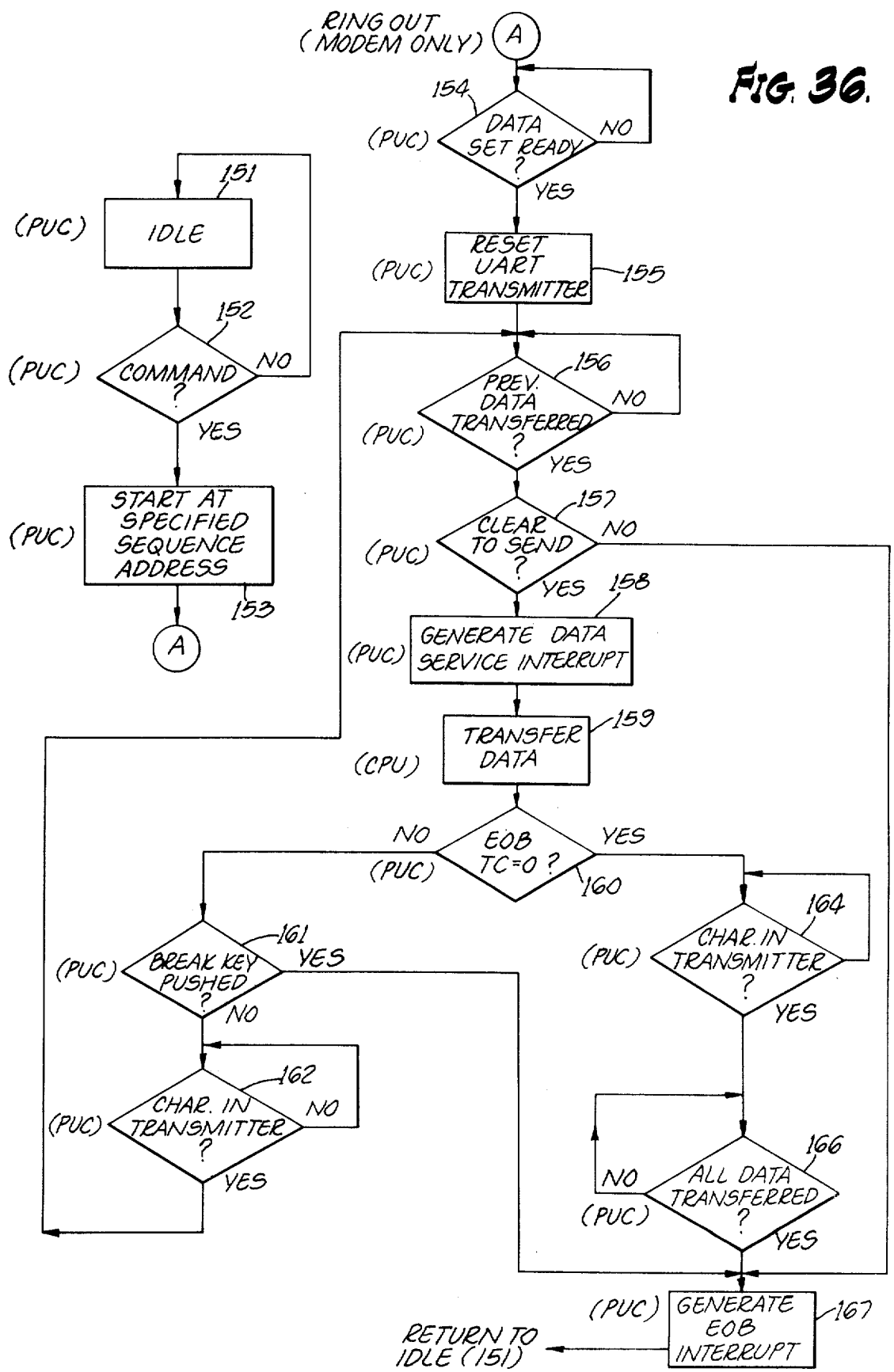

DISTRIBUTED INPUT/OUTPUT CONTROLLER SYSTEM

CROSS REFERENCES TO RELATED APPLICATIONS:

Patent Application Ser. No. 644,341 docket No. CAI-6, filed on Dec. 24, 1975 in the name of JERRY R. WASHBURN, for a PERIPHERAL-UNIT CONTROLLER APPARATUS, and patent application Ser. No. 647,762, Docket No. CAI-5A, filed on Jan. 9, 1976, discloses related subject matter.

TABLE OF CONTENTS

ABSTRACT OF THE DISCLOSURE
CROSS REFERENCES TO RELATED APPLICATIONS
BACKGROUND OF THE INVENTION
PRIOR ART
SUMMARY OF THE INVENTION
BRIEF DESCRIPTION OF THE FIGURES
GENERAL DESCRIPTION
    TABLE I
    TABLE II
        Explanation of Table II
    TABLE III
GENERAL DESCRIPTION OF THE MULTIPLEXER MUX
GENERAL DESCRIPTION OF PERIPHERAL-UNIT CONTROLLER PUC
THE MICROENGINE UNIT
    TABLE IV
    TABLE V
DETAILED DESCRIPTION OF MULTIPLEXER MUX
    Interrupt Logic
DETAILED DESCRIPTION OF THE PARALLEL-PERIPHERAL-UNIT CONTROLLER
DETAILED DESCRIPTION OF THE GENERAL PURPOSE PERIPHERAL UNIT CONTROLLER
DETAILED DESCRIPTION OF THE SERIAL-PERIPHERAL-UNIT CONTROLLER (VOLTAGE MODE)
DETAILED DESCRIPTION OF THE SERIAL-PERIPHERAL-UNIT CONTROLLER (CURRENT MODE)
THE INPUT/OUTPUT BUS IOB
    TABLE VI
        IOB Signals and Signal Protocol
        Data Lines
        Clock Signals
        Interrupt Lines
        Control Lines
DISTRIBUTED INPUT/OUTPUT SYSTEM OPERATION
TYPICAL OPERATION IN AN OUTPUT DATA TRANSFER
TYPICAL OPERATION IN AN INPUT DATA TRANSFER
OPERATION OF THE DISTRIBUTED INPUT/OUTPUT SYSTEM DIOS WITH A STANDARD LINE PRINTER
    Typical Firmware Program
    TABLE VII
OPERATION OF THE DISTRIBUTED INPUT/OUTPUT SYSTEM DIOS WITH A STANDARD CARD READER
OPERATION OF THE DISTRIBUTED INPUT/OUTPUT SYSTEM DIOS WITH A STANDARD HIGH-SPEED PAPER-TAPE READER
OPERATION OF THE DISTRIBUTED INPUT/OUTPUT SYSTEM DIOS WITH A STANDARD HIGH-SPEED PAPER-TAPE PUNCH
OPERATION OF THE DISTRIBUTED INPUT/OUTPUT SYSTEM DIOS WITH A STANDARD TELETYPEWRITER UNIT
OPERATION OF THE DISTRIBUTED INPUT/OUTPUT SYSTEM DIOS WITH A STANDARD CATHODE-RAY-TUBE-TERMINAL UNIT CRT OR MODEM
OPERATION OF MULTIPLE DISTRIBUTED INPUT/OUTPUT SYSTEMS
SUMMARY
GENERAL REMARKS

BACKGROUND OF THE INVENTION

This invention relates generally to data processing systems and particularly to controllers which provide means for interconnecting peripheral units, also commonly referred to as input/output devices, and a general purpose digital computer. More specifically, this invention relates to a system of distributed peripheral-unit controllers, each of which is microprogrammed to control the transfer of data signals and the operations of a specific peripheral unit. Each controller is electrically interposed between that specific peripheral unit and a common multiplexer and is located near or at the corresponding specific peripheral unit to which it is connected.

PRIOR ART

Peripheral-unit controllers commonly constitute addressable control units to steer data signals and control signals to and from a selected peripheral unit; they transmit interrupt signals to the computer to indicate that a device has completed a sequence or is ready for the transfer of signals; they provide buffering of the information flowing between the peripheral device and the computer; and they provide control signal decoding to permit selection of the proper command signal for control of a specific operation.

Heretofore, such controllers have been physically integrated with the digital computer electronics and have been connected to the devices by lengthy cables which have required special terminations to compensate for the reactive effects of such long cables. Such special terminations add substantially to the design and manufacturing costs of prior art computer input/output electronics.

Furthermore, some kinds of prior art input/output device controllers have been typically configured to be dedicated to a particular device and could not thereafter be utilized for control of another type of device, and other kinds of controllers could be so utilized only after complex and costly reconfiguration.

Prior art device-controllers are generally sources of inefficiency which substantially raises overhead of computer operations. By way of example, such inefficiency results from a lack of independent control capability in the device controller. The prior central processor unit of the computer must therefore be actively involved in every step of a process which involves the input/output device. The prior central processor unit must initiate and monitor the completion of each transfer of a data term between the computer and the input/output device, and it must also control or actually perform every intermediate step involving transfer of a non-data term between the computer and the input/output device. In this context, a term means any complete form of information regardless of the number of bits and any non-data term that is transferred from the computer to the device is referred to as a control signal and any non-data term that is transferred from the device to the computer, is referred to as a status signal.

One way of reducing the complexity and cost of the electronics associated with peripheral-device controllers used to control numerous peripheral devices, is to combine all the common control functions in one controller and then share the controller on a time-multiplexed basis among the numerous devices. Such a combined controller is normally referred to as a multiplexer. Even where a multiplexer is used, some additional device-control functions may still be allocated to dedicated input/output adapter units of simple configuration, each adapter unit being interposed between the input/output device and the multiplexer. However, even such multiplexer-adapter unit combinations of the prior art are extremely complex and costly and require almost constant activity in the central processor unit. Of such prior art combinations of a multiplexer and a plurality of peripheral device adapter units, none can be found that provides substantially identical adapter units that utilize both software and firmware programming to control data communications between a plurality of peripheral devices and a digital computer. Nor can any such prior art combinations be found that provide adapter units located at or near the peripheral devices to which they are connected. Nor are there any such prior art combinations in which a data signal is transmitted by a single device simultaneously over separate cables to all the peripheral devices to which the adapter units are connected. And nowhere among such prior art combinations are there any that utilize cables that separately interconnect the respective adapter units and the multiplexer and on which power is transferred from the multiplexer to the adapter units.

SUMMARY OF THE INVENTION

Deficiencies of the prior art, such as special termination requirements, controller inflexibilities, operating inefficiencies, and high cost and complexity, are substantially reduced or eliminated in this invention, by means of a plurality of simple, substantially identical, microcoded peripheral-unit controllers, each connected to a common multiplexer unit and each located near or adjacent the peripheral device to which it is connected. Special termination requirements are obviated in this invention since cables having lengths of two feet or less may be employed to interconnect each controller and the adjacent peripheral device to which it is allocated. Such short cables do not produce capacitive, or inductive, effects sufficiently severe to require compensation by different special terminations for each device.

Controller flexibility is provided in this invention by means of microcoded read-only-memory units in which may be stored as much as twice the number of instructions employed for the control of many standard peripheral devices. Thus, for some standard peripheral devices, a programmed or manually operated switch, or a jumper wire, is used to select either of two sets of microcoded instructions for the control of two different peripheral devices.

High cost and complexity of prior art input/output control systems are substantially reduced or eliminated in this invention by means of peripheral-unit controllers, each of which employs a substantially identical microengine unit which utilizes a microprogrammed subunit and inexpensive, commercially available, integrated-circuit devices. Each controller is connected to an input/output device and the transfer of data signals, controller signals, and status signals between the device and the computer unit is accomplished in accordance with sequences of intructions stored in the microprogrammed subunit and initiated by the programmed computer unit.

Furthermore, all of the previously discussed deficiencies of prior art input/output control systems that employ a combination of a multiplexer and a plurality of adapter or control units, are remedied in this invention.

Accordingly, one object of this invention is to overcome, or to materially reduce, the foregoing and other disadvantages of the prior art.

Another object of this invention is to provide a peripheral device distribution and control system comprising a plurality of simple and low cost distributed controllers and a common multiplexer unit for channeling data signals, status signals, and control signals between the peripheral devices and the computer.

Another object of this invention is to provide a peripheral-device control system which obviates the need for differently terminated interconnection cables between a computer and the respective peripheral devices.

Another object of this invention is to provide a peripheral-unit interface system for connecting a plurality of peripheral devices to a computer, the peripheral-unit interface system having a plurality of low cost interface cables, each such cable connecting a peripheral-unit controller to a common multiplexer.

Another object of this invention is to provide a distributed input/output system having a multiplexer and a plurality of controller units located at or near a corresponding plurality of peripheral units, wherein data signals, status signals, clock signals, control signals, and power, are transferred between the multiplexer and each of the controller units utilizing a simple and low cost circuit configuration.

It is another object of this invention to provide a distributed input/output system having device controllers that may be used with more than one of a plurality of types of peripheral devices, such as a teletypewriter unit, a card reader, a cathode-ray-tube terminal unit, a line printer, a paper-tape punch, a paper-tape reader, and numerous special devices, some of the controllers requiring no circuit reconfiguration for use with more than one type of device.

Another object of this invention is to provide a peripheral device management system in which a device controller, allocated to a particular peripheral device that is being operated in conjunction with a computer, controls the peripheral device and manages a sequence of device operations without requiring the central processor unit of the computer to monitor the transfer of each term of data, control and status information to and from the peripheral device.

Still another object of this invention is to provide a distributed input/output system in which there are easily programmed peripheral-device controllers allocated to the control of signal transfer between a general purpose digital computer and peripheral devices wherein each such controller is located adjacent a corresponding peripheral device.

These and other objects, and features and advantages of the invention will be readily apparent from the consideration of the following detailed description of the annexed drawings in which:

BRIEF DESCRIPTION OF THE FIGURES

FIG. 10 is a diagram indicating the manner in which

FIGS. 10A and 10B together comprise a detailed block diagram of the multiplexer unit;

FIG. 35 is a simplified interface diagram indicating the connections between the distributed input/output system and a standard cathode-ray-tube terminal unit or a standard modem;

FIG. 36 is a flow diagram indicating output-data transfer operation of the distributed input/output system in conjunction with a standard cathode-ray-tube terminal unit or a modem;

FIG. 38 is a timing diagram of signals involved in input-data and output-data transfers between the distributed input/output system and a standard cathode-ray-tube terminal unit;

GENERAL DESCRIPTION

Figure 1:
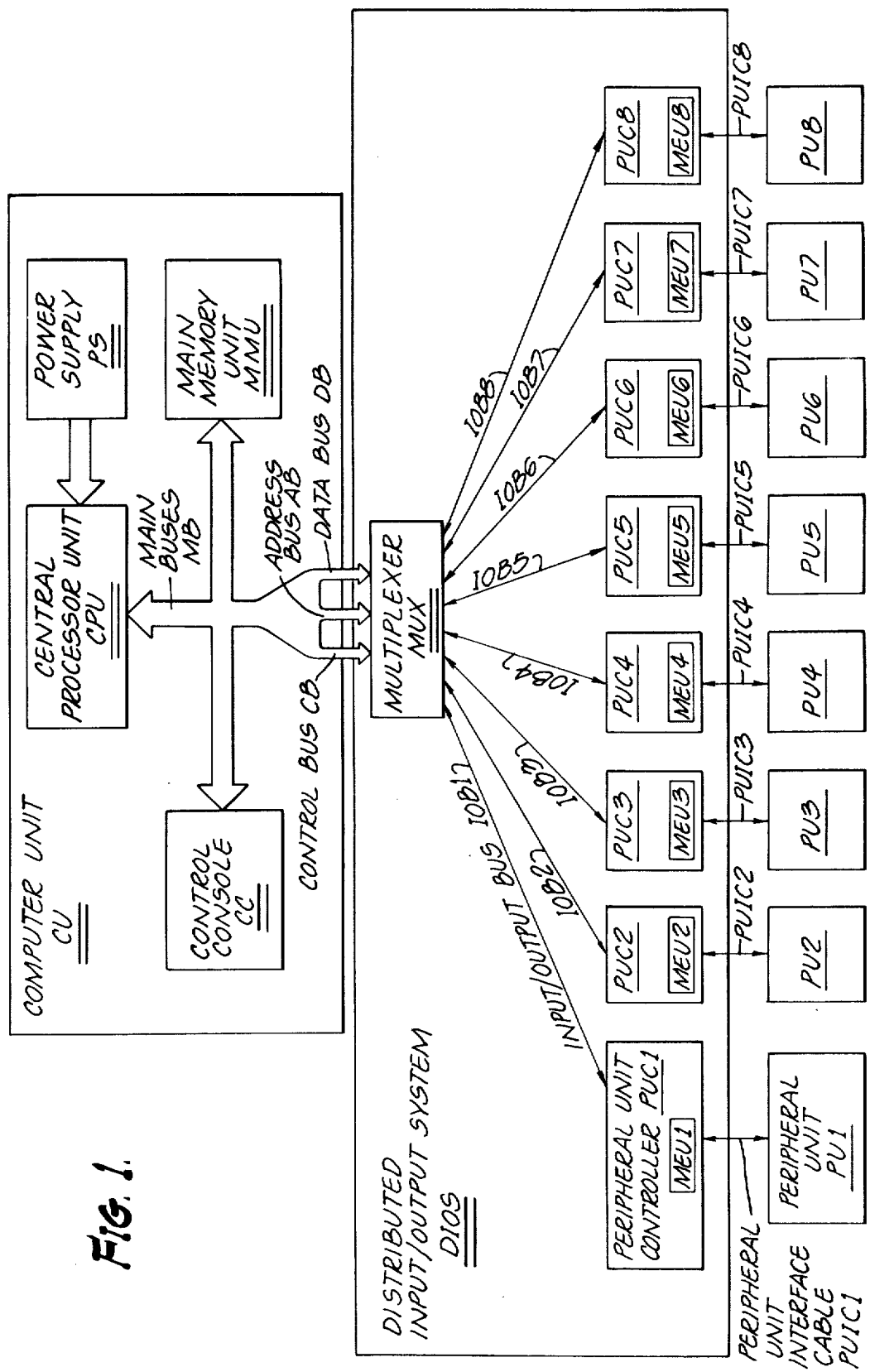
FIG. 1 is a general block diagram of the invention which is shown connected to a computer unit and to a plurality of peripheral units.

Referring now to the drawings, FIG. 1 illustrates in simplified block diagram form, the interconnection of a computer unit CU and a plurality of peripheral units PU1, . . . , PU8, by means of an improved distributed input/output system DIOS in accordance with this invention.

The computer unit CU is a general purpose binary digital computer having a central processor unit CPU, a main-memory unit MMU, a power supply PS, and a control console CC, all of which are interconnected by means of a series of buses. For purposes of explanation only, the computer unit described herein in conjunction with the invention, is assumed to have main buses MB comprising a control bus CB for the transfer of control signals, an address bus AB for the transfer of address signals, and a data bus DB for the transfer of data signals.

It will be observed that the terms "data" and "data signals" are both used throughout this description. These terms are intended to be interchangeable and to define manifestations of information that are capable of physical manipulation, such as being stored in binary form in the magnetized cells of a computer memory unit. The term "microengine" is used throughout the description to mean a firmware programmed device including means to perform sequences of control operations in response to computer unit signals. The term "microengine" refers to such a device which may also include means for making decisions dependent upon the truth value of signals such as status signals.

In this application, the term "input-data" refers to data that is being transferred from a peripheral device into or toward the computer unit and "output-data" refers to data that is being transferred out of the computer unit and into a peripheral device.

Typical peripheral units to which a computer unit is connected by the distributed input/output system DIOS are those which the computer industry generally regards as being low and medium speed peripheral devices. Included among the peripheral devices which may be operated in conjunction with a computer unit by means of the invention, are card readers, line printers, paper-tape punches, paper-tape readers, teletypewriters, cathode-ray-tube (commonly called CRTs) terminal units, and modems.

Some of these peripheral devices are simplex-mode devices in which data may flow in only one direction. The paper-tape reader, for example, is a simplex-mode device utilizing only input-data transfer. The paper tape punch, on the other hand, is a simplex-mode device that utilizes only output-data transfer.

Other peripheral devices to which a computer may be connected are duplex-mode devices, namely, devices which utilize both input-data and output-data transfers. Duplexmode devices in which data may be transferred in both directions (also called "bidirectional" in this description), but not simultaneousl, are known as half-duplex-mode devices. Duplex-mode devices in which data may be transferred in both directions simultaneously are known as full-duplex-mode devices. All of the duplex-mode devices which are shown connected to a computer unit CU by means of the embodiment of the invention disclosed herein, are half-duplex-mode devices. Teletypewriter units and the modems are examples of duplex-mode devices which may be connected to a computer unit CU by means of the distributed input/output system (DIOS).

Peripheral devices may be either parallel type or serial type devices. Those devices which are parallel type, utilize simultaneous data transfer over a plurality of data transfer lines. By way of example, in the embodiment of the invention disclosed herein, data is transferred in the form of bits, that is, binary digit signals, and for parallel type devices, data is transferred eight bits at a time over eight separate lines. One bit is transferred over each line substantially simultaneously with the transfer of a bit on each of the remaining lines. On the other hand, serial type devices, which are interconnected to the computer unit by the embodiment of the invention disclosed herein, employ data transfer over only one line wherein a plurality of bits, such as eight bits, are transferred serially, that is, in a sequence.

Teletypewriter units, cathode-ray-tube terminal units and modems, are examples of devices that are of the serial type. Card readers, line printers, paper-tape punches, and paper-tape readers are examples of devices that are of the parallel type. It will be convenient to distinguish peripheral devices that utilize parallel-data transfer from those that utilize serial-data transfer since certain portions of this invention have configurations that are dependent on which type of data transfer is utilized.

As indicated in FIG. 1 the distributed input/output system DIOS is electrically interposed between the computer unit CU and a plurality of peripheral-unit controllers PUCs. The distributed input/output system DIOS comprises a multiplexer MUX which interfaces directly with the main buses of the computer unit CU, a plurality of peripheral-unit controllers PUC1, . . . , PUC8, cables interconnecting the peripheral-unit controllers PUCs with the multiplexer MUX, and cables interconnecting peripheral-unit controllers PUCs and respective peripheral devices.

In referring to a plurality of the same parts of this invention, an "s" is added to the acronym to indicate more than one such part. For example, a plurality of peripheral-unit controllers is referred to as PUCs.

The cables interconnecting the multiplexer MUX and the peripheral-unit controllers PUCs, are referred to herein as input/output buses IOB1, . . . , IOB8. The cables interconnecting the peripheral-unit controllers PUCs and the peripheral units, are referred to herein as peripheral-unit interface cables PUIC1, . . . , PUIC8.

In one embodiment of this invention, the multiplexer MUX is located in the computer unit chassis and is incorporated on a single printed-circuit-board on which are mounted up to sixteen electrical plugs, each having 16 terminals, two plugs being allocated to each of the eight peripheral-unit controllers PUCs to which the multiplexer may be connected. The multiplexer MUX is also connected to the main buses MB of the computer unit CU, by means of a series of edge terminals which form an intergral portion of the printed-circuit-board, at the time that the multiplexer printed-circuit-board is installed in the computer unit CU.

The input/output buses IOBs are each sufficiently long, e.g., 10 feet long, to permit the positioning of the peripheral-unit controllers PUCs in substantial juxtaposition with their respective peripheral units PUs. It will become readily evident, as a result of the detailed description herein, that this novel positioning of the peripheral-unit controllers PUCs provides a number of advantages over prior art systems. Because of the relative proximity of the peripheral-unit controllers PUCs and the peripheral units PUs, the peripheral-unit interface cables PUICs are each comparatively short, a feature which also results in a number of advantages that will become evident hereinafter.

The computer unit CU may be any one of a large number of commercially available general purpose digital computers. Therefore, the interrelationship between the control console CC, the central-processor unit CPU, the power supply PS and the main-memory unit MMU will not be described herein. However, since the bus nomenclature may vary from computer to computer, the functions of the address bus, data bus, and control bus in relation to the invention, are defined herein.

During input/output operations the address bus AB is used by the central-processor unit CPU to convey device-address and function-code information to peripheral devices. In this respect, as will be explained below, the address bus is utilized in this invention to select a particular multiplexer MUX and a particular peripheral-unit controller PUC for signal transfer. In the embodiment of the invention disclosed herein, up to four multiplexers may be connected to the computer unit, and each multiplexer MUX may be connected to eight peripheral-unit controllers PUCs. The address bus AB is also used to transfer a single-bit function-code, the truth value of which determines whether the signals being transferred on the data bus DB are to be treated as data signals or as control signals.

The data bus DB consists of 16 bidirectional lines upon which data signals read from locations within the main-memory unit MMU, are transferred to a peripheral unit PU and upon which data signals are transferred from a peripheral unit PU and written, or loaded, into selected addressable locations in the main-memory unit MMU. Transfer of data signals either into or out of the main-memory unit, is performed under the control of the central processor unit CPU. The data bus is also used to transfer a number of control signals between the computer unit CU and the peripheral-unit controllers PUCs and to transfer to each peripheral-unit controller PUC the original or starting address or count of a selected sequence of peripheral unit PU operations that are controlled by the peripheral-unit controller PUC to which the peripheral unit PU is connected. Data bus lines are also utilized to transfer vectored interrupt signals from the multiplexer MUX to the computer unit CU.

In this application, vectored signals are defined as signals that contain information designating an address within the main-memory unit MMU. A group of binary signals together comprise a coded word, the contents of which depend upon the respective truth values of the individual binary signals. When the binary signals comprising a particular coded word are used to designate an addressed location in the main-memory unit, the address of which corresponds to the code of that word, it is said that those signals are being "vectored" into the main-memory unit.

The control bus CB consists of 26 unidirectional lines upon some of which signals are transferred between the computer unit CU and the multiplexer MUX for the control of operations in the multiplexer MUX during data transfers and interrupt-signal operations.

Interrupt signals indicate to the computer unit CU that a peripheral device is ready for servicing or has completed an operation.

The purpose of signals relevant to the invention and applied to the respective lines of the main buses, are described in greater detail below in conjunction with Tables I, II, and III.

TABLE I

Control Bus

IND — Data-In Signal is a signal that is generated by the Central Processor Unit CPU in accordance with programmed instructions for indicating that the current instruction is an input instruction and that the addressed peripheral unit should place input data on the data bus.

OUTD — Data-Out Signal is a signal that is generated by the Central Processor Unit CPU in accordance with programmed instructions for indicating that the current instruction is an output instruction and that the computer unit has placed output data on the data bus for the addressed peripheral-unit controller to accept.

PLSE — Pulse Signal is a signal that is generated by the Central Processor Unit CPU and is used to reset Interrupt circuits in the multiplexer MUX upon recognition by the computer unit CU of an interrupt signal.

RST — Reset Signal is a signal that is generated by the Central Processor Unit CPU or Control Console CC and is used to reset all controls in ALL interfaces to a known starting configuration.

IUR — Interrupt Request Signal is a multiplexed signal that multiple peripheral devices generate to request interrupt service. All devices which use the line on which this signal is transferred to the computer unit, are forced to compete with each other for recognition by the Central Processor Unit CPU. If two or more devices request interrupt service at the same time, recognition is given to the highest priority device by means of a priority chain.

IOCL — I/O Clock Signal is a signal generated by the Central Processor Unit CPU that is used by the multiplexer MUX to synchronize interrupt requests into the Computer Unit CU. When an interrupt signal is recognized by the Central Processor Unit, IOCL signals are inhibited to prevent the generation of additional interrupt requests. The I/O Clock Signal IOCL remains inhibited until execution of the interrupt instruction is completed.

PRIN and PROT — Priority-In Signal and Priority-Out Signal are transferred on an interrupt signal priority chain which is strung serially through all distributed input/output systems, as well as through controllers of peripheral devices that are connected directly to the computer unit. PRIN is the name given to the signal in the priority chain where it enters a multiplexer. If logically FALSE, it allows the multiplexer to vector interrupt signals into the computer unit. Each multiplexer generates a Priority-Out signal PROT to indicate that neither it nor other devices with higher priority is generating an interrupt signal. The Priority-Out signal PROT from each multiplexer is the Priority-In signal PRIN for the next lower priority multiplexer.

IAR — Interrupt Address Request Signal is a signal generated by the Central Processor Unit and is used to request a vectored interrupt address from the multiplexer MUX in response to an interrupt request signal.

ECHO — Echo Signal is a signal generated by the Central Processor Unit CPU when all the data to be transferred to or from a peripheral device at a particular time has been transferred and a transfer count in the main memory unit MMU has reached zero.

TABLE II

| LINE | Data Bus FUNCTION |
|---|---|
| DB 00 | Data, Status, Mode, Interrupt Vector |
| DB 01 | Data, Status, Mode, Interrupt Vector |
| DB 02 | Data, Interrupt Vector, Status, Mode |

TABLE II-continued

Data Bus

| LINE | FUNCTION |
|---|---|
| DB 03 | Data, Interrupt Vector, Status, Mode |
| DB 04 | Data, Interrupt Vector, Status, Branch Address |
| DB 05 | Data, Interrupt Vector, Status, Branch Address |
| DB 06 | Data, Interrupt Vector, Branch Address |
| DB 07 | Data, Interrupt Vector, Branch Address |
| DB 08 | Interrupt Vector, Reset |
| DB 09 | Command, Interrupt Vector |
| DB 10 | Select, Interrupt Vector |
| DB 11 | Interrupt Vector |
| DB 12 | Interrupt Vector |
| DB 13 | Interrupt Vector |
| DB 14 | Interrupt Vector |
| DB 15 | Spare |

Explanation of Table II

Table II indicates the functions of each of the data bus lines DB00, . . . , DB15. As indicated in Table II, many of the data bus lines are utilized for a plurality of functions. Of course, it will be understood that each line may perform only one function at a time. Thus, by way of example, where DB00 is indicated in Table II to function to transfer data signals, status signals, and mode signals, it will be understood that DB00 may at one time be used to transfer a data signal in either direction between the computer unit CU and the multiplexer MUX, and it may also be used at another time to transfer a status signal from the multiplexer MUX to the computer unit CU and it may also be used, at still another time, to transfer a mode signal from the computer unit to the multiplexer MUX.

As indicated in Table II, eight data signals are transferred over data bus lines DB00 through DB07; six status signals are transferred over data bus lines DB00 through DB05; four mode signals are transferred over data bus lines DB00 through DB03; fifteen interrupt address signals are transferred over data bus lines DB00 through DB14; four external branch address signals are transferred over data bus lines DB04 through DB07; and the reset signal, command signal, and select signal are transferred over data bus lines DB08, DB09, and DB10, respectively.

As also indicated in Table II, data bus line DB15 is not used for purposes relevant to this invention in the embodiment herein disclosed, but is instead available as a spare line for future use.

It will be understood that the allocation of functions among the data bus lines DB00 through DB15, may be made in many alternative ways to accommodate word formats of many other general purpose digital computers.

TABLE III

Address Bus

| LINE | FUNCTION |
|---|---|
| AB 00 | Function Code (i.e. Data or Command or Status) |
| AB 01 | PUC Channel No. ⎫ |
| AB 02 | PUC Channel No. ⎬ PUC Address |
| | (PUC1, . . . . . or PUC8) |
| AB 03 | PUC Channel No. |
| AB 04 | MUX No. ⎫ |
| AB 05 | MUX No. ⎬ MUX Address |
| AB 06 | MUX No. ⎬ (MUX1, . . . . , (MUXn) |
| AB 07 | MUX No. ⎭ |
| AB 08 | Not Used |
| AB 09 | Interrupt Enable |
| AB 10 | Not Used |
| AB 11 | Not Used |
| AB 12 | Not Used |
| AB 13 | Not Used |
| AB 14 | Not Used |

TABLE III-continued

Address Bus

| LINE | FUNCTION |
|---|---|
| AB 15 | Not Used |

Unlike the lines of the data bus, the lines of the address bus are each allocated to only one distributed I/O function. Line AB00 is used to transfer a function signal or function code to the multiplexer from the computer unit CU. The function signal indicates whether the transferred term is to be a data term of a non-data term. Lines of the address bus AB01 through AB03 are used to transfer to the multiplexer MUX a 3-bit peripheral-unit controller address corresponding to a selected one of the eight peripheral-unit controllers that may be connected to the multiplexer MUX. Address bus lines AB04 through AB07 are used to transfer a 4-bit multiplexer address representing a selected multiplexer of a plurality of multiplexers that may be connected to the computer unit. Address bus line AB09 is used to transfer an interrupt enable signal from the computer unit to the multiplexer MUX to enable the interrupt signal circuitry in the multiplexer. Unless the interrupt circuitry of a multiplexer MUX is enabled, interrupt signals generated by peripheral-unit controllers will not be transferred from the multiplexer MUX to the computer unit CU. Address bus line AB08 and lines AB10 through AB15 are not presently used in the embodiment of the invention herein disclosed and are available as spare address bus lines.

As indicated in FIG. 1, each peripheral-unit controller PUC includes a microengine unit MEU. The microengine unit MEU is the programmable portion of the controller and contains processing circuits used to generate a sequence of control signals to manage the transfer of data between a peripheral device and the computer unit. A detailed description of the microengine unit MEU is provided below in conjunction with FIGS. 8 and 9.

Figure 2:
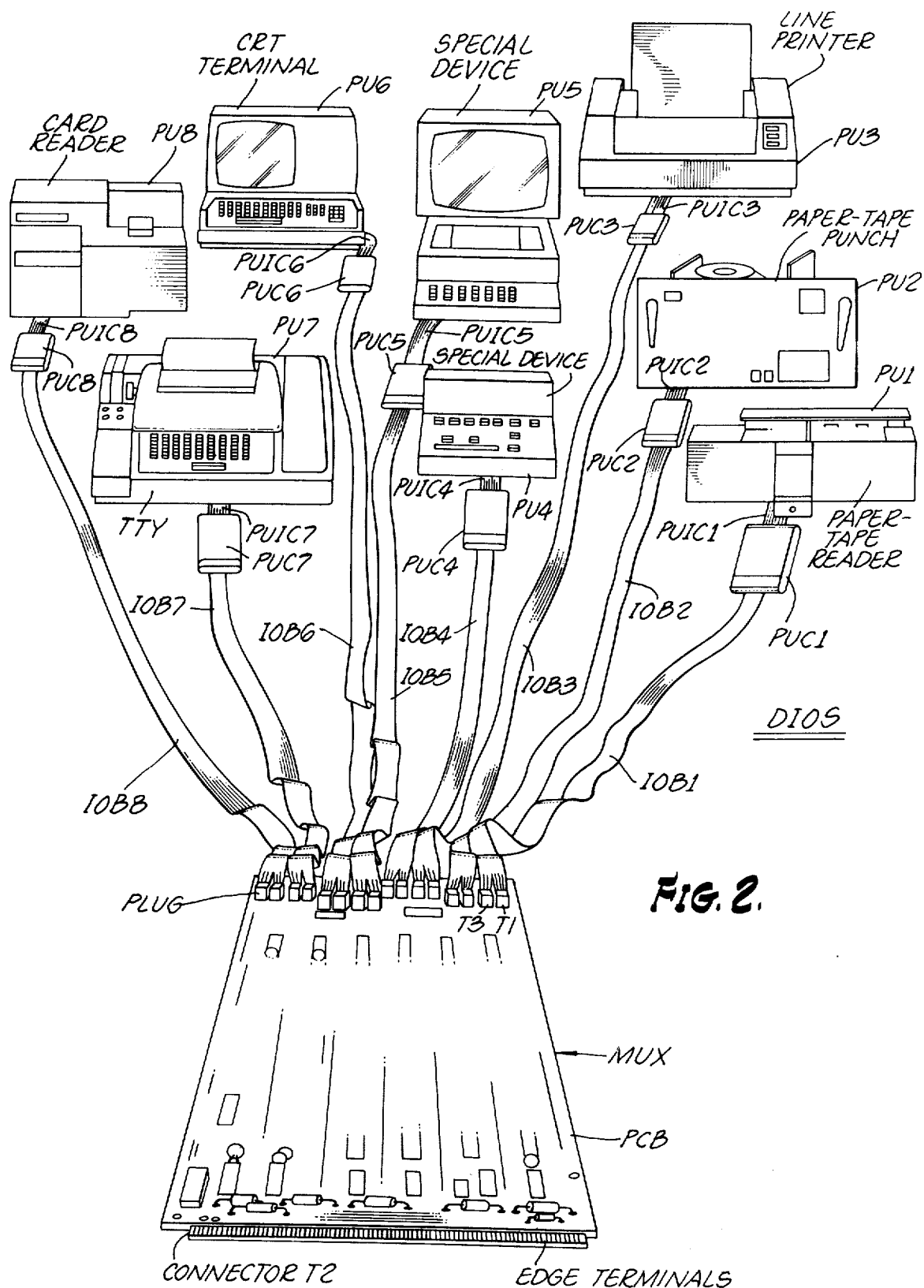
FIG. 2 illustrates a specific embodiment of this invention shown connected to eight peripheral devices.

Referring now to FIG. 2, there is shown a physical embodiment of the distributed input/output system DIOS connected to eight different peripheral-unit controllers PUCs. The multiplexer MUX is embodied in a printed-circuit board PCB shown in the lower portion of FIG. 2 with its terminals comprising connector T2 shown in the foreground, and is adapted for connection to the computer unit CU and eight pairs of connector plugs in the background, each pair shown adapted for connection to an input/output bus IOB1, IOB2, . . . , or IOB8.

As indicated in FIG. 2, each input/output bus IOB is connected to the multiplexer MUX by a pair of mating plugs. The mating plugs are shown in a staggered arrangement at the background portion of the printed-circuit board PCB. Scanning FIG. 2 from right to left, it will be observed that the peripheral-unit controllers PUC1, . . . , PUC8 are connected respectively to a paper-tape reader PU1, a paper-tape punch PU2, a line printer PU3, a special parallel-data device PU4, a special serial-data device PU5, a CRT terminal unit PU6, a teletypewriter unit PU7, and a card reader PU8.

Each combination of an input/output bus IOB, a peripheral-unit controller PUC, and a peripheral-unit interface cable PUIC, is sometimes regarded as a single cable having a firmware programmed controller located therein.

In the embodiment illustrated in FIG. 2, the cables are up to ten and one-half feet in length. The multiplexer printed-circuit board PCB is approximately 16 inches long and 7 inches wide, and the peripheral-unit controllers PUCs are each in the form of a printed-circuit board housed in a plastic box having approximate dimensions of 3 inches by 8 inches by 1 inch.

GENERAL DESCRIPTION OF THE MULTIPLEXER MUX

Figure 3:
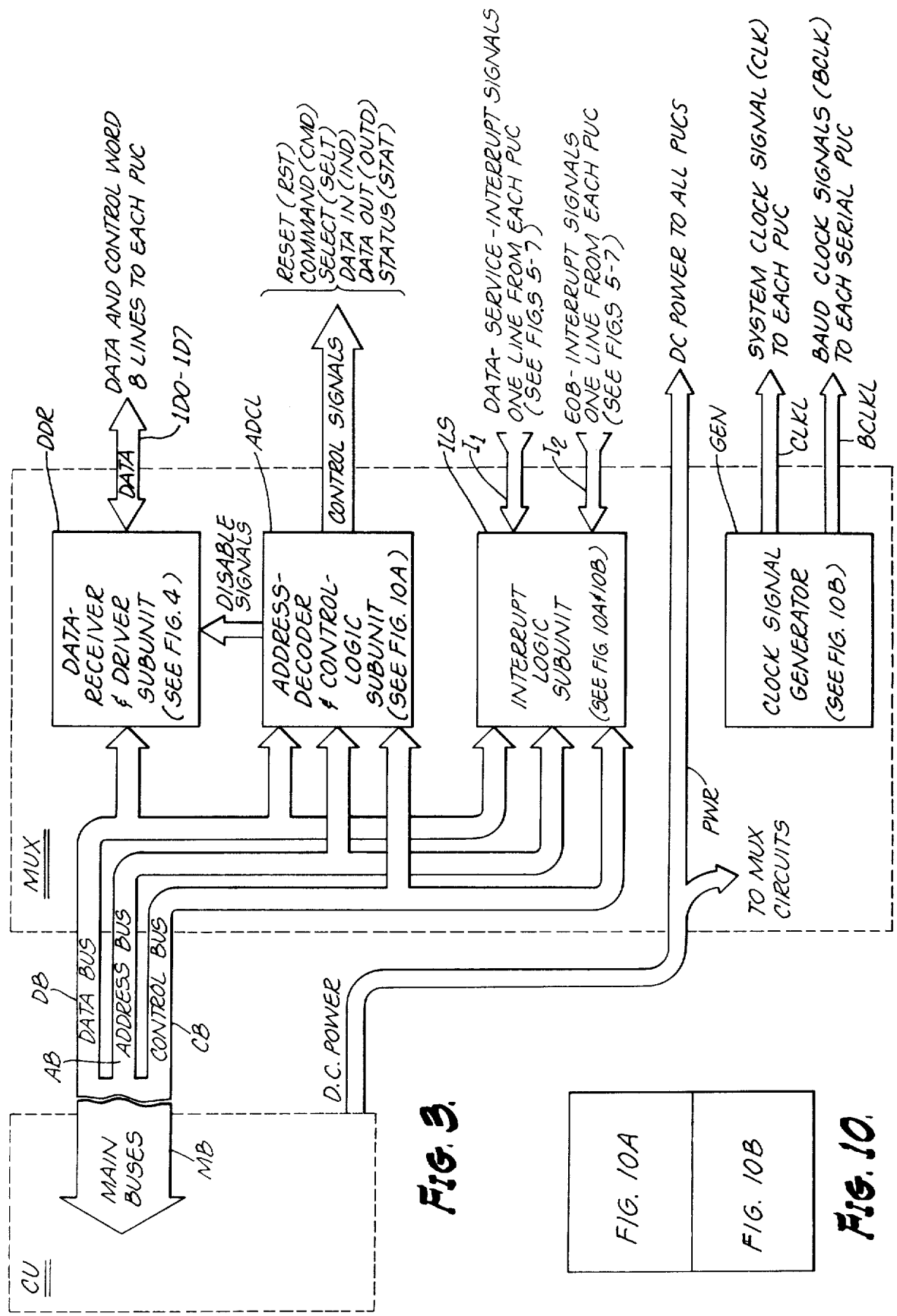
FIG. 3 is a simplified block diagram of the multiplexer of this invention indicating the functional subunits of the multiplexer and the general signal flow into and out of the multiplexer.

Referring now to FIG. 3, there is shown a general simplified block diagram of the multiplexer MUX including the subunits of which it is comprised and also indicating the signal flow through the cables interconnecting the multiplexer MUX with the computer unit CU and the peripheral-unit controllers PUCs.

The multiplexer MUX includes four subunits, namely a data-receiver and driver-subunit DDR, an address-decoder and control-logic subunit ADCL, an interrupt-logic subunit ILS, and a clock signal generator subunit GEN.

As indicated in FIG. 3, the data-receiver and driver subunit DDR is utilized to implement the transfer of data words and status words between the computer unit CU and all of the peripheral-unit controllers PUCs. In the embodiment of the invention herein disclosed, the data-receiver and driver subunit DDR comprises a plurality of transceivers, each of which includes a receiver and a transmitter. The receivers and transmitters are tri-state devices.

A tri-state device is one that, in addition to having the usual two output levels corresponding to the truth values of TRUE and FALSE, or ONE and ZERO, also has a third state in which the output of the device presents a high impedance. In this high-impedance third state, the devices neither load nor drive the line to which each is connected.

Usually four transceivers are available on a single integrated circuit chip. An example of a tri-state transceiver intergrated circuit chip TIC (for convenience hereinafter called a transceiver chip), suitable for operation as a data receiver and a data driver for the multiplexer MUX, is a Model DM 8835 manufactured by the National Semiconductor Corporation of Santa Clara, California. The DM 8835 chip is an inverting quad transceiver with a common transmitter-disable control line TDC and a common receiver-disable control line RDC. These disable control lines are used to alternately select all of the receivers or all of the transmitters on the transceiver chip TIC depending upon the direction of data transfer between the computer unit CU and the peripheral-unit controllers PUCs.

As indicated in FIG. 3, the disable signals are transferred to the Data Receiver and Driver Subunit DDR from the Address Decoder and Control Logic Subunit ADCL. The disable signals are generated in response to the Data-In signal IND and the Data-Out signal OUTD in a manner described below in conjunction with FIG. 10A. The disable signal on the Receiver Disable Control line RDC precludes receiver operation during input signal transfers and the disable signal on the Transmitter Disable Control TDC precludes transmitter operation during output signal transfers.

Figure 4:
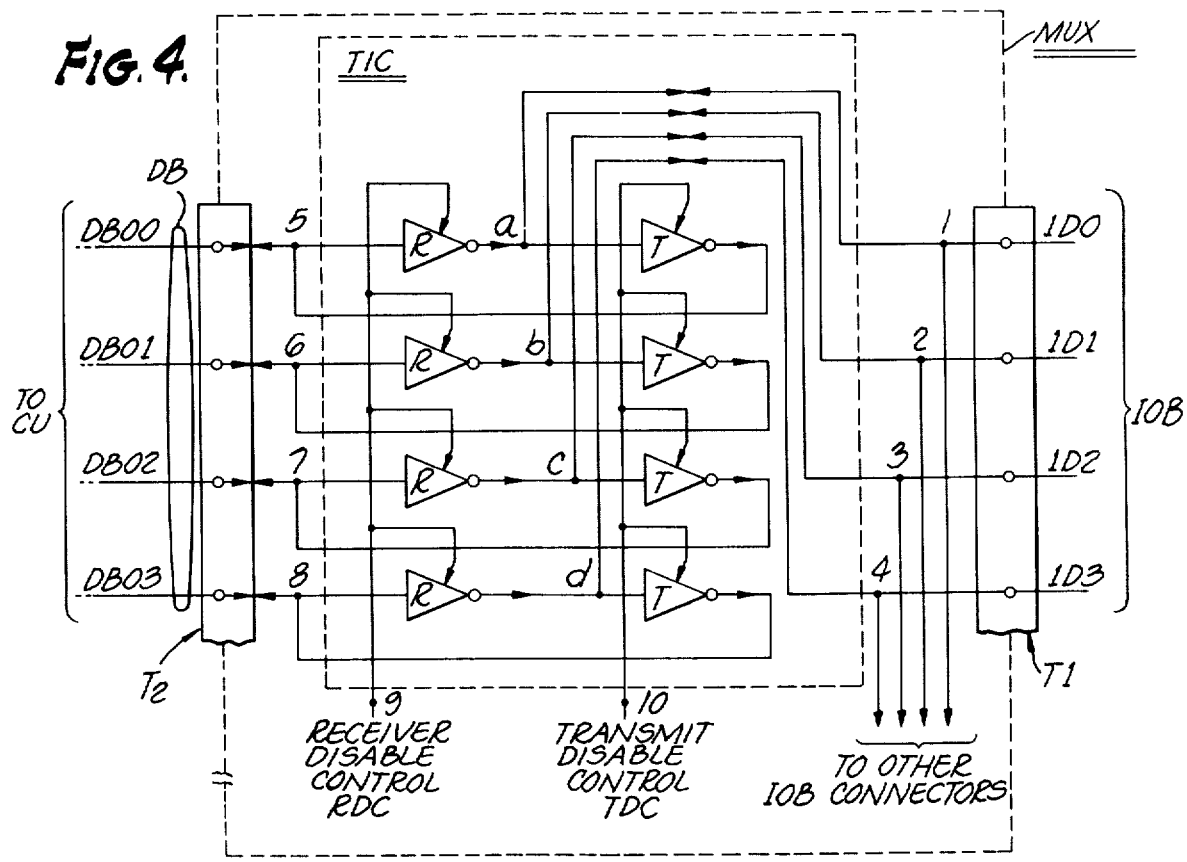
FIG. 4 is a schematic diagram of a transceiver integrated circuit unit employed in this invention.

FIG. 4 is a schematic drawing of one such transceiver integrated circuit chip TIC shown configured to implement the transfer of data on four lines between the computer unit CU and a plurality of peripheral-unit controllers PUCs.

In FIG. 4 there is shown a typical transceiver chip TIC comprising four pairs of receiver-transmitter combinations. As previously indicated, data may be transferred in either direction between the computer unit CU and the peripheral-unit controllers PUCs. Connections are provided to transfer data in a single direction through the unidirectional transceiver devices, but bidirectionally between the computer unit CU and the peripheral-unit controllers PUCs.

As shown in FIG. 4, the transceiver chip TIC is located within the multiplexer MUX and is connected to data bus DB lines DB00 through DB03 by means of terminals in multiplexer connector T2 (see FIG. 2). The transceiver chip TIC is also connected to the input-output buses IOBs by means including multiplexer connector T1 (see FIG. 2).

A second transceiver chip, not shown in the figures, interconnects data bus DB lines DB04 through DB07 and input/output buses IOBs. Terminals in multiplexer connector T2 (see FIG. 2) are also used by the second set of four data lines, DB04 through DB07.

When data is being transferred from any of the peripheral-unit controllers PUCs to the computer unit CU or, in the context of FIG. 4, from right to left, data enters the multiplexer MUX from one of a plurality of input/output buses IOBs on data lines 1D0 through 1D3 (see FIGS. 11, 12, and 13) such as at connector T1 of the multiplexer MUX. The data is then routed internally within the multiplexer terminals 1 through 4 of the transceiver chip TIC where it is routed to junctions $a$, $b$, $c$, and $d$, respectively, between the receivers and the transmitters. By that time the receiver-disable control line RDC is activated to disable the receivers while the transmitter-disable control line TDC is inactive so that the transmitters will remain in an enabled condition.

The input data applied to terminals 1 through 4 therefore flows into the transmitter from left to right through the transmitters, ultimately exiting the transceiver chip TIC at terminals 5 through 8, respectively.

The input data applied to terminals 1 through 4 is then routed out of the transceiver chip to multiplexer connector T2 and beyond the multiplexer connector to the appropriate lines DB1, . . . , DB4 of the data bus DB. Since the receivers are disabled during the transfer of input data to the computer unit CU, there will be no inadvertent return of data through the receivers, thus avoiding an error in the transfer of data between the computer unit CU and the peripheral-unit controllers PUCs.

Data being transferred from the computer unit CU to the peripheral-unit controllers PUCs, from left to right in FIG. 4, is transferred over the lines DB00, . . . , DB03 in the data bus DB to multiplexer connector T2 and into transceiver chip TIC where it is applied to terminals 5 through 8 respectively. During this data-output transfer, the transmitter-disable control line TDC will be used to disable the transmitters of the transceiver ship.

The receivers and transmitters of a transceiver chip TIC are normally enabled for signal transfer. Thus, in their quiescent state, the receivers and transmitters are in an enabled condition. A positive voltage disable signal is applied to either all of the receivers or all of the transmitters, depending upon the direction of signal transfer then occurring.

Output data is therefore transferred from the input terminals 5 through 8 through the receivers to transceiver chip terminals 1 through 4, respectively. The output-data is then routed inside the multiplexer MUX to connectors, including connector T1, for transfer over the input/output buses IOB1, . . . , IOB8 to the respective peripheral-unit controllers PUCs. Output-data is thereby transferred to a plurality of controllers, each controller being separately connected to the multiplexer, even though only one transmitter per data signal is employed. However, only the peripheral-unit controller PUC that has been selected by the computer unit CU in accordance with instructions programmed therein, to receive control signals, will be enabled to receive and operate upon the data.

At least two transceiver chips TICs are used in the data receiver and driver subunit DDR (see FIG. 3) to accommodate a total of eight bidirectional data lines between the multiplexer MUX and each peripheral-unit controller PUC.

As indicated in FIG. 3, the control signals that are transferred from the multiplexer to the controllers, are generated in the address-decoder and control-logic subunit ADCL, another subunit of the multiplexer MUX.

As is well known in the computer arts, binary signals are either in a TRUE state or in a FALSE state. Such states typically correspond to two levels of voltage, such as +5 volts and 0 volts, respectively. In this context it may be said that binary signals are always present on a given line since the absence of a positive voltage on the line may be the same as the presence of a signal in a FALSE state. However, it is still common in the computer arts to describe the "transfer" of a binary signal from one device to another. In the description of this invention, signals are sometimes described as being transferred and are sometimes described as being set to a particular state or truth value. It is to be understood that in either manner of describing the signal, the voltage level on a line is being set to one of two possible binary levels and will remain set at that level for a selected period of time or until reset after the occurrence of some subsequent condition.

The following control signals are generated by the address decoder and control logic subunit ADCL (see FIGS. 3 and 10A) in response to signals transferred from the computer unit CU to the multiplexer MUX over the main buses MB: a reset signal RST, a status signal STAT, a data-in signal IND, a data-out signal OUTD, a command signal CMD, and a select signal SEL. These signals are used to initiate various operations in the peripheral-unit controllers when the signals are set to a truth value of 1. The manner in which these control signals are generated is discussed below in detail in conjunction with FIG. 10A.

The reset signal RST, when set to a truth value of 1, resets the peripheral-unit controller PUC to which it is channeled, to an idle configuration, making it ready for a new operation. It is normally used only when the computer unit is first powered up.

The status signal STAT, when set to a truth value of 1, and transferred to a particular controller, will cause the selected controller to enable drives to transfer a status word to the multiplexer MUX over the data lines 1D0-1D7 (see FIGS. 11-14). The multiplexer gates the status word onto the data bus DB for the duration of the status control signal STAT. The status word comprises signals which represent information regarding the condition of one or more parameters of a peripheral unit PU. For example, the status word of a peripheral-unit controller PUC that is connected to a card reader unit PU8, may include a status signal that will have a truth value of 1 when the card hopper is empty of cards and a truth value of 0 when there are cards in the card hopper. The status word may be transferred to the computer unit CU and it is also utilized by the peripheral-unit controller to determine which of two alternative steps will be the next step in a sequence of controller operations. The purpose and use of the status word will be discussed in greater detail hereinafter.

The data-in signal IND, when set to a truth value of 1, enables the transfer of data from a peripheral unit PU to the computer unit CU by enabling the appropriate drivers in both the peripheral-unit controller PUC and the multiplexer MUX.

The data-out signal OUTD, when set to a truth value of 1, enables the transfer of data from the computer unit CU to a selected peripheral unit PU also by enabling drivers in the multiplexer MUX and in the peripheral-unit controller PUC. The enabling of drivers in peripheral-unit controllers is described in conjunction with FIGS. 11-14. The control of multiplexer drivers has been previously described in conjunction with FIG. 4.

The command signal CMD serves a multiple purpose. It is a start signal used during the initial step in a sequence of data-transfer operations to load starting address signals into the controller for the beginning of a data-transfer sequence. The command signal CMD is also utilized during interrupt operations to indicate that an interrupt signal has been serviced and also to indicate an ending condition, such as the transfer count in the computer-unit program having reached zero. A zero transfer count occurs when a sequence of data transfers has been completed.

In the embodiment of the invention disclosed herein, a full word contains sixteen bits or two 8-bit bytes. In some computer systems, the locations of data stored in a memory unit are identified by a word number or byte number. For example, a particular block of data stored in a memory unit may contain ten bytes. The first byte in the block would have a count of 9, and the last would have a count of 0. Thus, if this particular block of data is transferred to a peripheral unit PU, the central processor unit CPU of the computer unit CU, will keep an accounting of the progress of the data transfer by checking the transfer count. If the transfer count has reached 0, the last byte of data in the particular block will have been transferred and the data transfer will be complete. A block of data is defined herein as a plurality of data bytes comprising all the data to be transferred to or from a particular peripheral unit at a particular time.

The select signal SEL is used in conjunction with peripheral-unit controllers PUCs for the purpose of transferring mode select bits onto the data bus and to the controller. The mode select bits are utilized by the controllers to select a peripheral unit PU control function. By way of example, a mode select signal may be utilized to turn on the motor of a teletypewriter unit prior to the transfer of data between the computer unit CU and the teletypewriter unit. The select signal SEL is utilized in serial-peripheral-unit controllers SPUC and in general-purpose peripheral-unit controllers GPPUC.

The address-decoder and control-logic subunit ADCL, provides means to determine whether the multiplexer MUX is the one of the plurality of multiplexers that is being addressed by the computer unit CU; means for determining which of the control signals is to be transferred to the peripheral-unit controllers; means to select a particular controller out of the plurality of controllers connected to the multiplexer; and means for selectively disabling either the receivers or the transmitters of the data-receiver and driver subunit DDR, depending upon the direction of data transfer during a particular operation (see FIG. 4 and discussion thereof).

As indicated in FIG. 3, a third subunit of the multiplexer MUX is the interrupt logic subunit ILS. Each peripheral-unit controller PUC can generate two types of interrupt signals, a data-service-interrupt signal and an ending condition interrupt signal, that is, an end-of-block interrupt signal EOB. The end-of-block interrupt signal occurs after the end of a transfer of a block of data, or as a result of other ending conditions.

When a sequence of data transfers is about to commence, a peripheral-unit controller generates a data-service-interrupt signal which is transferred to the multiplexer interrupt logic subunit ILS. The interrupt logic subunit then vectors, or directs, the data-service-interrupt signal to known preselected memory cells in the main-memory unit MMU of the computer unit CU.

The known preselected memory cells to which an interrupt signal is vectored are pre-programmed to contain the proper instruction for a particular peripheral-unit controller PUC to commence a transfer of data between the main-memory unit MMU and the peripheral unit PU. An additional data-service-interrupt signal is transferred to the computer unit prior to the transfer of each data byte until the transfer count is decremented to equal 0. After the last data term in a particular block of data has been transferred, a command signal CMD of 500 nanoseconds duration, twice the nominal 250 nanosecond duration, is transferred to the controller to indicate that the transfer count of the data being transferred, has reached zero. In response to a zero transfer count command signal, the controller generates an ending (end-of-block) interrupt signal which is also transferred to the interrupt logic subunit ILS of the multiplexer MUX. The end-of-block EOB-interrupt signal is then also vectored, or directed, to a known preselected location in the main-memory unit MMU. The EOB-interrupt signal is vectored to the memory cells of the main memory unit MMU which are preprogrammed to contain the instruction necessary to terminate the data transfer operation. Upon receipt of a double duration command signal CMD, the peripheral-unit controller PUC returns to an idle state and waits for the next command signal. An EOB-interrupt signal will also be generated if a status error is detected at any point in a sequence of data transfers. The generation of interrupt signals is described in detail in conjunction with FIGS. 8 and 9 and Table VII.

In addition to containing the circuits necessary for vectoring interrupt signals to selected locations in the main-memory unit MMU that are programmed to contain certain instructions, the interrupt logic subunit ILS also provides means for determining the priority of interrupt signals when they occur simultaneously. As an example, all data-service-interrupt signals have higher priority than all EOB-interrupt signals.

The interrupt logic subunit ILS also includes means for either inhibiting or enabling an interrupt sequence initiated by a peripheral-unit controller PUC depending upon whether or not other interrupt signals are already being processed by the computer unit.

Another subunit of the multiplexer MUX indicated in FIG. 3, is the clock signal generator subunit GEN. This subunit generates a system clock signal CLK, and a baud clock signal BCLK. The system clock signal CLK is a 4 MHz squarewave signal that is transferred to all controllers PUCs for the purpose of synchronizing the transfer of information between the controllers and the multiplexer MUX. The baud clock signal BCLK, is used only in serial peripheral-unit controllers SPUCs. The baud clock signal BCLK is typically a multiple of the fundamental clock rate of the peripheral unit. It will be seen below that the baud clock generator is provided with a jumper plug that permits the selection of any one of a plurality of baud rates for each peripheral-unit controller PUC. Typically, rates in the range of 75 to 19,200 baud are used for standard peripheral devices.

As indicated in FIG. 3, DC power is transferred from the computer unit CU to the multiplexer MUX over a power line PWR, to be used by the multiplexer circuits. DC power is also transferred over each input/output bus IOB for use in the peripheral-unit controllers PUCs. As noted previously in conjunction with FIG. 1, the computer unit CU includes a power supply PS. Power supply PS is an AC to DC coverter that converts commonly available 60 Hz. AC power to several independent DC voltages for use in the computer unit and in the distributed input/output system DIOS. The embodiment described herein utilizes DC voltages of +5 volts, +12 volts and −12 volts.

GENERAL DESCRIPTION OF PERIPHERAL-UNIT CONTROLLER PUC

This invention employs two types of peripheral-unit controllers PUCs. One type is utilized in conjunction with parallel-data devices and is therefore called a parallel-peripheral-unit controller PPUC. The second type is utilized in conjunction with serial-data peripheral devices and is therefore called a serial-peripheral-unit controller SPUC.

Figure 5:
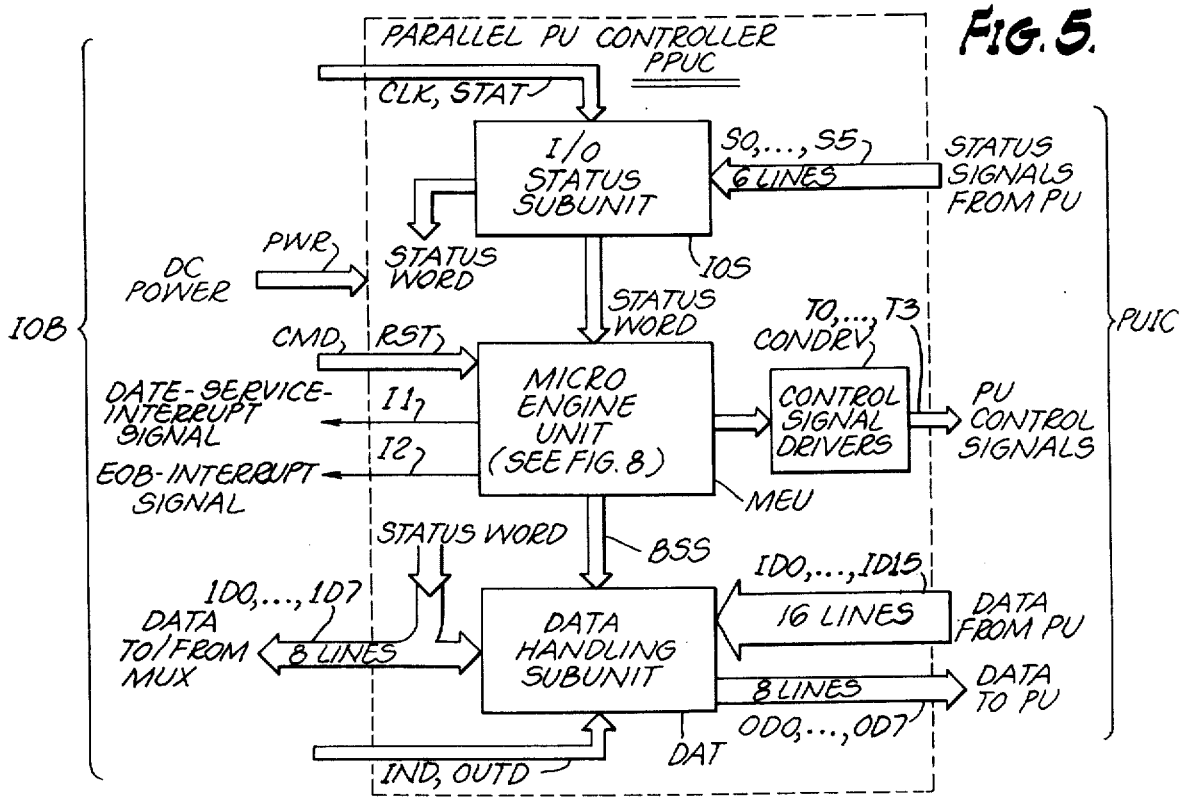
FIG. 5 is a simplified block diagram of a parallel peripheral-unit controller of this invention.
Figure 6:
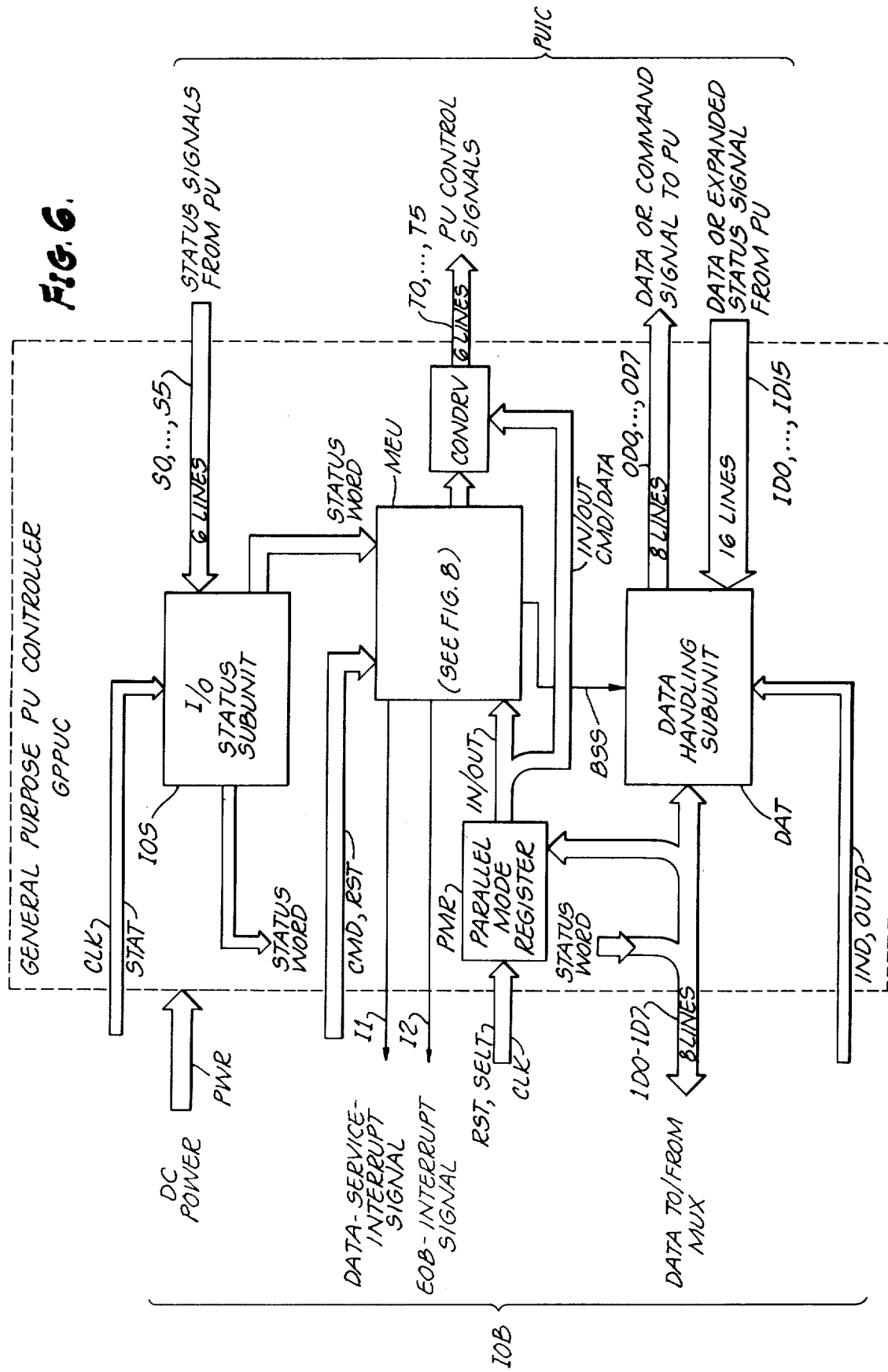
FIG. 6 is a simplified block diagram of a general purpose peripheral-unit controller of this invention.

There are two versions of the parallel-peripheral-unit controller PPUC, the basic parallel controller, which is illustrated in FIG. 5, and a somewhat more flexible and powerful parallel controller which is illustrated in FIG. 6 and is called a general-purpose-peripheral unit controller GPPUC. There are also two versions of the serial-peripheral-unit controller SPUC. The simplified block diagram shown in FIG. 7 is illustrative of both versions of the serial controller.

Figure 7:
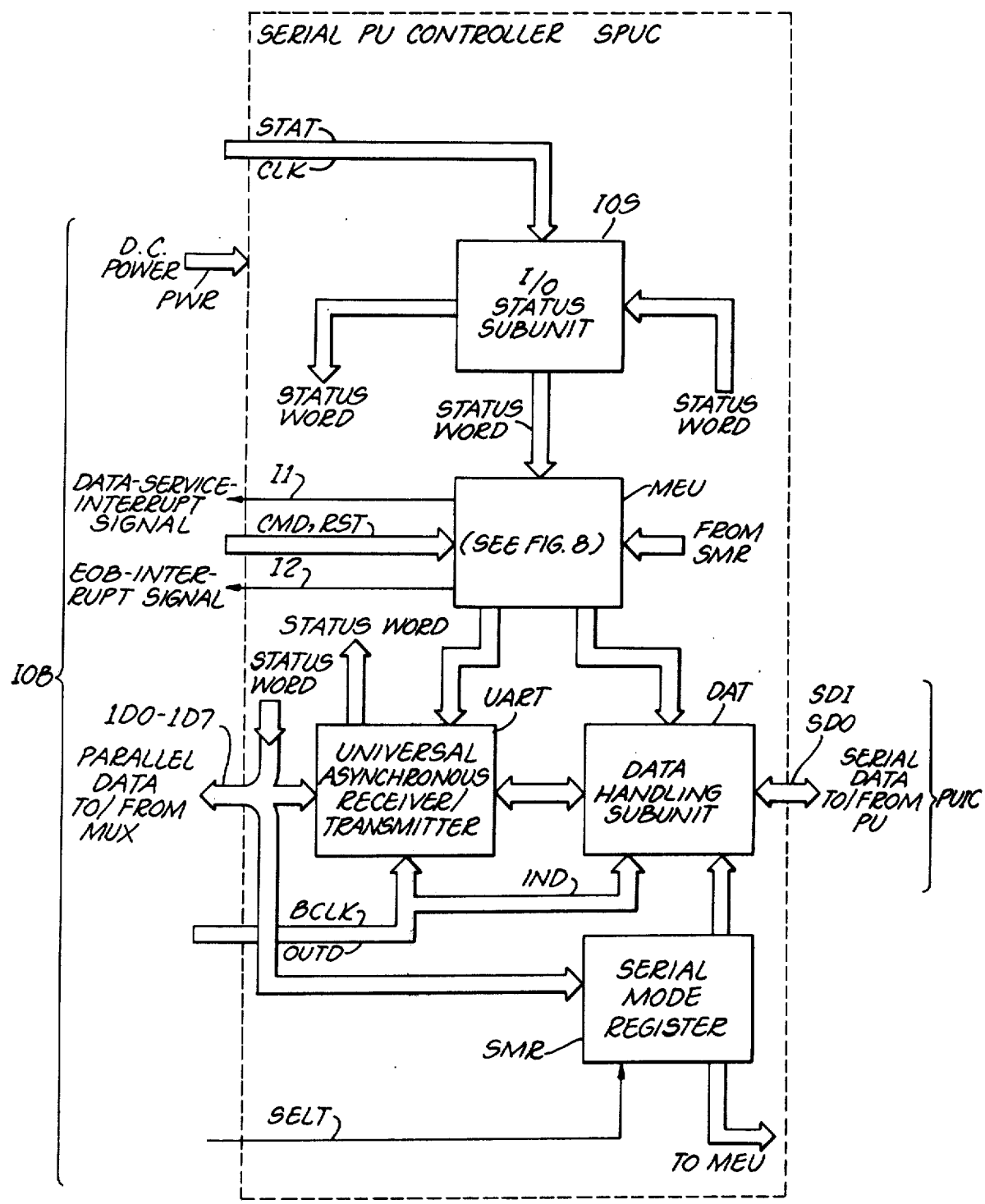
FIG. 7 is a simplified block diagram of a serial peripheral-unit controller of this invention.

In each of FIGS. 5, 6, and 7, the version of the peripheral-unit controller being discussed is shown interposed between an input/output bus IOB and a peripheral-unit interface cable PUIC. In the discussion of each of those figures, reference to the IOB, the PU, etc., means the particular input/output bus, the particular peripheral unit, etc., to which the peripheral-unit controller is connected.

In FIG. 5 there is shown a simplified block diagram of a parallel-peripheral-unit controller PPUC interposed between an input/output bus IOB and a peripheral-unit interface cable PUIC and comprising four subunits, namely, an Input/Output Status Subunit IOS, a Microengine Unit MEU, a Data Handling Subunit DAT, and a Control Signal Driver Subunit CONDRV. It will be seen hereinafter that all of the peripheral-unit controllers contain subunits of the type illustrated in FIG. 5 and it will be observed that one of the subunits common to all controllers, namely, the microengine unit MEU, is substantially identical in all controllers. The control signal driver subunit CONDRV, is included in only the parallel-peripheral-unit and general-purpose-peripheral-unit controllers.

The input/output status subunit IOS of a parallel controller, receives a plurality of status signals over lines S0, . . . , S5 comprising a status word from the peripheral unit PU to which a controller PUC is connected and stores the status word in a register. The status word is then made available for transmission to the multiplexer over the data lines of the input/output bus IOB and is also made available to the microengine unit MEU for purposes which will be hereinafter discussed in more detail. The status subunit IOS also receives a STAT control signal to enable the transfer of the status word to the multiplexer MUX and to the computer unit CU.

At the bottom portion of FIG. 5, there is shown a data handling subunit DAT. This subunit comprises the drivers and temporary storage means employed to implement bidirectional data transfer between the mutliplexer MUX and the peripheral unit PU. As indicated in FIG. 5, data being transferred between the parallel-peripheral-unit-controller PPUC and the peripheral unit PU, is transferred on either output lines OD0, . . . , OD7 or input lines ID0, . . . , ID15, depending upon the direction of the transfer taking place.

It will also be observed that although there are eight lines for the transfer of data from a controller PUC to a peripheral unit PU, there are 16 lines for the transfer of data from the peripheral unit PU to the peripheral-unit controller PUC. The extra set of eight input data lines permits the accommodation of peripheral devices that generate sixteen data bits at a time for transfer to the computer unit CU.

A third subunit in the parallel-peripheral-unit controller PPUC is the microengine unit MEU. As indicated in FIG. 5, the microengine unit receives a status word from the IO status subunit IOS and receives control signals from the multiplexer MUX. As will be explained below, the microengine unit MEU is programmed to generate the data-service-interrupt signals and the EOB-interrupt signals previously discussed. These interrupt signals are transferred to the multiplexer MUX over allocated lines in the input/output bus IOB. The microengine unit is also programmed to generate a byte select signal BSS which is transferred to the data handling subunit DAT. The truth value of the byte select signal BSS determines which of the two sets of eight input-data lines ID0, . . . , ID7 or ID8, . . . , ID15 is enabled for transmission of data to the multiplexer MUX over the input/output bus IOB.

The mircoengine MEU also generates peripheral-unit control signals which are transmitted over separate lines to the peripheral unit PU for control of one or more peripheral-unit operations.

The manner in which the peripheral-unit control signals are generated and transferred to the peripheral device is one of the many novel features of this invention. For example, it will be observed hereinafter that the control signals of the parallel-peripheral-unit controllers that are transferred to a peripheral unit, are generated by read-only-memory units and that such signals are transferred directly to the peripheral unit without buffer registers between the read-only-memory units and the peripheral unit PU. It will also be observed that control signals of the serial-peripheral unit controllers are transferred directly out of read-only-memory units to an asynchronous receiver/transmitter device without any kind of interposed buffering circuits.

FIG. 6 is a simplified block diagram of the general-purpose peripheral-unit controllers GPPUC. A comparison of FIG. 6 with FIG. 5 reveals that the principal difference between the general-purpose peripheral-unit controller GPPUC and the parallel-peripheral-unit controller PPUC are a mode register PMR and two additional peripheral unit control lines in the general purpose controller not present in the parallel unit.

The added mode register PMR and the added control lines substantially increase the flexibility of the general-purpose peripheral-unit controller GPPUC for use with more complex peripheral devices that can accommodate special user requirements not accommodated by the standard peripheral devices previously mentioned.

The details of the additional flexibility provided in the general-purpose peripheral-unit controller GPPUC will be discussed hereinafter in conjunction with more detailed block diagrams of the peripheral-unit controllers PUCs. (FIGS. 11-14)

In FIG. 7 there is shown a simplified block diagram of a serial-peripheral-unit controller SPUC. As in the parallel controllers, the serial-peripheral-unit controller SPUC has an I/O status subunit IOS, a data handling subunit DAT, and a microengine unit MEU. However, the serial-peripheral-unit controller SPUC has two additional subunits, namely, a universal asynchronous receiver-transmitter UART and a 4-bit, or 4-flip-flop, mode register SMR.

One function of the universal asynchronous receiver/transmitter UART is to convert data being transferred between the multiplexer MUX and the serial-peripheral-unit controller SPUC in a 8-bit parallel format to an 11-bit serial format for transfer between the serial-peripheral-unit controller and the peripheral unit to which it is connected. The universal asynchronous receiver/transmitter UART also functions to make the opposite conversion for data being transferred in the opposite direction.

The mode register SMR responds to a select signal SEL from the multiplexer by setting its four flip-flops according to the respective truth values of four signals transferred over the four data lines 1D0-1D3 of the input/output bus IOB. The output signals of these flip-flops are then made available to the peripheral unit PU to which the controller is connected, the data handling subunit DAT and the microengine unit MEU, for purposes which will be described in more detail hereinafter. By way of example, one of the mode control signals is used to step the motor of the paper-tape reader in the teletypewriter unit.

As previously indicated, there are two versions of the serial-peripheral-unit controller SPUC. The differences between the two verions reside primarily in the data handling subunit DAT. The details of these differences will be discussed more fully below in conjunction with FIGS. 13 and 14. However, at this point, it is to be noted that the principal difference between the data handling subunits of the two versions of the serial-peripheral-unit controller SPUC stems from the fact that data handling subunits that are used in conjunction with teletypewriter units employ a discrete transistor output stage for current mode logic operation. Data handling subunits that are used in conjunction with cathode-ray-tube terminal units CRTS and modems, employ means for converting the peripheral-unit controller PUC logic levels to standards established by Electronic Industries Association for the interface between data terminals and data communications equipment. This standard, called RS232, defines voltage levels for receivers and transmitters operated in such equipment. For example, a space at the receiver input corresponds to a voltage in the range +3 volts to +25 volts, while a mark corresponds to a voltage in the range −3 volts to −25 volts. The serial-peripheral-unit controller provides a transmitter output of +12 volts for a space, and −12 volts for a mark. The input/output impedances and signal rise and fall times are also specified by the RS232 standard.

Because of the parallel-to-serial conversion requirements in the serial-peripheral-unit controllers SPUCs, it will be observed that unlike the parallel-peripheral-unit controllers PPUCs, the serial-peripheral-unit controllers do not employ direct connections between the peripheral unit PU and the IO status subunit IOS or between the peripheral unit PU and the microengine unit MEU. Instead, the serial-peripheral-unit controller derives status information through the universal asynchronous receiver/transmitter UART. These aspects of serial-peripheral-unit controllers are discussed more fully below in conjunction with FIGS. 13 and 14.

The peripheral unit control signals generated by the microengine unit MEU in serial-peripheral-unit controllers are also used somewhat differently than those in parallel-peripheral-unit controllers. For example, in serial controllers two of the control signals, namely, Master Reset signal MR and Data-Received Reset signal DDR, generated by the microengine unit MEU, are transferred to the universal asynchronous receiver/transmitter UART for controlling registers in that subunit. A third microengine unit control signal is used only in serial-peripheral-unit controllers that operate with teletypewriter units. Serial-peripheral-unit controllers used in conjunction with cathode-ray-tube terminal units CRTs and modems, do not employ the last mentioned control signal generated by the microengine unit.

THE MICROENGINE UNIT

Figure 8:
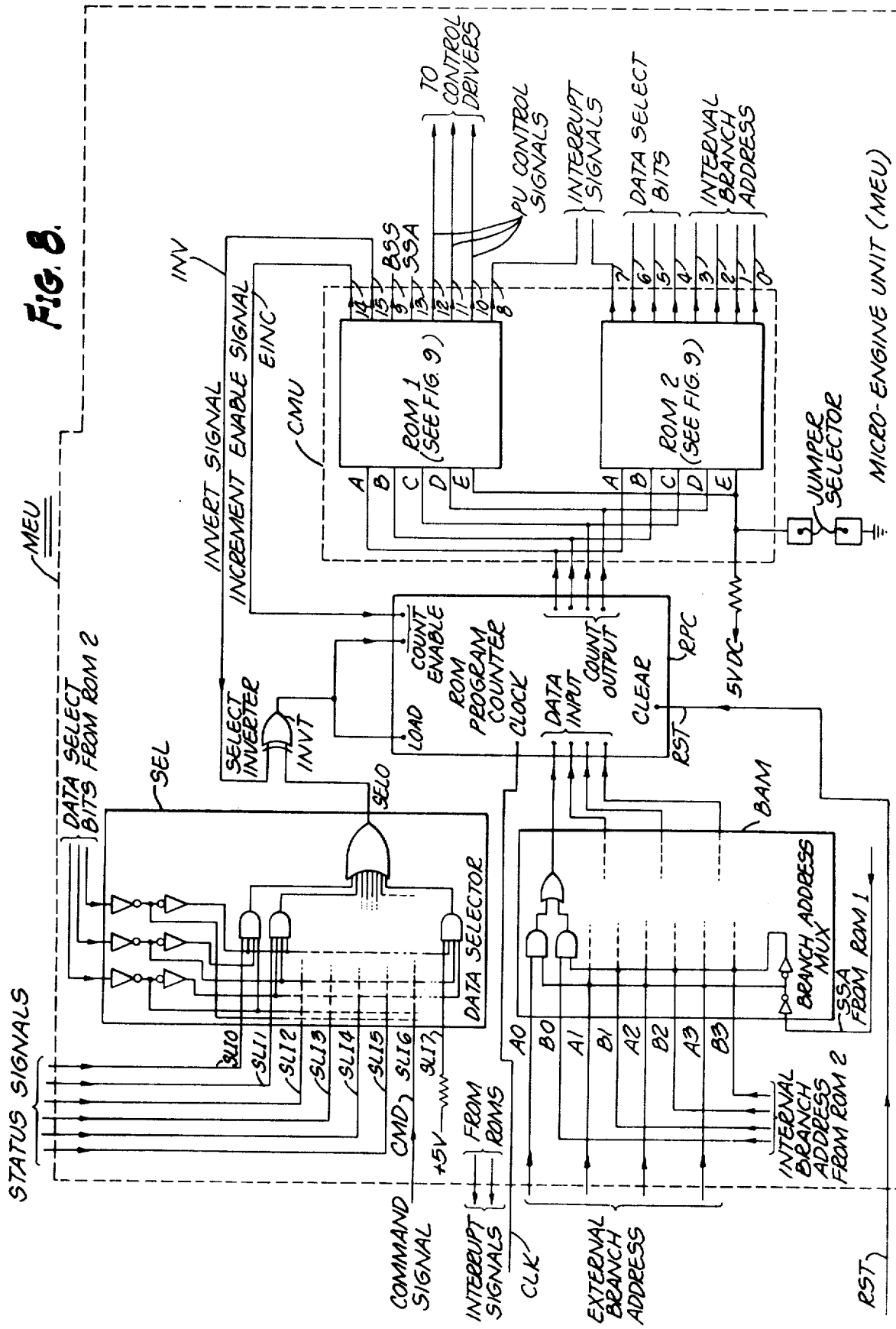
FIG. 8 is a detailed block diagram of a microengine unit, a functional subunit of peripheral-unit controllers of this invention, indicating details of the interface and signal flow for this unit.
Figure 9:
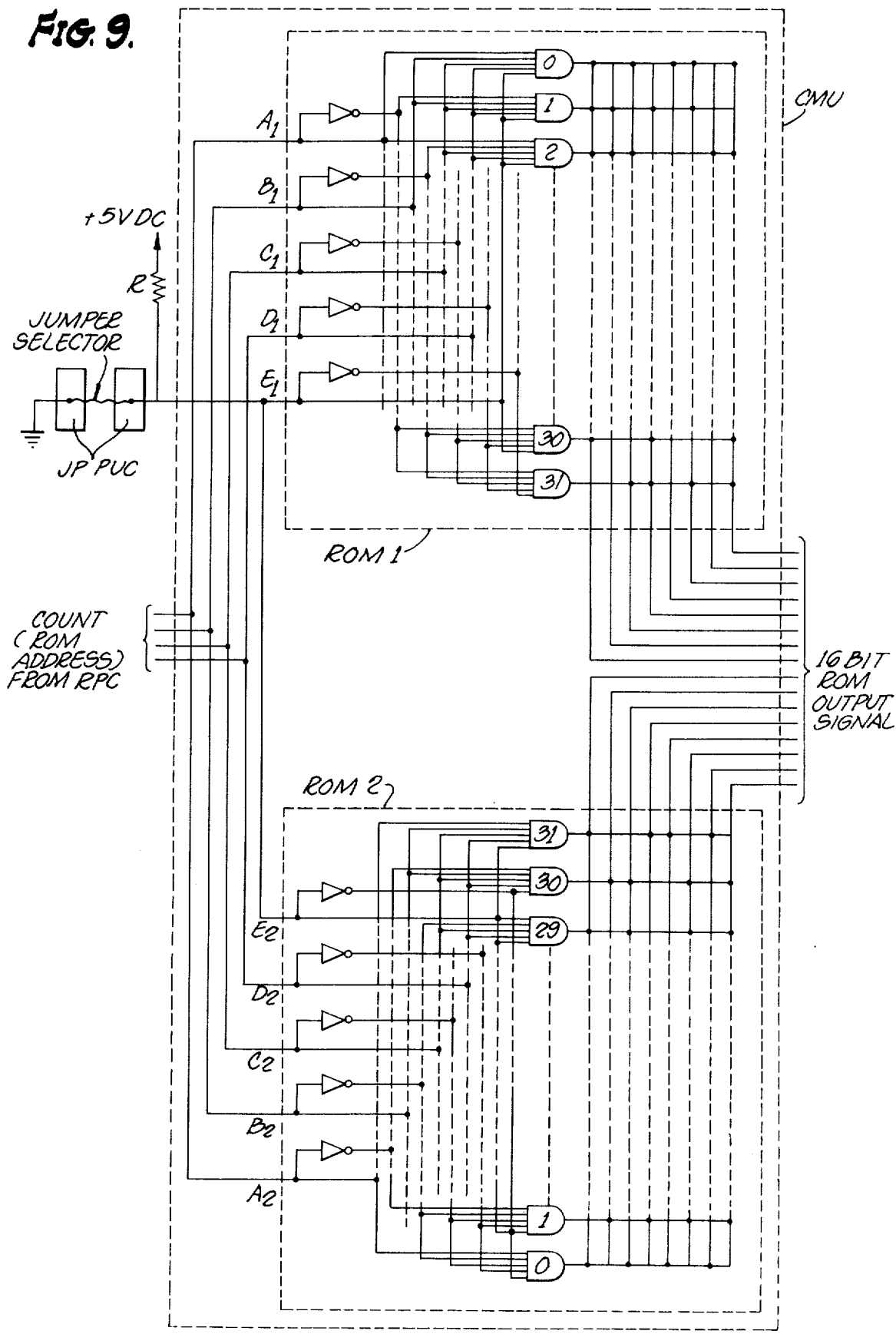
FIG. 9 is a detailed block diagram of the controller memory unit of the microengine unit.

Since the microengine unit MEU is common to parallel and serial controllers, a more complete understanding of the operation of the controllers is provided by the following description of FIGS. 8 and 9, and the operation of the microengine unit MEU.

FIG. 8 is a detailed block diagram of the microengine unit. As indicated in FIG. 8, the microengine unit comprises five commercially available integrated-circuit chips, namely, two read-only-memory chips ROM1 and ROM2, a program counter chip RPC, a data-selector chip SEL and a branch-address multiplexer chip BAM. In addition, an EXCLUSIVE-OR gate, used as a select inverter INV, is interposed between the data selector SEL and the branch address multiplexer BAM. The read-only-memory units together comprise the controller memory unit CMU.

The read-only-memory units ROM1 and ROM2, by way of example, may each be a Texas Instruments, Inc. Model 74188A 256-bit programmable read-only memory device. The ROM program counter RPC, by way of example, may be a Texas Instruments, Inc. Model 74161 synchronous 4-bit binary counter. The data selector SEL, by way of example, may be a Texas Instruments, Inc. Model 74151A 8 to 1 data selector/multiplexer. The branch address multiplexer BAM, by way of example, may be a Texas Instruments, Inc. Model 74157 quadruple 2-line-to-1-line data selector/multiplexer. The select inverter INV, by way of example, may be a portion of a Texas Instruments, Inc. Model 7486 quadruple 2-input EXCLUSIVE-OR gate. All of the Texas Instruments, Inc. devices mentioned herein are described more fully in *The TTL Data Book for Design Engineers*, First Edition, 1973, by Texas Instruments, Inc. which also provides a complete description of the logic and operation of each such device.

The combined output of the two read-only-memory units ROM1 and ROM2 is a single 16-bit word. Some of the output signals of the read-only-memory units ROM1 and ROM2, in parallel controllers, are transferred to the peripheral unit PU as control signals and in serial controllers, are transferred to the universal asynchronous receiver/transmitter UART as control signals. In serial controllers used in conjunction with teletypewriter units, the read-only-memory units also generate a control signal that is used to step a paper-tape reader included in some teletypewriter units. Two of the output signals of the controller memory unit CMU are the interrupt signals which are transferred over the input/output bus IOB to the multiplexer MUX. These are the data-service-interrupt signal and end-of-block-interrupt signal. Another output signal of read-only-memory units ROM1 and ROM2 is the byte-select signal BSS which is used only in parallel controllers and as previously discussed, is transferred to the data handling subunit DAT in the peripheral-unit controller PUC (see FIG. 5) to determine which byte of a 2-byte input word is to be transferred to the computer unit. All of the remaining output signals of the 16-bit output word of the read-only-memory units ROM1 and ROM2 are used as feedback signals within the microengine unit MEU to control a sequence of operations of the peripheral unit PU.

The selection of a particular set of 16-bit output signals from the read-only-memory units ROM1 and ROM2 is determined by a 4-bit input-address signal applied to the read-only-memory units. It will be seen hereinafter that this 4-bit input-address signal, which is the output signal of the ROM program counter RPC, may represent either an original count or an incremented count. The incremented count is dependent upon but not equal to the original count.

Typical logic circuitry and counting operations of the ROM program counter RPC are described in more detail at pages 326 and 328 respectively, of the Texas Instruments, Inc. publication cited previously.

The counter employed in the embodiment disclosed may be briefly described as a synchronous 4-bit counter that includes four input lines, four output lines, a load line, two count enable lines, a clear line, and a clock line. The counter also includes a voltage line, a ground line, and a carry output line, not shown in FIG. 8. The carry output line is not connected in this invention. At each occurrence of a clock signal CLK, about every 250 nanoseconds, the counter is either incremented to a count one greater than the previous count, or loaded with an original count represented by the four signals present on the counter-input lines. Table IV is an example of a series of counts developed by the counter in response to signals on the load line and the two count enables lines. The truth values of the two enable signals are TRUE when the signal levels are high, and the truth value of the load signal is TRUE when the signal level is high.

TABLE IV

| Line | Input Address | Count | Load Signal* | Enable Signals* | Original or Increment |
|---|---|---|---|---|---|
| 1 | 0000 | 0 | 1 | 0 | Original |
| 2 | 0101 | 5 | 1 | 0 | Original |
| 3 | 1011 | 6 | 0 | 1 | Increment |
| 4 | 1011 | 7 | 0 | 1 | Increment |

TABLE IV-continued

| Line | Input Address | Count | Load Signal* | Enable Signals* | Original or Increment |
|---|---|---|---|---|---|
| 5 | 1011 | 8 | 0 | 1 | Increment |
| 6 | 1011 | 9 | 0 | 1 | Increment |
| 7 | 1011 | 11 | 1 | 0 | Original |
| 8 | 1111 | 12 | 0 | 1 | Increment |
| 9 | 1111 | 13 | 0 | 1 | Increment |
| 10 | 1111 | 15 | 1 | 0 | Original |
| 11 | 1110 | 0 | 0 | 1 | Increment |
| 12 | 1110 | 1 | 0 | 1 | Increment |
| 13 | 1110 | 2 | 0 | 1 | Increment |
| 14 | 1110 | 14 | 1 | 0 | Original |
| 15 | 1001 | 9 | 1 | 0 | Original |
| 16 | 0100 | 10 | 0 | 1 | Increment |
| 17 | 0100 | 4 | 1 | 0 | Original |
| 18 | 1100 | 5 | 0 | 1 | Increment |
| 19 | 1100 | 12 | 1 | 0 | Original |
| 20 | 0101 | 12 | 0 | 0 | Inhibit |
| 21 | 0101 | 13 | 0 | 1 | Increment |
| 22 | 0101 | 5 | 1 | 0 | Original |

*Note
0 = FALSE
1 = TRUE

It will be observed from Table IV, that an original count, equal to the input address, is obtained each time a TRUE load signal occurs (see lines 1, 2, 7, 10, 14, 15, 17, 19, and 22). It will also be observed that an incremented count, equal to one greater than the previous count, is obtained each time TRUE enable signals occur (see lines 3-6, 8, 9, 11-13, 16, 18, and 21). If the load signal and the enable signals are all FALSE, the counter is inhibited and the count remains unchanged (see line 20). In this invention, the counter does not receive a TRUE load signal and TRUE enable signals simultaneously. However, the counter will be loaded with an original count if the load signal is TRUE regardless of the truth value of the enable signals.

Furthermore, it will be observed that an original count is loaded into the counter RPC in the form of either an external branch address signal transferred from the computer unit CU or an internal branch address signal fed back as a group of output signals of the read-only-memory units ROM1 and ROM2. As will be explained below, the choice between an original count and an incremented count for any particular step in a sequence, is dependent upon the truth value of the output signals of the read-only-memory units ROM1 and ROM2 as well as the truth value of a status signal selected in the data selector SEL. In Table IV, the input address at each line 1, 7, 14, and 17, might be an external branch address signal transferred from the computer unit and the input address at each line 2, 10, 15, 19, and 22, might be an internal branch address signal generated in the read-only-memory units.

Four signals of the output word of the read-only-memory units ROM1 and ROM2 are applied to the branch address multiplexer BAM. The signals on the four internal branch address lines B0 through B3, are shown supplied with internal branch address signals, the external branch address, is transmitted from the computer unit CU through the multiplexer MUX over the input/output bus IOB to the selected peripheral-unit controller PUC and into the microengine unit MEU. These signals are on branch address lines A0 through A3 respectively, and connected as a second set of input signals to the branch address multiplexer BAM.

The output of the branch address multiplexer BAM will correspond to either the internal branch address on lines B0 through B3, or the external branch address on lines A0 through A3. The choice between these two sets of original branch address input signals is made by an output signal of the read-only-memory units ROM1 and ROM2, namely, the Select-Signal-A signal SSA which is transferred to the branch address multiplexer. If the truth value of this signal is 1, the output of the branch address multiplexer corresponds to the external branch address signal. If the truth value of Select-Signal-A signal SSA is 0, the output of the branch address multiplexer corresponds to the internal branch address signal. Typical logic circuitry of such a branch address multiplexer is illustrated at page 318 of Texas Instruments, Inc. publication cited previously.

The branch address multiplexer employed in the embodiment disclosed, may be briefly described as a quadruple 2-line-to-1-line multiplexer that includes two sets of four input lines each, four output lines, and a select signal, the truth value of which determines whether the four signals on one set of input lines or the four signals on the other set of input lines are to be applied to the four output lines. The branch address multiplexer also includes a voltage line, a ground line, and a strobe line, not shown in FIG. 8. The strobe line is not used in this invention and is connected to ground potential. As indicated in FIG. 8, the four input signals, on lines A0 through A3, are applied respectively to four AND gates to which are also applied a once inverted Select-Signal-A signal. The other four input signals, on lines B0 through B3, are applied respectively to four other AND gates to which are also applied a twice inverted Select-Signal-A signal. Thus, the truth value of the Select-Signal-A signal SSA, determines which set of four input signals is applied to the output lines.

The output lines of the branch address multiplexer BAM are connected to the data input lines of the ROM program counter RPC.

The status word, available at the output of the I/O status subunit IOS, is transferred on six separate lines to the data selector SEL of the microengine unit MEU. A control signal from the multiplexer MUX, namely, the command signal CMD, is also transferred to the microengine unit MEU as an input signal to the data selector SEL. In the embodiment of the microengine unit illustrated in FIG. 8, +5 volts DC is applied through a resistor to the eighth input terminal SL17 of the data selector SEL.

The output of the data selector SEL corresponds to a selected one of the eight input signals to the data selector. That selection is dependent upon the truth value of the three data-select bits, which are generated by the controller memory unit CMU. The three data-select signals comprise a 3-bit binary code which, in accordance with the code, logically connects one and only one of the data selector input lines to the one output line of the data selector SEL. More particularly, as an example, of the 3-bit binary code corresponds to a decimal 5, the sixth status line is selected and the signal on that line is applied to the output line of the data selector SEL.

Typical logic circuitry and operation of a data selector SEL are described in more detail at pages 295 and 294 respectively of the Texas Instruments, Inc. publication cited previously.

The data selector employed in the embodiment disclosed, may be briefly described as a one-of-eight data selector that includes eight input lines, three data select lines, two complementary output lines, a voltage line, a ground line, and a strobe line. The latter three lines and one of the two output lines are not shown in FIG. 8. The strobe line is connected to ground potential and the output line, not shown, is not connected. As seen in FIG. 8, the data selector includes an AND gate for each input line. The output of each AND gate is connected to a common OR gate. The truth values of the data select bits correspond to a 3-bit code that enables a selected one of the AND gates. In this manner, any one of the signals applied to the eight input lines may be selected to be applied to the output line.

It is desirable to enable the counter RPC to load either of the two branch addresses (i.e., internal or external) when the truth value of the data-selector output signal is 1. However, some of the data-selector input signals may have a truth value of 1 when they are in a low voltage state, while the other data-selector input signals may have a truth value of 1 when they are in a high voltage state. To accommodate this double standard, or dual polarity, truth value condition, the output line of the data selector SEL is connected to an input line of a select inverter INV, that is, an EXCLUSIVE-OR gate; and a second input signal to the EXCLUSIVE-OR gate is an inverting signal INVT which is generated by the read-only-memory units and has a truth value dependent upon whether the data selector SEL output signal has a truth value of 1 in high voltage state or in low voltage state.

The output line of the select inverter INV is connected to the "load" terminal on the ROM program counter RPC. When the signal applied to the load terminal of the program counter has a truth value of 1, the count of the counter becomes equal to the address corresponding to the signals on the input lines of the counter. However, if instead, the truth value of the signal appearing at the load terminal of the counter is a logical 0, the count of the counter becomes some increment of either an original count or a previously incremented value of an original count which was the previously available count out of the counter. All loading and increment operations occur each time a clock signal CLK is received by the counter RPC.

The counter RPC is incremented when the truth value of the increment enable signal EINC, generated by read-only-memory unit ROM1, is a logical 1. This increment enable signal EINC is transferred to the ROM program counter RPC and is applied to one of the two "count-enable" terminals of the counter as indicated in FIG. 8 (see discussion of Table IV.).

The output of the counter RPC is the input address to the read-only-memory units ROM1 and ROM2 and therefore selects one word of the 32 programmed words available in the read-only-memory units ROM1 and ROM2. Thus, in effect, the output of the counter also determines the truth value of each of the sixteen bits comprising each of the output words of the read-only-memory units.

The controller memory unit CMU is a programmable device which provides a sequence of microcode words wherein the truth value of each of the individual bits of each microcode word is dependent upon the status of one of the status bits comprising a status word and is also dependent on the truth value of programmed signals comprising the preceding word in the sequence of words generated by the controller memory unit.

In the embodiment of the invention disclosed, each of the two read-only-memory units ROM1 and ROM2 is a programmed 256-bit device organized as 32 words, each word having 8 bits. However, since the number of lines out of the controller memory units may typically exceed eight in the embodiments of the invention herein disclosed, two read-only-memory units ROMs are connected together to form a 512-bit read-only-memory unit organized as 32 words, each word having sixteen bits.

In some cases, the number of different control words in any sequence of operations of certain standard peripheral units, is less than or equal to 16. Accordingly, only sixteen words of sixteen bits each need be made available for operation with some particular standard peripheral units. In other words, only half of the capacity of the two read-only-memory units ROM1 and ROM2 is utilized for some of the standard peripheral units. In such cases, either half of the memory unit capacity can be selected for operation with one of two different peripheral devices.

FIG. 9 indicates the manner in which the two read-only-memory units ROM1 and ROM2 are connected together and the manner in which the sixteen words of the available 32 are selected at any one time. The two memory units ROM1 and ROM2 form a controller memory unit CMU.

As indicated in FIG. 9, the read-only-memory units ROM1 and ROM2 each have five input address lines, namely, A1, ..., E1 and A2, ..., E2 respectively, to which is applied a 5-bit binary address signal. The logic circuits of the memory unit CMU are designed so that each 5-bit binary address signal will select one of the 32 possible 8-bit words permanently programmed into each read-only-memory unit ROM. Typical logic circuitry and operation of such read-only-memory units is described in more detail at pages 217 and 216 respectively of the Texas Instruments, Inc. publication cited previously. In addition to the five input address lines and eight output lines of each read-only-memory unit indicated in FIG. 9, each read-only-memory unit also includes a voltage line, a ground line, and an enable line, none of which is shown in FIG. 9. In this invention, the enable line is permanently connected to ground potential.

As indicated in FIG. 9, the respective input address lines of both the read-only-memory units ROM1 and ROM2 are connected together so that the output signals of the ROM program counter RPC, which in combination comprise the controller memory unit address, will be applied to both read-only-memory units as identical addresses.

As previously mentioned, only sixteen of the available 32 words out of each read-only-memory unit need be used in conjunction with some standard peripheral units. With other peripheral units, one set of sixteen words may be used only for input-data transfers and the other set only for output-data transfers. The address, therefore, comprises four signals and is transferred to read-only-memory unit lines $A_1$-$D_1$ and $A_2$-$D_2$. Memory unit terminals E1 and E2 are both tied either to ground or to +5 volts DC depending upon which set of sixteen words is selected for use with a particular peripheral unit PU. In FIG. 9, this tying of the E terminals is shown to be accomplished by connecting the E terminals to a resistor R which is in turn connected to a +5 volt DC source. If a jumper, shown installed between the respective terminals of the jumper plug JPPUC, is omitted, the voltage level at the E terminals will be high and one set of the sixteen words will be selected. If, however, the jumper is installed, thereby connecting the E terminals to ground, the second set of sixteen words will be selected instead. Thus, as shown in FIG. 9, this selection is made manually by either installing the jumper between the terminals of plug JPPUC or by omitting the jumper. Although not shown in FIG. 9, this selection may also be made by means of a mode register flip-flop or mechanical means, such as a manually operated switch. The flip-flop can be controlled remotely by a signal generated in the multiplexer MUX in response to software programming in the computer unit CU. In fact, it is a flip-flop, controlled in this manner, which is employed in the general-purpose and serial peripheral-unit controller GPPUC and SPUC respectively, to provide added software flexibility for control of a single peripheral unit PU. Remote, or programmed, selection of read-only-memory unit word sets, is discussed in conjunction with FIGS. 6 and 12. However, in the parallel-peripheral-unit controllers PPUC, selection of read-only-memory unit word sets, is discussed in conjunction with FIGS. 6 and 12. However, in the parallel-peripheral-unit controllers PPUC, selection of the output word of the read-only-memory units ROM1 and ROM2 is made by means of the jumper indicated in FIG. 9. Thus, in the parallel-peripheral-unit controller PPUC, the jumper is utilized to select two completely different sets of sixteen control words and thus two different sets of instructions, each set being suitable for operation of a different peripheral unit PU.

It will be apparent therefore that either of two completely different peripheral devices may be connected to the parallel-peripheral-unit controllers PPUC, and that the distributed input/output system DIOS will provide two completely different sets of instructions, one set for each different type of device, without any change in configuration other than the installation or removal of the jumper JPPUC shown in FIG. 9.

It will be seen hereinafter that in serial-peripheral-unit controllers SPUC, the E terminals of the read-only-memory units ROM1 and ROM2 are connected to the data handling circuits and the selection of one or the other of the two 16-word portions of the read-only-memory units is dependent on the truth value of a signal generated by a mode register SMR.

Table V indicates the data format for the full 16-bit signal appearing at the output of the controller memory unit CMU, with the most significant bit at the left and the least significant bit at the right. The first three most significant bits constitute respectively the invert signal INV which is generated by the read-only-memory units for the purpose of providing a selectable input signal to the select inverter INVT in the microengine unit MEU; the increment enable signal EINC which is generated by the read-only-memory units for the purpose of enabling an increment operation in the ROM program counter RPC; and the Select Signal A signal SSA which is transferred to the branch address multiplexer BAM for the purpose of selecting the external branch address for loading into the ROM program counter RPC.

The next three most significant bits are respectively, peripheral-unit control signals T0, T1, and T2, which are transferred to the peripheral unit PU after passing through control signal drivers CONDRV (in FIGS. 5-7). The next significant bit, namely bit No. 9 in Table V, is a byte select signal BSS which is transferred to the data-in drivers INDRV for the purpose of enabling either one of the two sets of eight drivers corresponding to the two bytes of data which may be transferred from the peripheral unit into the computer unit.

The next two significant bits in the read-only-memory output word, namely bits 7 and 8 in Table V, are the data-service-interrupt signal and end-of-block-interrupt signal respectively. Bits 4, 5, and 6 of the controller memory unit output word are the data-select bits which are transferred to the data selector SEL for the purpose of choosing one of the eight input signals, six of which signals usually comprise the status word, as previously described in conjunction with FIG. 8.

The remaining four bits of the controller memory unit CMU output word, namely bits 0-3 in Table V, comprise the internal branch address which is transferred to input lines B0, ..., B3 of the branch address multiplexer BAM and, if selected by the read-only-memory units, is transferred to the ROM program counter RPC to provide a new original count as previously described in conjunction with FIG. 8 and Table IV.

DETAILED DESCRIPTION OF MULTIPLEXER MUX

Figure 10A:
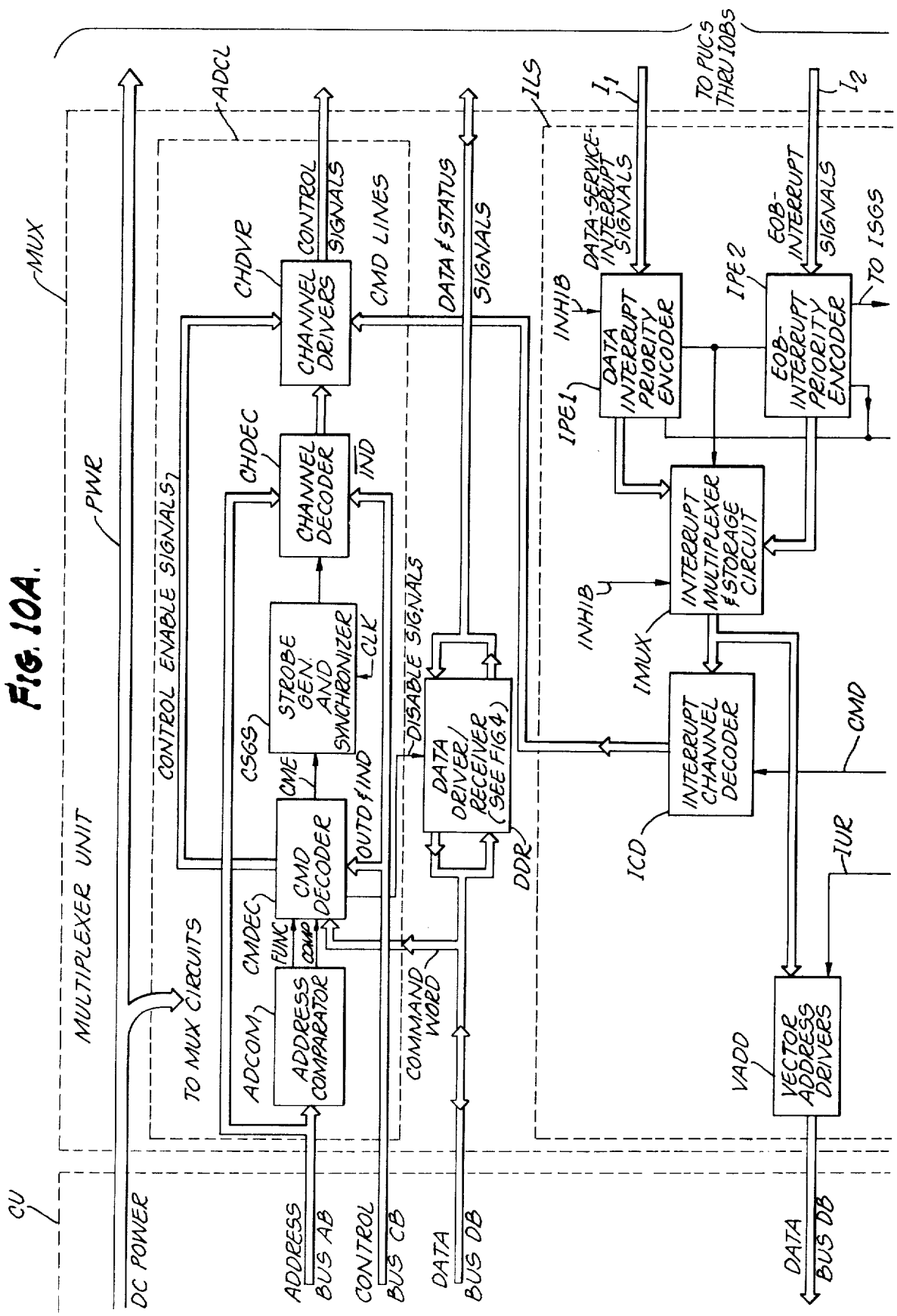
FIGS. 10A and 10B are to be combined.
Figure 10B:
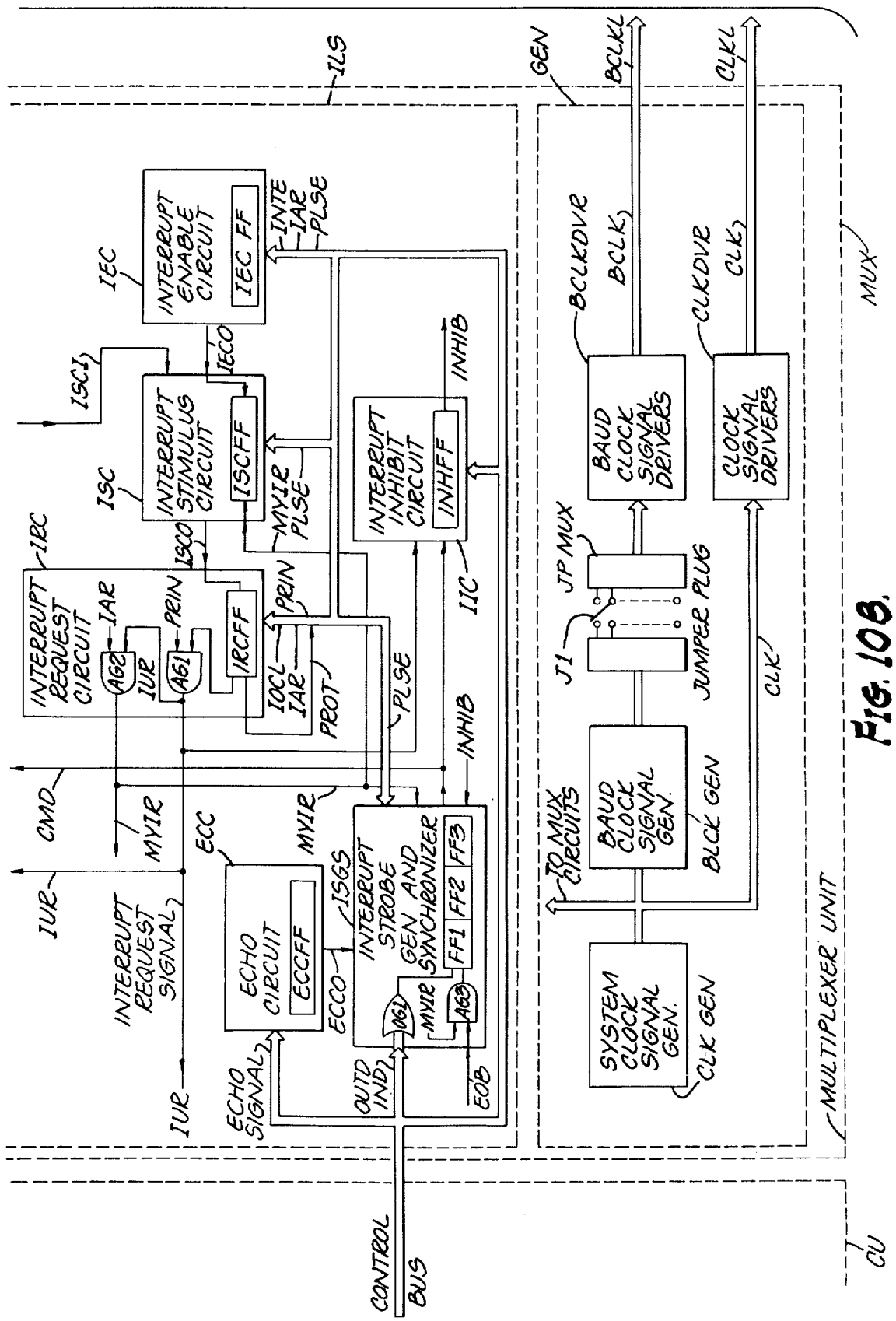

The foregoing general description employing simplified block diagrams of the multiplexer MUX and the different versions of the peripheral-unit controllers, provided a general overview of the concepts and configurations of the distributed input/output system DIOS. FIGS. 10 through 16 will be referred to for a more detailed description of the multiplexer MUX, peripheral-unit-controllers PUCs and input/output buses IOBs. It is to be noted in this respect that FIGS. 10A and 10B together comprise a detailed block diagram of the multiplexer MUX of the invention. FIG. 10 (see drawing Sheet 5) illustrates the manner in which FIGS. 10A and 10B are to be combined.

Referring now to FIGS. 10A and 10B, there is illustrated therein a detailed block diagram of the multiplexer MUX.

At the uppermost portion of the multiplexer block diagram is shown a power line PWR used to transfer DC power from power supply PS in the computer unit CU into the multiplexer MUX, for use by multiplexer

TABLE V

| MICROCODE FORMAT | | | | | | | | | | | | | | | | |
|---|---|---|---|---|---|---|---|---|---|---|---|---|---|---|---|---|
| ROM 1 | | | | | | ROM 2 | | | | | | | | | | |
| 15 | 14 | 13 | 12 | 11 | 10 | 9 | 8 | 7 | 6 | 5 | 4 | 3 | 2 | 1 | 0 | BIT No. |
| OP CODE | | | CONTROL SIGNALS | | | | INTR SIG- NALS | | DATA SEL SIG- NALS | | | INTERNAL BRANCH ADDRESS | | | | FIELDS |
| I N V | E I N C | S S A | T 2 | T 1 | T 0 | *B S S | I N S 2 | I N S 1 | D S 2 | D S 1 | D S 0 | 1 B A 3 | 1 B A 2 | 1 B A 1 | 1 B A 0 | FUNCTION BITS |

*Bit 9 is not used in serial controllers
Negation sign indicates signal is TRUE when = 0 circuits, and also into the input/output buses IOB1, ..., IOB8, through which power is transferred to the respective peripheral-unit controllers PUCs.

The address-decoder and control-logic subunit ADCL is shown at the upper portion of FIG. 10A. This subunit determines whether or not the computer is addressing the particular multiplexer MUX, determines which of the peripheral-unit controllers the computer is addressing, determines whether the multiplexer will transfer either data signals or control signals, and determines what type of control signal, if any, is being generated by the computer for transmission to a selected peripheral-unit controller PUC.

To accomplish these functions, the address-decoder and control-logic subunit ADCL receives information signals over all three main buses of the computer unit CU, namely, the address bus AB, the control bus CB, and the data bus DB.

The address-decoder and control-logic subunit ADCL includes an address comparator ADCOM, a command decoder CMDEC, a strobe generator and synchronizer CSGS, a channel decoder CHDEC, and channel drivers CHDVR. The address comparator ADCOM receives from the address bus AB, four signals that represent the address of the multiplexer unit selected by the computer unit CU in accordance with software instructions.

The output signal COMP of the address comparator ADCOM will be at a high level, if and only if, the four address signals correspond to the multiplexer MUX address that has been software programmed into the computer unit CU and that has also been hardware programmed into the multiplexer MUX by jumpers installed within the address comparator ADCOM. Unless the output signal of the address comparator ADCOM is at a high level, none of the channel drivers CHDVR or data drivers will be enabled and therefore there will be no transmission of control signals or data signals to any of the peripheral-unit controllers PUCs connected to the multiplexer MUX. In the embodiment disclosed herein, the address comparator comprises four EXCLUSIVE-OR gates and a four input line AND gate. The four address signals are each applied to one input line of an EXCLUSIVE-OR gate, the second input line of which is connected to either +5 volts or ground. The output lines of four EXCLUSIVE-OR gates are applied to the AND gate. The truth value of the output signal of the AND gate is TRUE only when the four address signals correspond to the selected combination of truth values of the respective second input signals of the EXCLUSIVE-OR gate.

As indicated in FIG. 10A, the address bus AB is also connected to a channel decoder CHDEC. Three lines of the address bus, namely, AB01, AB02, and AB03, are connected to the channel decoder CHDEC, to transfer three signals, or bits, corresponding to the address of a selected peripheral-unit controller PUC that is connected to a selected peripheral unit PU.

Also included in the address-decoder and control-logic subunit ADCL is a command decoder CMDEC which decodes computer-unit command words to generate corresponding enabling signals in the multiplexer MUX. The enabling signals activate one of the plurality of control signals previously enumerated, which signal is transmitted to the selected peripheral-unit controller PUC.

To accomplish this decoding operation, the command decoder CMDEC is connected to the data bus DB from which it receives command-word data signals to initiate a reset signal, a command, signal, or a select signal. The command decoder also receives an output-data transfer signal OUTD from the control bus when the computer communicates with one of the peripheral-unit controllers. The command decoder CMDEC, by way of example, may be a Texas Instruments, Inc. Model 74188 read-only-memory device that is preprogrammed to generate control enable signals in accordance with the command-word signals it receives from the computer unit. This read-only-memory device may be the same as the units employed for read-only-memory units ROM1 and ROM2 and previously described in conjunction with FIG. 9. (See page 414 of Texas Instruments, Inc. publication cited previously.)

The data-out signal OUTD is generated by the computer unit CU whenever data or control signals are about to be transferred out to a peripheral-unit controller PUC. In response to the OUTD signal, the command decoder CMDEC will generate the receiver disable signal to deactivate the data receivers, as previously described in conjunction with FIG. 4. As previously mentioned, the command decoder CMDEC receives an address-comparator output signal COMP from the address comparator ADCOM. It also receives a function control signal FUNC from the address comparator. The function control signal FUNC is appended to the input address signals to the command decoder and indicates whether the transfer operation between the computer unit CU and the peripheral-unit controller PUC is to involve data signals or control signals.

As indicated in FIG. 10A, one output line CME of the command decoder CMDEC is connected to the strobe generator and synchronizer CSGS. This CME line is utilized to disable the strobe generator and synchronizer any time the address comparator ADCOM indicates that the multiplexer MUX is not the particular multiplexer being addressed by the computer unit CU.

The command decoder CMDEC also provides output enable signals to the channel drivers CHDVR and the data drivers to enable those drivers for the transmission of control signals and data signals respectively, to a peripheral-unit controller.

The channel decoder CHDEC is a 3-line-to-8-line decoder, such as a Texas Instruments, Inc. Model 74155 Decoder/Demultiplexer which is described beginning at page 312 of the Texas Instruments, Inc. publication cited previously. The truth values of the signals on address bus AB lines AB01, AB02, and AB03, correspond to one of the eight peripheral-unit controllers connected to the multiplexer MUX. However, the decoder will generate an output signal only if it also receives an input signal from the strobe generator and synchronizer CSGS, as well as a computer unit inverted input-data signal IND, generated by the computer unit CU. The inverted input-data signal indicates that an input data operation is not taking place at that time.

Immediately below the address decoder and logic subunit ADCL in FIG. 10A, is the data driver/receiver subunit DDR, the details of which have already been described in conjunction with FIG. 4. As previously explained, the data driver/receiver subunit DDR comprises a plurality of transceiver integrated circuit chips TIC, each of which is configured to drive data being transferred in either direction between the computer unit CU and a selected peripheral-unit controller PUC. As indicated in FIG. 10A, the data driver/receiver subunit DDR receives disable control signals from the Command Decoder CMDEC. As previously explained in conjunction with FIG. 4, the selection of a disable control signal depends upon the direction of data transfer.

Interrupt Logic

The interrupt logic subunit ILS is shown in FIG. 10A, immediately below the data driver/receiver subunit DDR, and in the upper part of FIG. 10B.

As shown on the right side of FIG. 10A, two sets of lines, I1 and I2, are employed by the multiplexer MUX to receive interrupt signals from the peripheral-unit controllers PUCs. Since each peripheral-unit controller PUC can generate two interrupt signals, namely, a data-service-interrupt signal and an end-of-block-interrupt signal, there are a total of sixteen lines, eight I1 lines from eight peripheral-unit controllers. PUCs, for transferring data-service-interrupt signals, and eight I2 lines from eight peripheral-unit controllers, for transferring EOB-interrupt signals. Unlike the status signals and the data signals, interrupt signals are transferred from a peripheral-unit controller PUC to the multiplexer MUX using tri-state drivers or open-collector drivers in the read-only-memory units ROM1 and ROM2. Transfer of status signals and data signals involves the use of tri-state drivers.

The two sets of eight interrupt signals I1 and I2, are each connected to a priority encoder IPE1 and IPE2 respectively. Each priority encoder generates corresponding unique 3-bit binary address signals which correspond to one of the eight possible peripheral-unit controllers PUCs that has generated an interrupt signal.

When two or more interrupt signals are transferred to the multiplexer MUX and are present at the input lines to the multiplexer concurrently, the priority encoder generates the binary address corresponding to the lower PUC number having the highest priority interrupt signal. Thus, the priority of peripheral units is established by the order in which respective peripheral-unit controllers are connected to the multiplexer. The order of priority among the eight peripheral units connected to a particular multiplexer is easily changed by simply changing the physical order in which the connector-plugs of the respective input/output buses IOBs are connected to the respective mating plugs on the multiplexer printed-circuit board PCB (see FIG. 2).

In addition to the interrupt signal priority established within each interrupt priority encoder IPE1 and IPE2, the interconnection between respective priority encoders, namely, the data-service-interrupt priority encoder IPE1 and the EOB-interrupt priority encoder IPE2, establishes a data-service-interrupt signal priority that is higher than all EOB-interrupt signals. Therefore, if any of the data-service-interrupt lines is activated by an interrupt signal produced by any one of the eight peripheral-unit controllers PUCs connected to the multiplexer MUX, that data-service-interrupt signal is processed by the computer unit CU before the computer unit responds to any simultaneously transmitted EOB-interrupt signal.

The 3-bit output address signals of each of the interrupt priority encoders IPE1 and IPE2 is connected to an interrupt-multiplexer and storage circuit IMUX. This circuit IMUX stores interrupt-3-bit address signals generated by the data-interrupt-priority encoder IPE1 or the EOB-interrupt-3-bit signal generated by the EOB-interrupt-priority encoder IPE2. The IMUX also stores a bit to indicate the type of interrupt, data or EOB, depending upon which type of interrupt signal has arrived at the multiplexer MUX. As previously indicated, if both a data-service-interrupt signal and an EOB-interrupt signal are generated concurrently, the data-service-interrupt signal is given priority. Each priority encoder, by way of example, may be a Texas Instruments, Inc. Model 74148 8-line-to-3-line Priority Encoder, the logic circuitry and operation of which are described at pages 291 and 290 respectively, of the Texas Instruments, Inc. publication cited previously.

The output of the interrupt-multiplexer and storage circuit IMUX is a 4-bit signal. The truth value of one of the four bits depends upon whether the interrupt signal is a data-service-interrupt signal or an EOB-interrupt signal. The truth values of the other three bits of the 4-bit signal depend on which one of the eight possible lines in the respective sets I1 or I2 the interrupt signal is transferred to the multiplexer and thus upon the relative placement of the connection of the input/output bus IOB connected to the peripheral-unit controller PUC from which the interrupt signal was generated and transferred to the multiplexer. The interrupt-multiplexer and storage circuit IMUX, by way of example, may be a Texas Instruments, Inc. Model 74298 Quadruple 2-Input Multiplexer with Storage, the logic circuity and operation of which are described at page 505 of the Texas Instruments, Inc. publication cited previously.

Since the 4-bit output signal of the interrupt-multiplexer and storage circuit IMUX is unique for each interrupt signal, it is used unambiguously as an interrupt-signal address that is transferred to the computer unit CU to provide access to preselected memory cells in the main-memory unit MMU. The output of the interrupt-multiplexer and storage circuit IMUX is connected to a plurality of vector address drivers VADD, the output signals of which are transferred to the computer unit CU over the data bus DB (see Table II).

After an interrupt signal is processed by the multiplexer and computer unit, the processed interrupt signal will be reset or cleared in the peripheral-unit controller PUC from which it was generated. This resetting operation, the details of which are described below, employs the transfer of a command signal CMD from the multiplexer MUX to the particular peripheral-unit controller PUC involved.

It is the function of the interrupt channel decoder ICD to enable the proper command signal CMD for the purpose of resetting the interrupt signal already processed by the multiplexer MUX and computer unit CU. Therefore, the interrupt-multiplexer and storage circuit IMUX also generates 3-bit output address signals which are transferred to the interrupt channel decoder ICD. The interrupt channel decoder ICD interprets the 3-bit address signals generated by the interrupt multiplexer and storage circuit IMUX and generates one of eight peripheral-unit-controller PUC command signals CMD which is transferred to the command channel drivers CHANDVR located in the address decoder and control logic subunit ADCL and is then transferred to the data selector SEL in the microengine unit MEU of the peripheral-unit controller PUC that generated the processed interrupt signal. The read-only-memory units ROM1 and ROM2 are programmed to respond to receipt of the command signal CMD to clear the interrupt signal.

The interrupt channel decoder ICD, by way of example, may be a Texas Instruments, Inc. Model 74155 Dual 2-line-to-4-line Decoder/Demultiplexer, the logic circuitry and operation of which are described in more detail at page 313 of the Texas Instruments, Inc. publication cited previously.

The remaining interrupt logic circuitry represented in FIG. 10B, includes an interrupt enable circuit IEC, an interrupt stimulus circuit ISC, an interrupt request circuit IRC, an echo circuit ECC, an interrupt inhibit circuit IIC, and an interrupt strobe generator synchronizer ISGS.

Interrupt signal addresses are not accepted by the computer unit CU until the multiplexer MUX generates an interrupt request signal IUR which is transferred to the computer unit, and until the computer unit generates an interrupt address request signal IAR which is transferred to the multiplexer. The computer unit CU issues an enable signal INTE to the interrupt enable circuit IEC after the computer unit has processed any prior interrupt signal. However, the computer unit CU may also be programmed to selectively enable and disable the interrupt enable circuit IEC according to which peripheral-unit controllers are generating interrupt signals. In this way, selected interrupt signals can be masked or ignored in accordance with software programming. When the interrupt enable circuit IEC is enabled, it generates an output signal IECO which is applied to the interrupt stimulus circuit ISC. The interrupt stimulus circuit ISC will in turn generate an output signal ISCO if either interrupt priority encoder IPE1 or IPE2, has received an interrupt signal from a peripheral-unit controller PUC.

If an interrupt signal has been received by either of the encoders IPE1 or IPE2 and the interrupt enable circuit IEC has been activated by the computer unit CU, the interrupt stimulus circuit ISC will generate an output signal ISCO which is transferred to the interrupt request circuit IRC. The interrupt request circuit IRC will then and only then generate an interrupt request signal IUR at its output. The interrupt request signal IUR is transferred onto a common interrupt request line that is part of the control bus CB. The interrupt request signal is, in effect, a signal employed by the multiplexer MUX to "notify" the computer unit CU that an interrupt signal has been generated by a peripheral-unit controller and is available for processing by the computer unit. If two or more peripheral-unit controllers PUCs, each connected to a different multiplexer, generate an interrupt signal at about the same time, the computer unit CU recognizes the highest priority multiplexer that has generated an interrupt request signal IUR.

Thus, in addition to the internal priority system established for multiple interrupt signals generated by a plurality of peripheral-unit controllers, each of which is connected to the same multiplexer MUX, there is also an external priority system established for a plurality of multiplexers or for other combinations of input/output systems, some of which do not use a distributed input-/output system DIOS. By being dependent upon the external priority system, the interrupt request signal IUR will be recognized by the computer unit CU only when higher priority input/output devices are not generating interrupt signals. Furthermore, when the multiplexer generates an interrupt request signal IUR, all lower priority device interrupt circuitry is disabled by the higher priority multiplexer MUX.

Shortly after the interrupt request signal IUR is generated, the computer unit CU accepts the interrupt address signals on the data bus DB and it is during this time that the interrupt address signals are directed or vectored to preselected addresses in the main-memory unit MMU.

The memory cells in the main-memory unit MMU to which the particular data-service interrupt signal has been vectored, contain an interrupt instruction which has been preprogrammed to provide access to other locations in the main-memory unit MMU that provide the central processor unit CPU with a data buffer address, a data transfer count, and information regarding the type of operation to be performed with the peripheral unit for which the interrupt signal has been generated (i.e., output or input). The central processor unit CPU responds to the operation to be performed and transfers programmed data signals stored in the main-memory unit to the selected peripheral-unit controller PUC using a data buffer address pointer and a transfer count. After each data transfer, the buffer pointer and transfer count are decremented by the central processor unit CPU. When the transfer count equals 0, indicating that the last term of a particular data block has been transferred, the central processor unit CPU is programmed to fetch an instruction which causes the generation of an echo signal ECHO by the central processor unit. Data transfers into the computer unit are accomplished in a manner similar to the output transfer just described. The process of transferring data signals into or out of the computer unit CU using programmed instructions including buffer pointers and transfer counts, is called an automatic input/output operation.

General operation per se and configuration per se of the computer unit CU that relate to interrupt signal processing and the use of automatic input/output instructions, are old in the computer art and are not to be considered within the scope of the invention. Therefore, a detailed description of interrupt signal processing and automatic input/output instructions that are generated in response thereto within the computer unit CU is not included herein. Such detailed descriptions are available, however, from digital computer manufacturers. One such detailed explanation may be found at pages 3-35 through 3-37 of a document entitled "Naked Mini LSI/Alpha LSI Engineering Specification" No. 10080-00A0, April 1973, published by Computer Automation, Inc., of Irvine, California. Additional explanation of automatic input/output instruction processing by a computer unit CU, may be found in chapter 13 of "Computer Technicians Handbook" by Brice Ward, published by the Tab Book Company in 1971.

As indicated in FIG. 10B, the echo signal ECHO, generated by the computer unit CU, is applied to an echo circuit ECC in the selected multiplexer MUX. The output signal of the echo circuit ECC is transferred to the interrupt strobe generator and synchronizer ISGS. In response thereto, the duration of the strobe output signal is doubled. The strobe output signal is applied to the interrupt channel decoder ICD as shown in FIG. 10B. This has the effect of increasing the duration of the command signal CMD to twice its usual length. This extended command signal is interpreted by the peripheral-unit controller PUC to which it is directed, to indicate that the transfer count has reached zero and that the data transfer that had just taken place was the last one.

In response to a double duration command signal CMD representing a data transfer count of 0, the peripheral-unit controller PUC immediately generates an EOB-interrupt signal which is transferred to the central processor unit CPU of the computer unit CU. This is accomplished by the microengine unit MEU. As previously noted in the description of FIG. 8, the command signal is one of the eight signals applied to the input lines of data selector SEL. After generating a data service interrupt signal, the microengine unit is programmed to select the data selector SEL input line to which the command signal CMD is applied. If the command signal CMD is only of nominal duration, namely, 250 nanoseconds, the microengine unit MEU resets or erases the interrupt signal generated previously and then repeats a data transfer operation in accordance with the microcode or firmware program in the controller memory unit CMU. However, if the command signal CMD is of double duration, namely, 500 nanoseconds, the microengine unit MEU, resets or erases the previous interrupt signal and then generates an end-of-block-interrupt signal in accordance with the firmware program in the controller memory unit CMU.

The end-of-block-interrupt signal is processed through the multiplexer MUX in much the same way that the data-service-interrupt signal is processed and is vectored to other preselected memory cells in the main-memory unit MMU which results in the termination of the input/output transfer operation.

After the computer unit generates the interrupt address request signal IAR in response to receipt of the interrupt request signal IUR, the inhibit circuit IIC, shown in FIG. 10B, is activated by a signal developed in the interrupt request circuit IRC in a manner described below, and in response, generates an inhibit signal INHIB. The inhibit signal is transferred to the interrupt priority encoders IPE1 and IPE2, to the interrupt multiplexer and storage circuit IMUX, and to the interrupt strobe generator and synchronizer ISGS to disable these circuits while the computer unit CU and multiplexer MUX process the interrupt sequence already initiated. The inhibit circuit IIC thus provides the means for precluding interference with interrupt signal processing already under way, although new and perhaps higher priority interrupt signals are being received by the multiplexer MUX from other peripheral-unit-controllers PUCs.

The inhibit circuit IIC continues to apply an inhibit signal INHIB to the aforementioned circuits until the computer interrupt signal processing is completed.

When the processing of an interrupt signal is completed, the interrupt request signal IUR and interrupt address request signal IAR, generated previously during the prior interrupt sequence, are reset and the inhibit circuit IIC is reset and the inhibit signal INHIB is removed from the aforementioned circuits. When the inhibit circuit IIC is reset, the interrupt logic subunit ILS is ready to process new peripheral-unit controller PUC interrupt signals.

The interrupt strobe generator and synchronizer ISGS provides a clock rate for interrupt operations.

As indicated in FIG. 10B, the interrupt enable circuit IEC, the interrupt stimulus circuit ISC, the interrupt request circuit IRC, the interrupt inhibit circuit IIC, and the echo circuit ECC, each includes a flip-flop, namely, IECFF, ISCFF, IRCFF, IICFF, and ECCFF respectively. Each such flip-flop is commonly referred to as a D-Type flip-flop. One such D-Type flip-flop is part of a Texas Instruments, Inc. Model 7474 Integrated Circuit Device. (See page 16 of Texas Instruments, Inc. publication cited previously.) Operation of a D-Type flip-flop circuit is explained at page 22 of "Minicomputers for Engineers and Scientists" by Korn, published by the McGraw-Hill Book Co. in 1973.

As is commonly known to those of ordinary skill in the computer art, the signal on output lines of a flip-flop, such as the interrupt stimulus flip-flop ISCFF, will be set to correspond to the signal on the drive line when a clock input signal to the flip-flop is enabled. The clock input signal ISCI is applied to the interrupt stimulus flip-flop ISCFF when either interrupt priority encoder IPE1 or IPE2 receives an interrupt signal and generates the output signal ISCFF.

The interrupt stimulus flip-flop ISCFF is reset upon the simultaneous occurrence of a My Interrupt Request signal MYIR, generated in the interrupt request circuit IRC in response to an acceptance by the computer unit CU of an interrupt request signal IUR, and a Computer Strobe Pulse signal PLSE. The interrupt stimulus flip-flop ISCFF is also reset when the priority encoders IPE1 and IPE2 both generate output signals that indicate that neither encoder is receiving an interrupt signal. Thus, as soon as the computer unit accepts the Interrupt Request Signal IUR, the interrupt stimulus flip-flop ISCFF is reset by the multiplexer MUX and made ready for response to a subsequent interrupt signal. The output signal ISCO of the interrupt stimulus flip-flop ISCFF is applied to the drive line of the interrupt request flip-flop IRCFF. The clock input line of the interrupt request flip-flop IRCFF receives an Input-/Output Clock signal IOCL which is generated by the programmed computer unit CU. The output signal of the interrupt request flip-flop IRCFF is applied to one input line of an AND gate AG1, within the interrupt request circuit IRC as indicated in FIG. 10B. A second input signal applied to AND gate AG1 is the Priority-In signal PRIN (see Table I) and both input signals must be present before an Interrupt Request signal IUR is generated. A Priority-In signal PRIN, derived from higher priority I/O devices and multiplexers, will not be present unless all such higher priority I/O devices and multiplexers that are connected to the computer unit CU, have inactive interrupt circuits. The Priority-In signal PRIN, therefore, establishes the priority of interrupt operations among a plurality of distributed input/output systems.

A Priority-Out signal PROT is generated by the interrupt request flip-flop IRCFF and when in a high or logical one state, the Priority-Out signal PROT disables the interrupt circuitry of all lower priority interrupts from I/O devices and multiplexers that are connected to the computer unit CU.

The interrupt request flip-flop IRCFF remains in a true or in a logical one state for the entire duration of the interrupt sequence to maintain the Priority-Out signal PROT constant until interrupt servicing is completed and thus prevents interference by the interrupt signal processing of lower priority devices. The My Interrupt Request signal MYIR is produced at the output of AND gate AG2, the input signals to which comprise the Interrupt Request signal IUR and the Interrupt Address Request signal IAR. Thus, the My Interrupt Request signal MYIR indicates that the computer unit has applied an Interrupt Address Request signal IAR to the multiplexer MUX and has thereby accepted the Interrupt Request signal IUR. When the Interrupt Address Request signal IAR and My Interrupt Request signal MYIR are generated, the interrupt signal address is vectored from the vector address drivers VADD (shown in FIG. 10A) onto the data bus DB and into the main-memory unit MMU. The interrupt signal address comprises fifteen data-signals, of which eight are presently connected to ground and are thus in a zero state, of which three are established by jumper wires (not shown), and of which four are dependent upon the output signals of the interrupt multiplexer and storage circuit IMUX. Thus, the interrupt signal address is dependent upon whether the interrupt signal is a data-service-interrupt signal or an EOB-interrupt signal, and upon which peripheral-unit controller PUC generated the interrupt signal.

After an interrupt sequence has been completed, the computer unit CU again generates an Input/Output Clock signal IOCL to reset the interrupt request flip-flop IRCFF. The interrupt stimulus flip-flop ISCFF will have already been reset by the simultaneous occurrence of the Computer Strobe pulse signal PLSE and by My Interrupt Request signal MYIR generated at the time the computer unit accepted the Interrupt Request signal IUR.

During the interrupt processing sequence, new interrupt operations in the multiplexer MUX are inhibited until the ongoing interrupt sequence has been completed. To accomplish this inhibit mode, My Interrupt Request signal MYIR, which is the signal that indicates that the computer has accepted the Interrupt Request signal IUR, is transferred to an inhibit flip-flop INHFF (see FIG. 10B) in the interrupt inhibit circuit IIC to set the inhibit circuit output signal INHIB. The inhibit signal INHIB is transferred to the priority encoders IPE1 and IPE2 to prevent new interrupts from changing the address contents of the interrupt multiplexer and storage circuit IMUX during the ongoing interrupt sequence. Use of an inhibit signal INHIB in this manner permits interrupt signal processing in an orderly manner without a loss of any peripheral-unit controller PUC pending interrupt signal requests.

The command signal CMD generated by the multiplexer MUX serves the purpose of initializing operation of a selected peripheral-unit controller PUC, in response to a command word transferred from the computer unit CU on the data bus DB. However as previously noted, the command signal CMD is used also as a means of resetting peripheral-unit controller PUC interrupt signals and as a means of informing the selected peripheral-unit controller PUC that an ending condition has occurred such as transfer count has reached 0, thus indicating that the last byte of information has been transferred.

Ordinarily the command signal CMD used for resetting of a peripheral-unit controller PUC interrupt signal is 250 nanoseconds in duration. However, when the transfer count has reached 0 during an interrupt operation, the command signal is 500 nanoseconds in duration. This elongated command signal CMD is interpreted by the peripheral-unit controller PUC to indicate that the last byte of data has been transferred so that the peripheral-unit controller PUC can generate an EOB-interrupt signal. The end-of-block interrupt signal is transferred to the computer unit CU causing a peripheral-unit controller PUC interrupt sequence to be initiated and operation of the peripheral unit to be terminated.

The interrupt strobe generator and synchronizer ISGS comprises three flip-flops FF1, FF2, and FF3, connected in a cascade configuration whereby a 500 nanosecond command signal may be produced. However, the output signal ECHO of the echo circuit flip-flop ECCFF will terminate the command signal after a duration of 250 nanoseconds if flip-flop ECCFF has not been set by an ECHO signal generated by the computer unit CU. If the transfer count has not reached zero, thus indicating that there is still more data to be transferred, the computer unit CU will, in accordance with software programmed instructions, refrain from generating an ECHO signal. Therefore, ECHO signal will not be generated by the computer unit CU after an interrupt signal has been processed and in that case, the echo circuit flip-flop ECCFF will generate an output signal to prematurely terminate the output signal of the interrupt strobe generator and synchronizer so that it is only 250 nanoseconds in duration. However, if the transfer count has reached zero during the data interrupt sequence, the computer will generate the ECHO signal and the multiplexer MUX output signal ECCO of the echo flip-flop EECFF will not prematurely terminate the command CMD signal of the interrupt strobe generator and synchronizer. The strobe generator will therefore generate the elongated command signal CMD of 500 nanoseconds.

The inhibit signal INHIB is applied to the first of the three flip-flops FF1 to set its output line to a logical one. The interrupt strobe generator and synchronizer ISGS cannot generate an output signal CMD during non-interrupt operations since the inhibit signal INHIB will not be available to set the drive line of the first of the flip-flops FF1.

The clock input signal applied to the first flip-flop FF1 is the output signal of an OR gate OG1, the input signals of which are the data-out signal OUTD and the data-in signal IND. After each data interrupt operation, the next control signal generated by the computer unit CU must be either the data-out signal, which corresponds to an output data operation, or a data-in signal IND which corresponds to an input data operation. Data will be transferred either into or out of the main-memory unit MMU in response to a data-service-interrupt signal. In this way, either one of the two signals, OUTD or IND, will enable the first flip-flop FF1 of the strobe generator causing it to generate a positive command signal CMD after the interrupt sequence has been completed by the computer unit and the inhibit signal INHIB has been applied to the drive line of the first flip-flop FF1.

The first flip-flop FF1 of the interrupt strobe generator and synchronizer ISGS, may also be set by the output signal of an AND gate AG3, the input signals of which are the My Interrupt Request signal MYIR and an end-of-block signal EOB. This is an alternative means for setting the output of the first ISGS flip-flop FF1 positive when the interrupt signal is an ending or end-of-block interrupt signal. This alternative means is used, since after an EOB-interrupt signal is processed, data or status signals might not be transferred between the computer unit CU and the multiplexer MUX, depending on the software program, and therefore neither a data-out signal OUTD nor a data-in signal IND would be generated immediately.

As previously indicated the My Interrupt Request signal MYIR occurs when the computer has accepted the interrupt request signal IUR and generated an interrupt address request signal IAR. Therefore, if the interrupt signal is an EOB-interrupt signal, the first flip-flop FF1 of the interrupt strobe generator and synchronizer ISGS will be set positive immediately upon acceptance by the computer unit CU of the interrupt request signal IUR, regardless of the state of the inhibit flip-flop INHFF.

The other two flip-flops FF2 and FF3 in the interrupt strobe generator and synchronizer ISGS, are used to produce a periodic synchronizing signal and are switched by the system clock signal CLK, which is also the clock signal for all peripheral-unit controllers PUCs. The output signal of the third flip-flop FF3 is used to reset the first flip-flop FF1 and in this manner the strobe generator is reset after each command signal CMD has been generated to reset the interrupt signal of a peripheral-unit controller PUC.

Indicated in the lower portion of FIG. 10B are the circuit elements comprising the system clock signal generator GEN which include drivers CLKDVR and BCLKDVR for system clock signals CLK and baud clock signals BLK respectively.

The system clock signal CLK is transferred on IOB lines CLKL in all of the input/output buses IOB1, . . . , IOB8 (see FIG. 10B) to all of the peripheral-unit controllers PUCs to provide a synchronizing signal for all peripheral-unit contoller operations.

On the other hand, the baud clock signal BCLK, which is transferred on IOB lines BCKL to all peripheral-unit controllers, is used only in serial-peripheral-unit controllers SPUCs to provide a clocking source for the universal asynchronous receiver/transmitter UART. The baud clock rate is usually sixteen times the basic clock frequency of the peripheral device to which the peripheral-unit controller PUC is connected. The clock signal generator GEN provides a plurality of baud clock signals each with a different rate to permit selection of the proper baud clock rate for a particular serial-peripheral-unit SPUC. Each baud clock signal is fed to a separate terminal on a jumper plug JPMUX. The proper baud clock rate for a particular peripheral unit may be selected by means of a wire jumper, such as J1 shown in FIG. 10B, to transfer the selected baud clock signal to the terminal corresponding to the peripheral-unit controller PUC to which the serial peripheral device is connected.

Thus, by means of the invention herein disclosed, any one of a plurality of different baud clock signals can be transferred to each of a plurality of peripheral-unit controllers connected to a common multiplexer.

As indicated in FIG. 10B, the clock generator GEN also provides system clock signals CLK to circuits within the multiplexer MUX. In the multiplexer MUX, system clock signals CLK are used to permit synchronization of multiplexer operations and peripheral-unit controller operations.

DETAILED DESCRIPTION OF THE PARALLEL-PERIPHERAL-UNIT CONTROLLER

Figure 11:
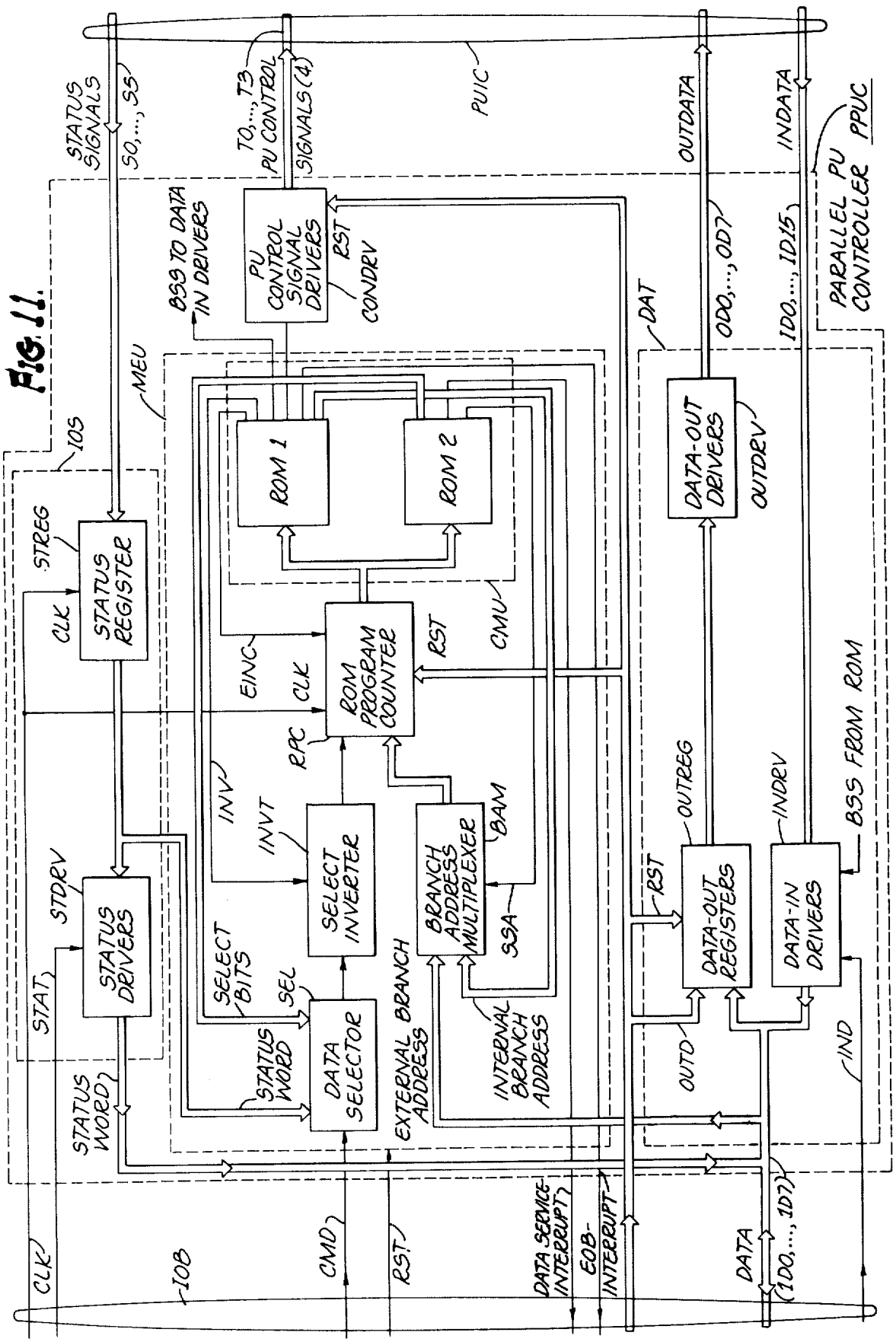
FIG. 11 is a similarly detailed block diagram of the parallel-peripheral-unit controller.

Referring now to FIG. 11, which is a more detailed block diagram of the parallel-peripheral-unit controller PPUC illustrated in FIG. 5, it will be evident that on the left side of the diagram are the various signal lines comprising the input/output bus IOB, which connect the peripheral-unit controller to the multiplexer MUX, and that on the right side of the diagram are the various signal lines comprising the peripheral-unit-interface cable PUIC, which connects the peripheral-unit controller to a parallel peripheral unit PU. It will be observed, that microengine unit MEU is a major subunit of the peripheral unit controllers PUCs. The operation of the microengine unit MEU has already been described in detail in conjunction with FIGS. 8 and 9. As indicated in FIGS. 8, 9, and 11, the microengine unit comprises a data selector SEL, a select inverter INV, a branch address multiplexer BAM, a ROM program counter RPC, and a controller memory unit CMU having two read-only-memory units ROM1 and ROM2. In addition, it will be observed in FIG. 11 that drivers CONDRV are employed to transmit the peripheral-unit control signals from the peripheral-unit controller to the peripheral unit.

The input/output status subunit IOS as shown in FIG. 11 comprises a status register STREG and a set of status drivers STDRV. The status register receives status signals transferred over the peripheral-unit-interface cable PUIC from the peripheral unit to which the peripheral-unit controller PPUC is connected. The status signals represent information concerning the operational status of the peripheral unit. For example, a status signal may indicate that the line printer, to which the peripheral-unit controller PUC is connected, is in need of more paper. Up to six status signals comprising a status word are transferred from the peripheral unit to the serial-peripheral-unit controller, synchronized with the system clock CLK and stored in the status register STREG. The status register STREG may be a hexagonal D-type flip-flop integrated circuit chip, such as a Model 74174 manufactured by Texas Instruments, Inc., and described at page 363 of that company's publication previously cited.

After the status register STREG is loaded with a status word from the peripheral unit PU, the signals on the input lines of the status register are transferred as to the output lines of the status register as output signals at the first occurrence of the clock signal CLK. These status-register-output signals correspond to the truth values of the respective bits of the status word and are available to both the status drivers STDRV and the data selector SEL in the microengine unit MEU.

As previously indicated above in the description of the operation of the microengine unit MEU, the data selector SEL provides a means for making available to the ROM program counter RPC, the truth-value of any status signal comprising the status word, which truth value determines whether the counter continues in a sequence to an incremented count or instead, loads a new original count into the counter. The count corresponds either to an external branch address generated by the computer unit CU in accordance with a program stored in the main memory unit MMU or to an internal branch address generated by the read-only-memory units ROM1 and ROM2 in accordance with a program stored therein. The status word is also transferred to a set of status drivers STDRV, the output lines of which are connected to the bus IOB to permit transfer of status words to the multiplexer MUX and ultimately to the computer unit CU, which also utilizes status information for control purposes.

The status drivers STDRV are enabled by a Status signal STAT. As previously explained, the status signal is produced in the multiplexer MUX in response to the computer unit CU. The status signal STAT is applied to the status drivers of the selected peripheral control unit PUC, which are thereby enabled to transfer the status word on to the input/output bus IOB to the computer unit CU via the multiplexer MUX.

Referring to the lower portion of FIG. 11, it will be observed that the data handling subunit DAT comprises data-out registers OUTREG, data-out drivers OUTDRV, and data-in drivers INDRV.

It will be recalled that input data is data that is being transferred from a peripheral unit PU to the computer unit CU and that output data is data that is being transferred from the computer unit to a peripheral unit.

Output data transferred from the computer unit CU through the multiplexer MUX to a peripheral-unit controller PUC, is loaded into the corresponding data-out registers OUTREG when the truth value of the data-out signal OUTD is 1. The data-out registers OUTREG retain the output data for transmission to the peripheral unit PU through the data-output drivers OUTDRV. In the embodiment of the invention herein disclosed, there are eight data-out registers, one such register, or flip-flop, for each of the eight data lines 1D1, . . . , 1D8, in the input/output bus IOB and peripheral-unit controller PUC output-data lines which are connected between the peripheral-unit controller PUC and the peripheral unit.

Input data employs a separate set of drivers referred to as data-in drivers INDRV. Input data is transferred from the peripheral unit PU to the data-in drivers INDRV, in which data is buffered for transmission over the input/output bus IOB. The data-in drivers are not enabled until a data-in signal IND is transferred from the multiplexer MUX over an input/output bus IOB to the selected peripheral-unit controller PUC.

Although there are eight data-out drivers, there are sixteen data-in drivers, one for each of sixteen data-in lines between the peripheral unit and the parallel-peripheral-unit controller PPUC.

This larger number of data-in lines makes the peripheral-unit controller PUC compatible with parallel peripheral devices that employ eight through sixteen bits of input data. However, since there are only eight data lines for conveying data in either direction between each peripheral-unit controller and the multiplexer MUX, the data-in drivers INDRV are enabled eight bits at a time so that first one byte of information is conveyed to the multiplexer and to the computer unit and then a second byte of information is so conveyed. The selection of the first or second byte for transfer from the peripheral-unit controller PUC to the multiplexer MUX is made by the microengine unit MEU by means of a byte select signal BSS which is transferred to the two sets of eight-bit drivers comprising the data-in drivers INDRV. Each set of eight drivers has one common enable signal line, thus making it convenient to simultaneously enable or disable, all eight drivers in a set.

DETAILED DESCRIPTION OF THE GENERAL PURPOSE PERIPHERAL UNIT CONTROLLER

Figure 12:
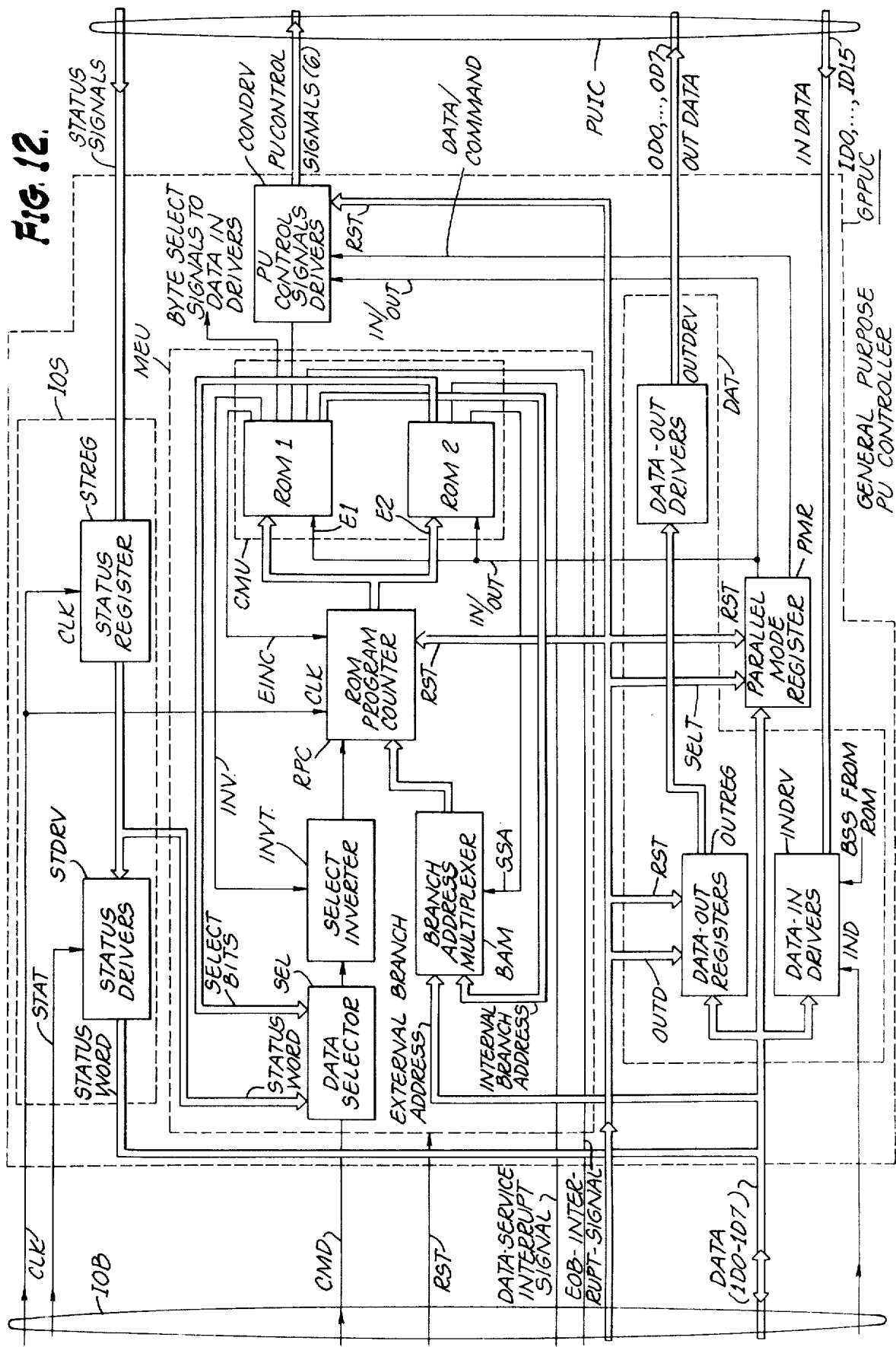
FIG. 12 is a similarly detailed block diagram of the general-purpose peripheral-unit controller.

Referring now to FIG. 12, which is a more detailed block diagram of the general purpose peripheral-unit controller GPPUC illustrated more generally in FIG. 6, it will be evident that on the left side of the diagram are the various signal lines comprising the input/output bus IOB, which connects the peripheral-unit controller to the multiplexer MUX, and that on the right side of the diagram are the various signal lines comprising the peripheral-unit-interface cable PUIC, which connects the peripheral-unit controller to the peripheral unit PU.

A comparison of FIGS. 11 and 12 indicates that the general-purpose peripheral-unit controller GPPUC of FIG. 12 is similar to the parallel-peripheral-unit controller PPUC of FIG. 11 in all respects except that the general-purpose peripheral-unit controller includes a mode register subunit PMR (near the bottom of FIG. 12), which has been included in the controller to increase the flexibility of control of non-standard peripheral devices.

The input lines to the mode register PMR comprise two lines of data, a select control signal SELT line and a reset signal RST line as described in conjunction with FIG. 3.

There are two output lines from the mode register PMR, namely, an In/Out control line and a Data/Command control line. After being passed through drivers, the signals on these output lines are transferred to the peripheral unit PU.

The signal on the Data/Command line has a truth value corresponding to either a data mode or a command mode. If the truth value of the signal on the Data/Command line corresponds to the data mode, the signals appearing on the in-data lines and the out-data lines between the peripheral-unit controller PUC and the peripheral unit PU, will be treated as data just as they are in the parallel-peripheral-unit controller PPUC. However, if the truth value of the signal appearing on the Data/Command line corresponds to the command mode, the data-in signals and the data-out signals are treated as extended status signals or extended control signals, respectively, rather than as data signals.

When the Data/Command line is in the command mode, the eight data output lines used for transferring data from the computer unit CU to the peripheral unit PU may, instead, be used for expansion of user defined control operations during output operations. The sixteen data lines normally used for conveying data from the peripheral unit to the computer unit, may, instead, be used as sixteen additional status lines during input operations for transferring sixteen additional status signals to the computer unit.

The second output line of the mode register PMR, namely, the In/Out line, is connected to peripheral unit and is also connected to both E terminals of the read-only-memory units ROM1 and ROM2 in the microengine unit MEU (see FIG. 9). Reference to FIG. 8 and FIG. 9 indicates that the microengine unit MEU that is used in the parallel-peripheral-unit controller PPUC, includes read-only-memory units ROM1 and ROM2 which have their respective E terminals tied together and in turn tied to either ground or +5 volts DC, depending upon whether a jumper is omitted or installed in jumper plug JPPUC. It will be recalled that the read-only-memory units ROM1 and ROM2 in combination, provide a total of 32 words of memory capacity, of which only sixteen words need be used in the parallel-peripheral-unit controller PPUC. However, in the general-purpose peripheral-unit controller GPPUC, the truth value of the signal on the E terminals of the read-only-memory units ROM1 and ROM2 is equal to the truth value of the output signal of the mode register PMR on the In/Out signal line.

The In/Out signal therefore provides added flexibility in allowing either set of sixteen words available in the read-only-memory units to be selected by a signal generated by the computer unit CU under software programmed control. Typically, one set of 16 words in the read-only-memory units ROM1 and ROM2 is employed during input operations and the other set of sixteen words in the read-only-memory unit are employed during output operations.

The In/Out signal is also transferred to the peripheral unit PU on the peripheral-unit interface cable PUIC to enable different sets of data and/or control operations, depending upon whether the transfer is to be into the computer unit or out of the computer unit.

DETAILED DESCRIPTION OF THE SERIAL-PERIPHERAL-UNIT CONTROLLER (VOLTAGE MODE)

Figure 13:
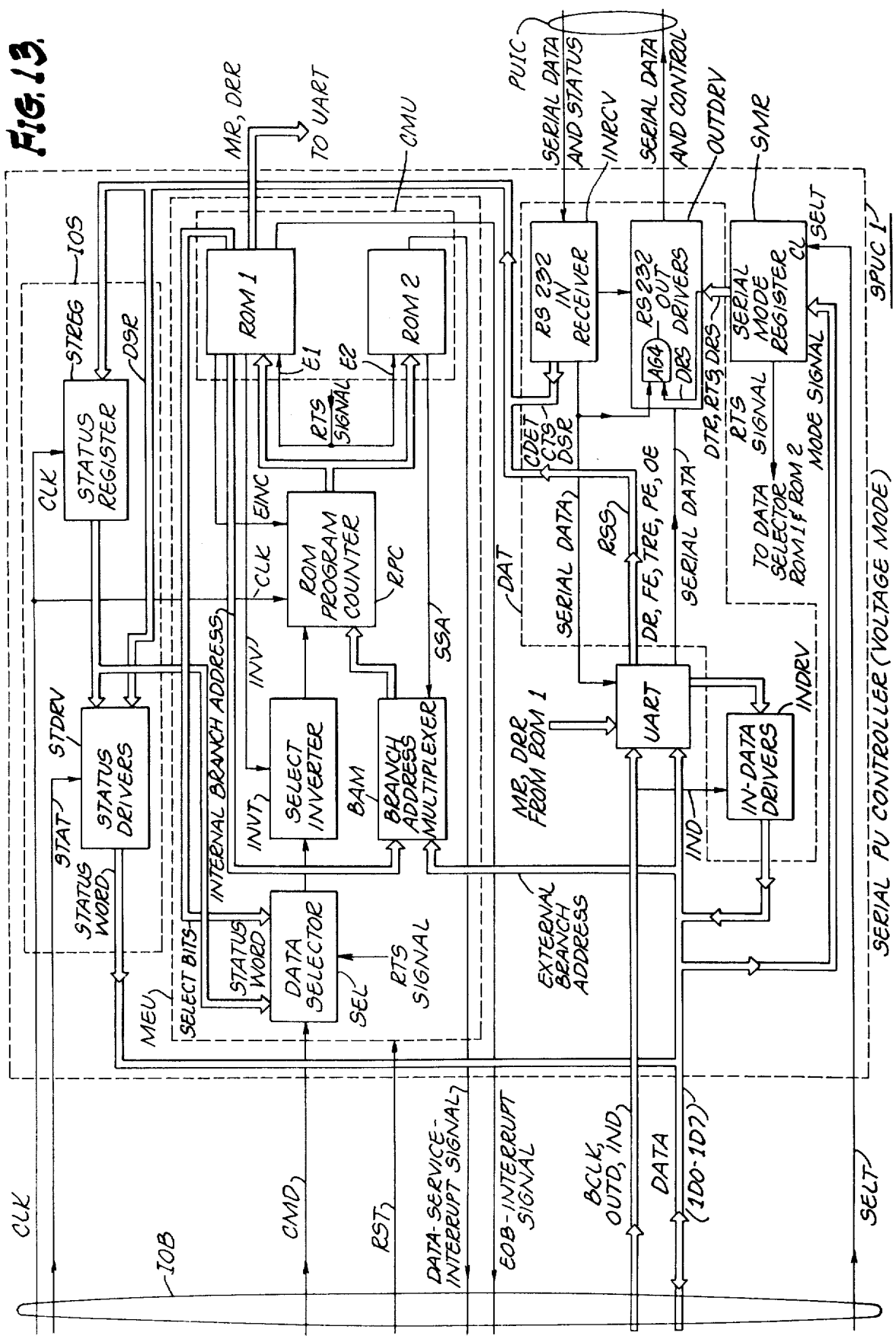
FIG. 13 is a similarly detailed block diagram of a serial-peripheral-unit controller adapted for the control of serial peripheral devices that utilize voltage mode logic.
Figure 14:
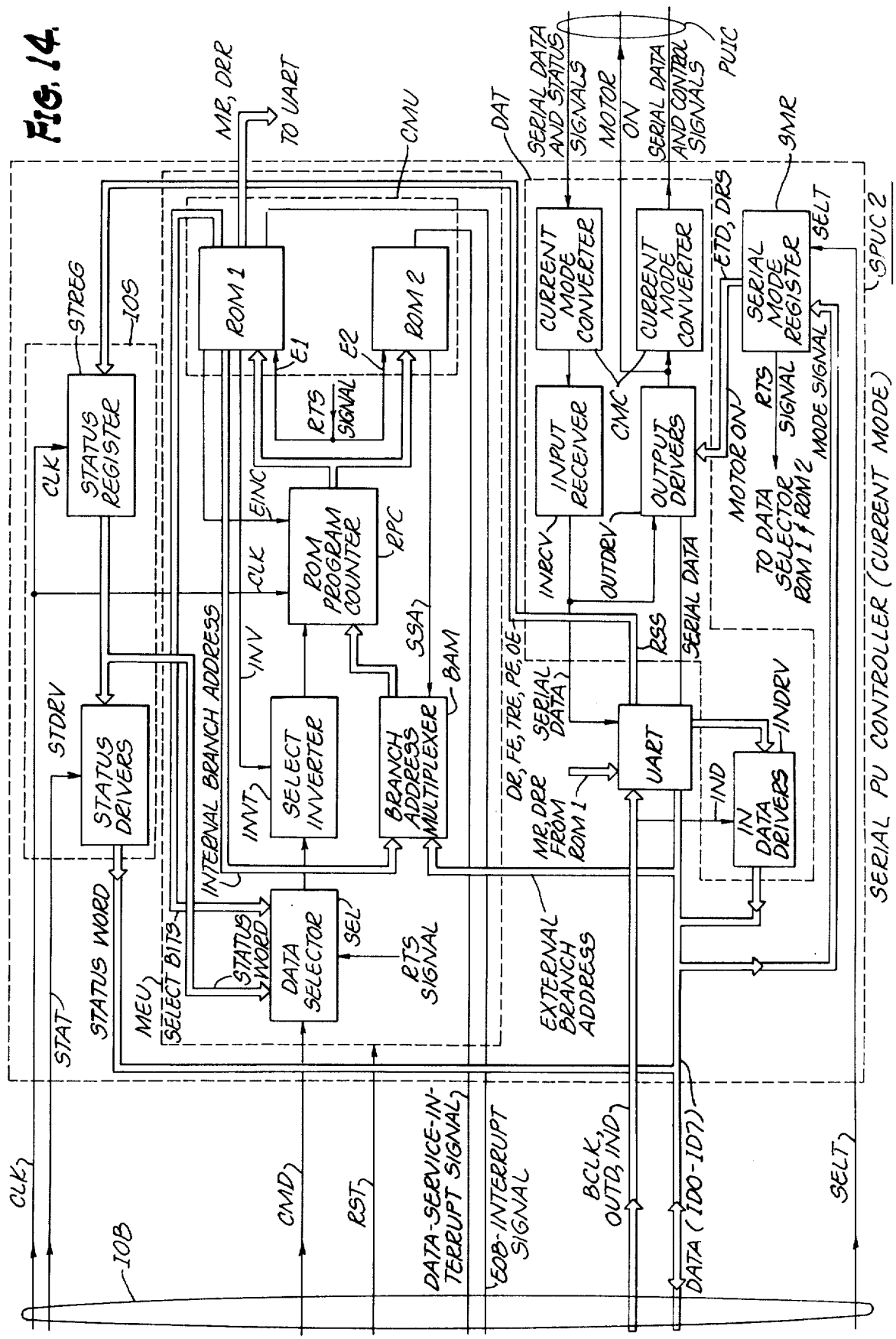
FIG. 14 is a similarly detailed block diagram of a serial-peripheral-unit controller adapted for the control of serial peripheral devices that utilize current-mode logic.

Two versions of the serial-peripheral-unit controllers are shown in block diagram form in FIGS. 13 and 14 respectively. The version shown in FIG. 13 employs voltage-mode logic for signal transfer to and from a peripheral unit, while the version shown in FIG. 14 employs current-mode logic for signal transfer to and from a peripheral unit. Hereinafter, for purposes of clarity, the acronym for the voltage-mode version is SPUC1, and the acronym for the current-mode version is SPUC2.

Referring now to FIG. 13, which is a detailed block diagram of a serial-peripheral-unit controller that utilizes voltage mode logic, it will be evident that on the left side of the diagram are the various signal lines comprising the input/output bus IOB, which connects the serial-peripheral-unit controller SPUC1 to the multiplexer MUX, and that on the right side of the diagram are the various data signal lines, status signal lines, and control signal lines comprising the peripheral-unit-interface cable PUIC, which connects the peripheral-unit controller to the peripheral unit PU. It will also be evident that the serial-peripheral-unit controller SPUC1 is similar in many respects to the parallel-peripheral-unit controller PPUC. The serial controller also has a status register STREG and status drivers STDRV to receive status words from a peripheral unit, store the status words and transmit them over the data lines in the input/output bus IOB to the multiplexer MUX and the computer unit CU. In addition, as indicated in FIG. 13, the output of the status register STREG is made available to the data selector SEL in the microengine unit MEU.

The microengine unit in the serial-peripheral-unit controller SPUC, may comprise the same components as the microengine unit in parallel-peripheral-unit controllers and in general-purpose peripheral-unit controllers, namely, the data selector SEL, the select inverter INVT, the branch address multiplexer BAM, the ROM program counter RPC and two read-only-memory units ROM1 and ROM2 interconnected to operate in the same manner.

The serial controller employs a bidirectional parallel-to-serial converter in the form of a universal asynchronous receiver/transmitter UART for converting parallel data into serial data and serial data into parallel data so as to facilitate communication of the serial-peripheral-unit controller SPUC with the peripheral unit PU in a serial mode and with the multiplexer MUX in a parallel mode. Parallel data that is being transferred from the multiplexer MUX to the controller, is converted to a serial format prior to being transferred from the controller to the peripheral unit. Similarly, serial data that is being transferred from the peripheral unit PU to the serial-peripheral-unit controller SPUC is converted to a parallel format prior to being transferred from the peripheral-unit controller to the multiplexer MUX.

In the embodiment of the invention described, bidirectional conversion of data signals, control signals, and status signals is accomplished by means of a universal asynchronous receiver/transmitter UART. A universal asynchronous receiver/transmitter is designed to communicate asynchronous serial signals that it has converted from parallel signals, and is also designed to communicate parallel signals that it has converted from serial signals. An integrated circuit chip, that may be employed as such a universal asynchronous receiver/transmitter UART and that is commercially available, is the Model No. TR1402A Universal Asynchronous Receiver/Transmitter manufactured by the Western Digital Corporation, Newport Beach, California, and described in detail in a publication of Western Digital Corporation entitled "MOS/LSI Application Report No. 1 Asynchronous Receiver/Transmitter".

In addition to receiving and transmitting data, the universal asynchronous receiver/transmitter UART also receives a baud clock signal BCLK from the multiplexer MUX to establish the data transmit and receive rate for a particular selected peripheral unit.

As explained in the aforementioned publication of Western Digital Corporation, the universal asynchronous receiver/transmitter UART utilizes holding registers to temporarily store data before such data is to be transmitted and after such data has been received. When data has been received by the universal asynchronous receiver/transmitter UART, a data-received signal DR, generated by the universal asynchronous receiver/transmitter in response to reception of a complete data character, is set to a logic one. The means for setting the data-received signal DR to a logic one, and the relative timing of the data-received signal, is described at pages 7-9 in the aforementioned publication of Western Digital Corporation. The line to which the data-received signal DR is applied is one of a plurality of lines RSS from the universal asynchronous receiver/transmitter UART that are connected to the status register STREG and are employed to transfer a status word to the data selector SEL in the microengine unit MEU and to the computer unit CU, as previously described in conjunction with FIGS. 11 and 12.

The data-received signal DR, is set to a logic one during an input-data transfer operation and it is applied to a flip-flop in the status register STREG in the same way that a status signal, received directly from a peripheral unit, is applied in a parallel-peripheral control unit. The controller memory unit CMU is programmed to select, by means of appropriate data select bits, the input line of the data selector SEL that corresponds to the line to which the data-received signal DR has been applied. If the data-received signal DR has been set to a logic one, the microengine unit "recognizes" this by means of ROM program counter RPC operation as previously described in conjunction with FIG. 8.

The signal on the data-received line DR is received by the serial-peripheral-unit controller SPUC1 and is used by the microengine unit MEU to determine the subsequent step in the sequence of peripheral unit operations after data has been transferred to the central processor unit CPU via the multiplexer MUX. The controller memory unit CMU then resets the data-received signal DR by transferring a reset signal DRR to the Universal asynchronous receiver/transmitter UART.

Controller memory unit CMU also transfers a master-reset input signal MR to the universal asynchronous receiver/transmitter UART. The data-received reset signal DDR and the master reset signal MR correspond to the peripheral unit control signals previously described in conjunction with FIGS. 11 and 12. These two signals are generated by the controller memory unit as two of the sixteen output signals previously described (see Table IV).

The master reset signal MR, sets the transmitter portion of the receiver/transmitter to an idle mode, making it ready for transmission of a new set of data. The master-reset signal MR also clears internal universal asynchronous receiver/transmitter UART status bits and places the receiver portion of the universal asynchronous receiver/transmitter in an idle mode in which the receiver portion of the universal asynchronous receiver/transmitter UART searches for specially coded start-bits in the incoming serial data. The start-bits indicate that a series of bits in serial format has begun to arrive from the peripheral unit PU. The effect of the reset signals MR and DRR and the start-bits, their generation, and the operation of the universal asynchronous receiver/transmitter involving search and recognition of the start-bits, are described in the aforementioned publication of the Western Digital Corporation.

The universal asynchronous receiver/transmitter UART generates a plurality of status signals namely the data-received signal DR, a framing-error signal FE, a transmitter-empty signal TRE, an overrun-error signal OE, and a parity-error signal PE, which comprise part of the status word transferred to the status register and made available to the computer unit CU and to the microengine unit MEU. The framing-error signal FE, when in a positive truth state, indicates that a valid stop bit was not present in the received serial character during an input data operation. A stop bit, by its relative position in the serial data format, indicates to the universal asynchronous receiver/transmitter UART that a term of received serial data character is complete. The transmitter-empty signal TRE, indicates that a data character has been transferred from the universal asynchronous receiver/transmitter UART holding register to the peripheral unit PU and thus indicates that the universal asynchronous receiver/transmitter UART is again ready to transmit another character of data to the peripheral unit.

The transmitter that communicates with the receiver portion of the universal asynchronous receiver/transmitter UART can provide each term or character of serial data with a parity bit so that a parity check will determine whether a transmitted sequence of information has been accurately received. During input operations the parity bit is checked by the universal asynchronous receiver/transmitter UART to determine whether the accuracy of the original data still exists. If the parity bit is a 1 when it should be a 0, or a 0 when it should be a 1, a parity error signal is generated and made available to the microengine unit MEU and the computer unit CU as part of the status word. The means by which a parity error PE, and an overrun error OE are detected and corresponding error signals generated, are described in the aforementioned publication of the Western Digital Corporation. The parity bit is optional however and may be omitted.

If the data-ready line DR is not reset by the data-received reset signal DRR before a new character is transferred to the holding register of the universal asynchronous receiver/transmitter UART, the UART's overrun signal OE will be set to a logic one and this signal is also transferred to the microengine unit MEU and the computer unit CU as part of the status word.

As indicated in FIG. 13, the in-data receiver INRCV also transfers signals to the status drivers STDRV and status register STREG. The lines between the in-data receiver INRCV and the status register are used to transfer two status signals as part of the status word. One such status signal is a carrier-detect signal CDET which, as is known in the computer arts, is generated and used during an input operation by typical modems to indicate that the modem is receiving a signal which meets certain criteria for transmission to the computer unit CU. The second status signal, transferred to the status register STREG directly from the in-data receiver INRCV, namely, a clear-to-send signal CTS, is also generated and used by a modem to indicate to the peripheral-unit controller PUC that the modem is ready to accept data for transmission. One status signal, namely, the data-set ready signal DSR generated by modems, is transferred from the IN-DATA Receiver INRCV, directly to the status drivers STDRV, bypassing the status register STREG. The data-set ready signal DSR is not applied to the data selector SEL and therefore has no direct effect on the firmware sequence programmed into the controller memory unit CMU. However, the data-set ready signal DSR, is transferred to the computer unit CU. When the signal is in a TRUE condition, it indicates that the modem is connected to a communication channel and is not in a test, talk, or dial mode and that it has completed all timing operations required to establish communications.

The carrier detect signal CDET and clear-to-send signals CTS are also generated by cathode-ray-tube terminal units CRTs (see FIG. 2) to signal the serial-peripheral-unit controller SPUC that the CRT is ready to receive data from the computer unit CU.

Since modems and cathode-ray-tube terminal units CRTs use voltage-mode logic, the in-data receiver and out-data drivers INRVC and OUTDRV, are standard RS232 interface drivers and receivers respectively (see description of FIG. 7). The RS232 standard has been established by the Electronics Industries Association for interface equipment between data terminals and data communications equipment, and is therefore generally well known in the industry and requires no further explanation herein.

The serial mode register SMR is a 4-bit register which is utilized as a means of transferring additional control information directly from the computer with CU to the peripheral unit PU.

In the embodiment of the invention herein described, the serial-peripheral-unit controller SPUC1, that employs voltage-mode logic, employs a 4-bit mode register SMR to produce four 1-bit output signals, of which only three are commonly used, the fourth serial mode register SMR output signal being available as a spare. The input lines to all four flip-flops comprising the serial mode register SMR, are connected directly to four of the data lines of the input/output bus IOB. The three output signals of the mode register, which are presently utilized for modems and CRTs, are the following signals: a Data-Terminal-Ready signal DTR, to Ready-To-Send signal RTS, and a Data-Copy signal DRS. The Data-Terminal-Ready signal DTR signals the peripheral unit that data is ready to be transmitted to it by the computer unit CU. The Ready-To-Send signal RTS is transferred to the peripheral unit PU to indicate that the commencement of data transfer may take place and is also transferred to the microengine unit MEU where it is connected to the E terminals of the read-only-memory units ROM1 and ROM2. Transfer of the Ready-To-Send signal RTS, in a positive logic state, to the E terminals of the read-only-memory units ROM1 and ROM2, selects one half of the total 32 words available in the read-only-memory units. Sixteen words may be used for output operations and the other sixteen words may be used for input operations. The third mode register signal is a Data-Copy signal, which when in a TRUE or logic one state, enables an AND gate AG4, the second line of which is connected to the input-data line, and the output line of which is connected to the output drivers OUTDRV to return input-data to the peripheral unit. The data-copy signal eliminates the need for software that would otherwise be necessary to send data back out to the modem or CRT to allow the user to obtain a copy of data being entered into the computer unit.

As indicated in FIG. 13, a second input line connected to the mode register SMR, is a control line over which the select signal SELT is transferred to the mode register. The select signal SELT is used as a clock signal of the mode register so that when the select signal is in a logic one state, the mode signals available at the mode signal input to the mode register, are clocked into the register and stored there for use in a subsequent operation.

DETAILED DESCRIPTION OF THE SERIAL-PERIPHERAL-UNIT CONTROLLER (CURRENT MODE)

FIG. 14 is a similarly detailed block diagram of the serial-peripheral-unit controller SPUC2 that is used in conjunction with current-mode peripheral units, such as teletypewriter units. It will be evident from a comparison of FIGS. 13 and 14, that the current-mode serial-peripheral-unit controller SPUC2, is similar in most respects to the voltage-mode serial-peripheral-unit controller SPUC2. Therefore, only differences between the two will be discussed.

Unlike the serial-peripheral-unit controller SPUC1 that employs voltage-mode circuits, the current-mode controller SPUC2 does not use RS232 receivers and drivers, but instead uses standard transistor-transistor-logic TTL. However, the serial-peripheral-unit controller that operates in conjunction with current-mode peripheral units SPUC2, provides means for converting from current-mode logic to conventional transistor-transistor-logic TTL. Therefore, as indicated in FIG. 14 (on the right-hand side), the input and output serial-data lines utilize current mode converters CMC, one connected between the peripheral unit and the input receiver INRCV, and one connected between the peripheral unit and the output drivers OUTDRV.

In current-mode logic, a mark corresponds to the presence of approximately 20 milliamps of current flow and a space corresponds to the absence of current flow. The current-mode converters CMC for both input-data and output-data lines convert 20 milliamps and 0 milliamps of current to voltage levels of approximately +5 volts and 0 volts, respectively. Means for making such a conversion are well known in the electronics art. One typical device for making such a conversion is a common-emitter configured transistor, used as a current switch capable of sinking 20 milliamps.

Unlike the voltage-mode serial-peripheral-unit controller SPUC1, the current-mode serial-peripheral-unit controller SPUC2, which is used with teletypewriter units, utilizes all four output signals of the serial-mode register SMR. One of the four signals MOTOR ON, is used to activate the motor of the teletypewriter when the truth value of the signal is 1. As shown in FIG. 14, the MOTOR ON signal is not converted in the current mode converter CMC, but is instead transferred directly to the teletypewriter unit. A second signal, available at the output of the mode register SMR, is the Ready-To-Send signal RTS. The Ready-To-Send signal, when set to a logic one level, selects an output operation, and when set to a logic zero level, selects an input operation. The selection process is accomplished by applying the Ready-To-Send signal RTS to the E terminals of the read-only-memory units ROM1 and ROM2 whereby either half of the available 32 words of memory capacity in the read-only-memory units is selected, depending upon whether the operation is an input operation or an output operation.

A third signal stored in the serial mode register SMR is an Enable-Teletypewriter-Reader signal ETR which, when set to a logic 1 level, enables the operation of the teletypewriter paper-tape reader under microengine unit MEU control. If the Enable-Teletypewriter-Reader signal ETR is set to a truth value of 1 during input operations, data will be derived from the paper-tape reader portion of the teletypewriter unit. However, if the Enable-Teletypewriter-Reader signal is set to a truth value of 0, data will be derived from the teletypewriter keyboard, when operated.

The fourth signal stored in the serial-mode register SMR in the current-mode serial-peripheral-unit controller SPUC2 is a Data-Copy signal DRS which is used in the same way as the corresponding Data-Copy signal is used in the voltage-mode controller SPUC1. In the case of teletypewriter units, the Data-Copy signal is used to produce a printback of data that has been inputted to the peripheral-unit controller from the teletypewriter keyboard. However, when the paper-tape reader is enabled by the Enable-Teletype-Reader signal, the Data-Copy signal will also cause the return of data to the teletypewriter unit and the printback of data from the reader on the teletypewriter.

In both the current-mode serial-peripheral-unit controller and voltage-mode serial-peripheral-unit controller, the Data-Copy signal has no significance during output operations.

THE INPUT/OUTPUT BUS JOB

Figure 15:
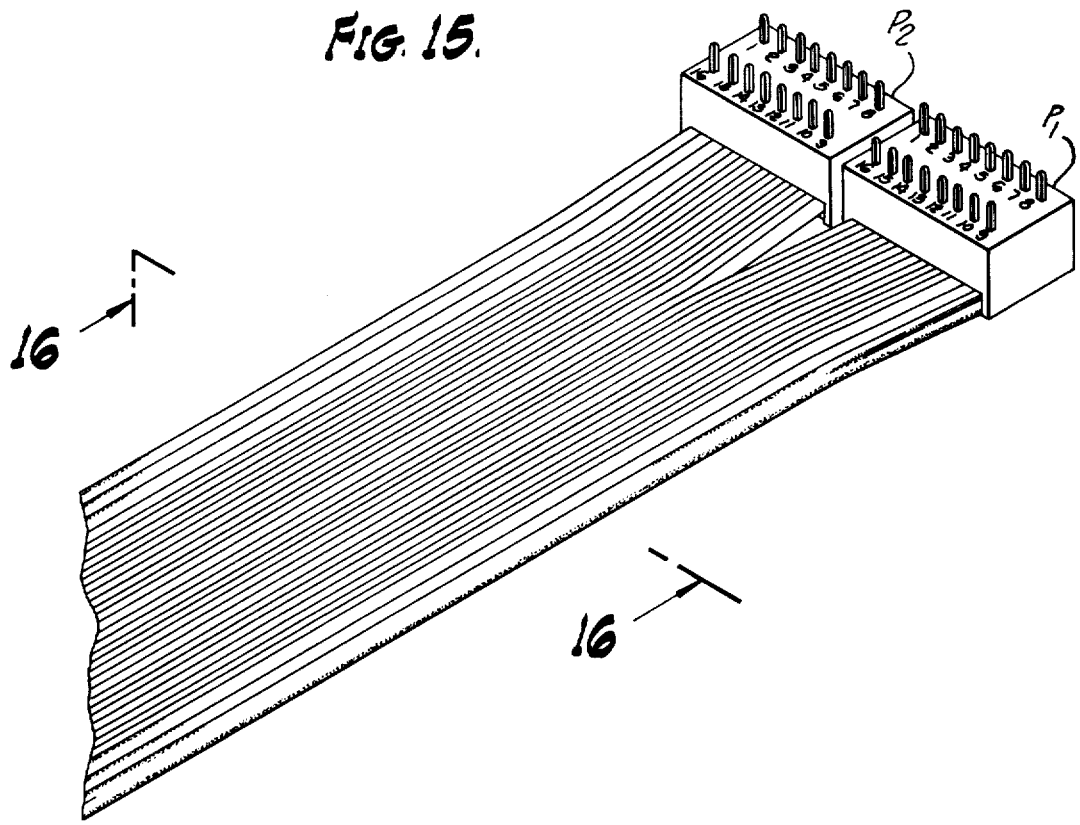
FIG. 15 is a perspective view of an input/output bus of this invention.
Figure 16:
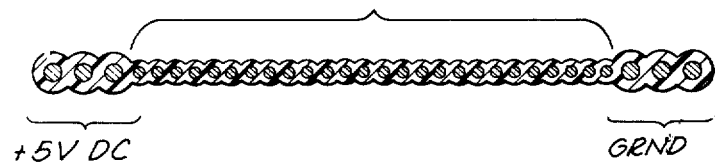
FIG. 16 is a cross-sectional view of an input/output bus taken along lines 16—16 of FIG. 15.

Each peripheral-unit controller is connected to the multiplexer MUX by a 32-conductor flat ribbon cable, a portion of which is illustrated in perspective in FIG. 15 and in cross-section in FIG. 16. As indicated in FIGS. 15 and 16, the outermost three conductors adjacent each edge of the ribbon cable, are of a lower gauge wire.

As shown in FIG. 15, the cable is split in half half longitudinally at a point near each end and each half terminates in a 16-pin plug.

The six lower gauge wires are used to carry 5-volt DC at currents up to about 1 Ampere from the multiplexer MUX to the peripheral-unit controller PUC. The remaining 26 wires are used to carry the various control signals, data signals and plus and minus 12-volt DC power for use by the peripheral unit controller. Thus, in this invention, power is transferred from a multiplexer to plurality of peripheral-controller units located at or near the peripheral devices, and relatively high-power transfer is accomplished conveniently and at low cost by means of a ribbon cable having wires of different gauges.

Table VI is a signal pin assignment table for the input/output bus IOB. All input/output buses IOBs are identical regardless of whether they are used for connecting parallel or serial-peripheral-unit controllers to the multiplexer MUX. The input/output buses used with different peripheral devices are often of different lengths. For example, in the embodiment of the invention disclosed, an input/output bus IOB used in conjunction with standard line printers is 10½ feet in length, while an input/output bus IOB used in conjunction with high-speed paper-tape readers is only 4 feet in length. The exact cable length of each cable, is about the minimum suitable for use with the individual peripheral unit to which it connects, and may be up to approximately 30 feet depending on particular central processor unit CPU timing restrains and particular peripheral-unit controller PUC power requirements.

At least two important advantages result from the use of such long cables, each of which is identical in all respects, except possibly, their lengths. One advantage is the cost savings which result from the simplified manufacturing of identical cables. A second advantage lies in the avoidance of any special termination requirements for peripheral-unit-interface cables PUICs, the cables that interconnect the peripheral-unit controllers, and the peripheral devices. Special termination requirements for the parallel-peripheral-unit interface cables PUICs, are unnecessary because they may be made sufficiently short (i.e., 2 feet) to preclude substantial mismatch of impendances.

TABLE VI

INPUT/OUTPUT BUS (IOB) PIN ASSIGNMENT

| P1 Pin | Signal | P2 Pin | Signal |
|--------|--------|--------|--------|
| 8 | GRD | 16 | RST |
| 9 | GRD | 1 | −12VOLTS |
| 7 | GRD | 15 | INT1(DATA-SERVICE) |
| 10 | BCLK | 2 | INT2(END-OF-BLOCK) |
| 6 | GRD | 14 | +12VOLTS |
| 11 | CLK | 3 | 1D0 |
| 5 | GRD | 13 | 1D1 |
| 12 | OUTD | 4 | 1D2 |
| 4 | GRD | 12 | 1D3 |
| 13 | SELT | 5 | 1D4  Data |
| 3 | GRD | 11 | 1D5 |
| 14 | IND | 6 | 1D6 |
| 2 | STAT | 10 | 1D7 |
| 15 | GRD | 7 | +5VOLTS |
| 1 | CMD | 9 | +5VOLTS |
| 16 | GRD | 8 | +5VOLTS |

The usual requirement for special terminations to provide impedance matching for different devices, is obviated in this invention by the use of a short cable to connect a peripheral-unit controller PUC to a peripheral unit PU. In practice, the peripheral-unit-interface cables PUICs, need not be more than 1 to 2 feet in length. Such short interface cables preclude the usual reactance effects associated with longer cables. Therefore, impedance matching, otherwise required, is not required in this invention.

IOB Signals and Signal Protocol

Following is a brief description of the various signals transferred over the input/output bus IOB, and an indication of typical timing limitations, that is, the protocol of signal transfer between the multiplexer MUX and a peripheral-unit controller PUC.

Data Lines

The data lines 1D0 to 1D7 are bidirectional tristate unterminated lines that are used to transfer data signals and other signals from the multiplexer MUX to peripheral-unit controllers PUCs (see FIGS. 11-14). These same lines are also used to transfer data signals and status signals from a peripheral-unit controller to the multiplexer. The signals on these lines are +5 volts for a logical one and 0 volts for a logical zero. Data signals being transferred from the computer unit to a peripheral-unit controller are transferred simultaneously on the data lines in all the input/output buses connected to the multiplexer MUX. However, the data signals are not utilized by the controllers not selected by the programmed computer unit for a data transfer operation.

Clock Signals

There are two types of clock signals, a baud clock signal BCLK and a system clock signal CLK. Both types of clock signals utilize voltage levels of 0 volts and +5 volts. The baud clock signal BCLK is used only in conjunction with serial-peripheral-unit controllers SPUCs. The baud clock signal frequency is usually sixteen times the baud rate of the peripheral unit PU to which a peripheral-unit controller PUC is connected.

The system clock signal CLK is a 250 nanosecond period squarewave signal that is used to synchronize circuits in the microengine unit MEU. Typically, it is the rising edge of the system clock signal CLK to which circuits are synchronized.

Interrupt Lines

The set of lines identified in FIG. 10A as I1, is used for transferring data-service interrupt signals, one line in that set being allocated to each one of the peripheral-unit controllers. The signal on the interrupt line is 0 volts for a logical one and +5 volts for a logical zero. A data-service interrupt signal is used to signal the central processor unit CPU that the peripheral unit PU to which the controller is connected, is ready to transfer data or receive data depending on the type of unit.

End-of-block interrupt signals are transferred over a second set of interrupt lines I2, also shown in FIG. 10A. The logic levels are the same as those for data-service interrupt signals. End-of-block interrupt signals are used to signal the central processor unit CPU that the transfer count has become equal to zero, indicating that the last byte of the data in a particular block of data has been transferred, or indicating that an error, or ending, condition has occurred and has been detected by the peripheral-unit controller PUC during a status test.

The logic levels of interrupt signals are typically changed on a rising edge of a squarewave of the system clock signal CLK. TRUE interrupt signals are reset to FALSE when the microengine unit MEU receives a reset signal RST or with the rising edge of the system clock when a command signal CMD is received.

The interrupt lines I1 and I2 may be either open-collector or tri-state lines.

Control Lines

The control signals are tri-state signals generated in the multiplexer MUX and they are all logically FALSE at +5 volts and logically TRUE at 0 volts. The control signals include:

A reset signal RST may be used to reset a peripheral-unit controller PUC, returning it to an idle state. The reset signal may be generated in response to front panel controls of the control console CC (see FIG. 1) (usually for the duration of the activation of a switch) and under software control (for a 250 nanosecond period);

a status signal STAT which when at a logical one level, that is, logically TRUE, enables the status drivers STDRV in a peripheral-unit controller that has been selected by the programmed computer unit. In response to the status signal STAT, status signals are gated onto the data bus and remain on the data bus for transfer to the multiplexer MUX for the full duration of the status signal STAT. The status signal duration is dependent on the particular computer unit being used. Typically, the duration is about 400 nanoseconds. Commonly, status signals are gated onto the input/output bus IOB within 35 nanoseconds after the status signal reaches the drivers in a controller unit;

an in-data signal IND, when logically TRUE, enables the data-in drivers in a peripheral-unit controller resulting in the gating of data onto the data lines 1D0-1D7. In response to the in-data signal, data is typically gated onto the data lines within 35 nanoseconds and is applied to the data lines for the duration of the signal. The in-data signal duration is dependent on the particular computer unit being used. Typically, the duration is about 400 nanoseconds;

an output data signal OUTD which is a 250 nanosecond signal. The output-data signal clocks data-out registers in a peripheral-unit controller on the rising edge of the clock signal CLK, resulting in the transfer of data, available at the input lines to the data registers, to the peripheral unit to which the peripheral-unit controller is connected. Depending upon the type of data-out registers or logic gates used in other embodiments, the output-data signal OUTD could also be used as a strobe signal. Output data signals are stable for some time immediately before and immediately after the output-data signal is in a logical one state. Typically, such stability periods before and after the logic one state of the output-data signal, are at least 50 nanoseconds in duration;

a command signal CMD, which is a 250 nanosecond negative-going pulse. When a peripheral-unit controller sequence is initiated, the command signal CMD, at the occurrence of the rising edge of the system clock signal CLK, places the ROM program counter RPC in a load condition to accept an external branch address transferred to the peripheral-unit controller on four of the data lines, namely, 1D4-1D7.

When the peripheral-unit controller has issued a data-service interrupt signal which has been accepted by the computer unit CU, the command signal CMD is used to signal the peripheral-unit controller, at the rising edge of the system clock signal CLK, that the data service sequence has been completed, and that the data-service interrupt signal should be reset. If the data-service interrupt signal has been used to transfer the last byte of data to be transferred at that time, the command signal CMD, generated for the purpose of resetting the interrupt signal, is twice the usual duration of 250 nanoseconds. A double-duration command signal CMD signals the peripheral-unit controller to which it is applied, that the transfer count has reached zero, or that an ending condition has occurred.

When the peripheral-unit controller has generated and end-of-block interrupt signal, the command line is used to signal the peripheral-unit controller, at the rising edge of the system clock signal CLK, that the interrupt sequence has ended and that the interrupt signal line may be reset.

Another control signal applied to the input/output bus IOB is the select signal SELT, which is a 250 nanosecond negative-going pulse used to gate mode bits onto the data lines for transfer to the parallel mode register in the general purpose peripheral-unit controller GPPUC and the serial mode register SMR in the serial peripheral-unit controllers SPUCs. The select signal has the same timing parameters as the out-data signal OUTD and it can be employed as a clocking signal or as a strobing signal.

With the exceptions of the double-duration command signal CMD and a reset signal RST generated at the control console CC, and the computer unit dependent status signal STAT and in-data signal IND, all control signals are approximately 250 nanoseconds long.

As previously discussed in conjunction with FIG. 3, DC power is also transferred from the multiplexer MUX to the peripheral-unit controller PUC over the input/output bus IOB.

In summary, signal transfer on an input/output bus IOB of this invention, involves a unique combination of different types of signal transfer operations over a long ribbon cable. The input/output bus IOB is used to transfer a unique combination of synchronous signals, asynchronous signals, variable duration signals, and power, and is used with unterminated tri-state and terminated open collector drivers. This unique combination of signals and signal protocol for transfer over a ribbon cable, makes it possible to locate at or near a peripheral unit, a peripheral-unit controller of the type herein disclosed or other controller devices having similar capabilities.

DISTRIBUTED INPUT/OUTPUT SYSTEM OPERATION

The previous sections have provided a comprehensive description of the configuration and circuits of the various components of the distributed input/output system DIOS of FIGS. 1 and 2. In the sections that follow, typical input/output operation for the distributed input/output system DIOS will be described in conjunction with a variety of standard peripheral devices. Reference will be made to previous discussions and previously described figures to indicate how the various portions of the distributed input/output system DIOS interact during the operation of the system.

It will be understood that in the description of the various operations of the distributed input/output system DIOS, the computer unit CU and each peripheral-unit controller PUC being utilized to control the transfer of signals between the computer unit and a peripheral unit, will have been programmed to carry out their respective operations.

The computer unit will have been programmed by methods and means well known in the computer arts. By way of example, a program in software form and comprising the instructions used by the computer for input/output operations, will be introduced into the computer unit by means of an input device, such as a tape reader, card reader, or the like. The instructions, represented by binary digits, are then stored in selected locations in the main memory unit MMU. Included in the stored instructions are the automatic input/output instructions for each peripheral unit with which the computer unit will operate.

It will be understood that there are programs that are employed specifically for the purpose of controlling input/output operations involving the distributed input/output system DIOS. There are also programs, commonly called a user main-line program, that would normally involve a transfer of data to or from a peripheral device and would therefore call up subroutines comprising the specific input/output program for the selected peripheral device. It will be also understood that once a software program for distributed input/output system DIOS operation has been stored in the main memory unit MMU of the computer unit CU, and at least one input peripheral unit connected to a distributed input/output system, additional main-line programs, as well as additional input/output control programs, may be entered into the computer unit CU by means of the distributed input/output system.

Typical programming examples for various standard peripheral units are shown in the Distributed I/O System User's Manual, published by Computer Automation, Inc., in April, 1975.

The automatic input/output instructions programmed into the computer unit CU, include an address pointer, a word which contains the address of the location in the main memory unit where one or more bytes of the output data are stored or where memory unit capacity has been allocated to receive and store input data. The automatic input/output instructions stored in the main memory unit, also include a transfer-count word which is decremented for each transfer of data into or out of the main memory unit, and an instruction word that is coded to represent the type of automatic instruction involved (i.e., automatic input instruction or automatic output instruction).

The controller memory unit CMU comprising read-only memory units ROM1 and ROM2 (see FIGS. 8 and 9), will have been preprogrammed to contain the firmware or microcode to be used with a selected peripheral unit. The microcode of the embodiment of the invention described herein, contains 32 words, each word having sixteen binary digits or bits. The format of a typical microcode word has previously been described in conjunction with Table V.

TYPICAL OPERATION IN AN OUTPUT DATA TRANSFER

Figure 17:
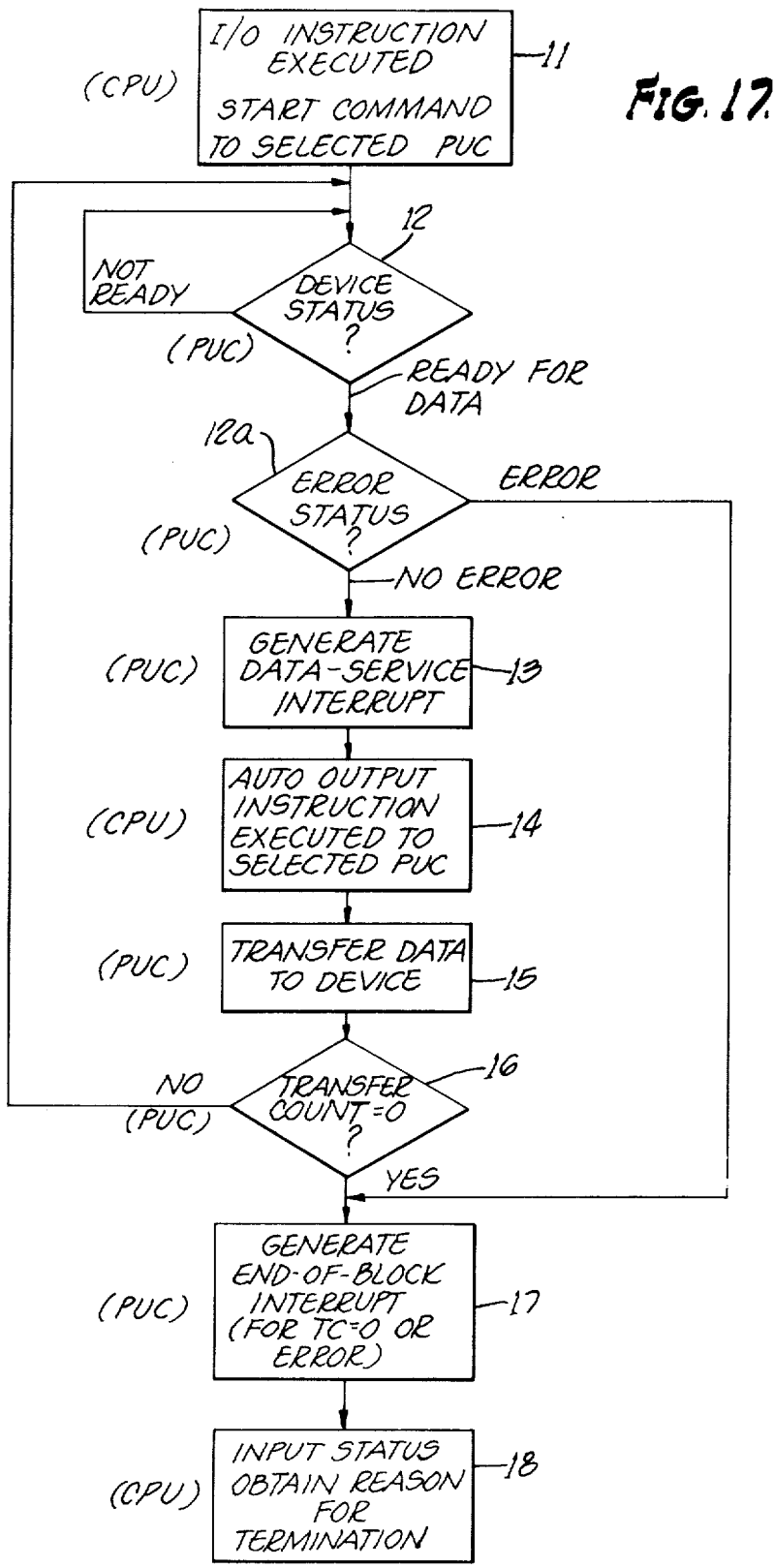
FIG. 17 is a flow diagram indicating the sequence of operations involved in a typical output-data transfer.

FIG. 17 is a flow chart showing sections of the system that operate as a distributed input/output system DIOS for performing a typical output-data transfer.

It will be noted that for the flow chart of FIG. 17 as well as other flow charts presented in sections to follow, the sequence of operations will normally commence at the top of the page and flow in a generally downward direction in accordance with the arrowhead pointers indicated in the flow charts. It will also be noted that use is made of conventional computer program flow chart format wherein the rectangle indicates sections of the system for performing an operation and a diamond indicates sections of the system for making a test and a decision, the output lines of which provide a plurality of possible paths to other sections. The path selection is dependent upon the answer to the decision process taking place. Next to each rectangle and diamond in the flow charts, is an indication, in parentheses, of the location of the section utilized for that portion of a data-transfer operation.

As indicated at the top of FIG. 17, the first operation, 11, to be performed for a typical output-data transfer involves the execution of a programmed output instruction by the central processor unit CPU which issues a command word to the multiplexer MUX, which is decoded and transferred to the peripheral-unit controller PUC selected by the programmed computer unit.

This input/output-instruction word is transferred to the multiplexer MUX over the address bus AB. It includes a 4-bit address of the multiplexer to be employed for the data transfer, a 3-bit address of the peripheral-unit controller that is connected to the peripheral unit selected in accordance with the software program, and a function bit that indicates, by a TRUE value, that the next transfer to take place will involve command signals.

The command word, which is transferred to the multiplexer MUX over the data bus DB, includes, a command control signal CMD, an external branch address for the controller memory unit CMU, and mode signals for the parallel mode register PMR in a general-purpose peripheral-unit controller GPPUC or for the serial-mode register SMR in a serial-peripheral-unit controller SPUC.

The command control signal CMD is transferred to the data selector SEL in the microengine unit MEU of the peripheral-unit controller PUC (see FIG. 8) selected by the computer unit CU by means of the input/output instruction word generated by the computer unit pursuant to the software program. The microengine unit MEU will have been in an idle state as a result of completing a prior transfer or because of a reset signal RST transferred from the computer unit. When the microengine unit is in such an idle state, the microcode output word of the controller memory unit CMU, and the other components of the microengine unit are in the following configuration: the truth values of the data select bits correspond to the data-selector SEL input line allocated to the command control signal CMD; the branch address multiplexer BAM is set to transfer the external branch address to the ROM program counter RPC; and the ROM program counter RPC is effectively idle until a command control signal CMD, having a positive truth value, causes the ROM program counter to load, or copy, the external branch address provided by the central processor unit CPU.

When the command control signal CMD is transferred to the data-selector SEL, the external branch address is loaded into the ROM program counter RPC, the count of which becomes the input instruction to the controller memory unit CMU. The output of the controller memory unit CMU is the first word in the sequence of 16-bit words to be generated by the controller memory unit CMU during the output-data transfer operation. As indicated in FIG. 17, the first output word of the controller memory unit CMU initiates the first decision process to be made in the output-data transfer operation.

As indicated in FIG. 17, the first decision process to be made employs a device-status-section 12, to ascertain whether the selected device is ready to accept data or is already operating on previously transferred data or has an error status of some type which will cause the generation of an EOB-interrupt signal. The device status check is accomplished in the microengine unit MEU which may check any one of the six status bits comprising the status word, as previously described in conjunction with FIG. 8.

The six status bits comprising the status word are transferred to the input/output status subunit IOS in the peripheral-unit controller PUC (see FIGS. 5-7) and are stored in the status registers STREG where they are made available to the microengine unit MEU and to the computer unit CU. The microcode in the controller memory unit CMU is programmed to generate three data-select bits, the truth values of which determine which of the six status signals is selected in the data-selector SEL. If the truth value of the selected status signal corresponds to a Not-Ready condition, the ROM program counter RPC continues to load the same branch address resulting in repetition of a check of device status. If, on the other hand, the truth value of the selected status signal corresponds to a Ready-For-Data condition, the ROM program counter RPC is incremented, increasing the count by one and transferring a new input instruction to the controller memory unit and thus initiating the next operation in the output-data transfer.

The next operation in a typical output-data transfer is an additional status check, this time to ascertain whether or not an error condition exists.

If a status check indicates the existence of an error condition, the firmware program in the peripheral-unit controller PUC branches to a microcode output that generates an EOB-interrupt signal. This signal is transferred over the input/output bus IOB to the multiplexer. It will there be vectored to a preselected location in the main memory unit MMU of the computer unit CU which has been programmed to perform an EOB-interrupt sequence to terminate operation. The operation of branching to an EOB-interrupt signal is accomplished by the microengine unit MEU. The microengine unit generates a microcoded word which includes an instruction to the branch address multiplexer BAM to select an internal branch address. The corresponding controller memory unit CMU output word, that is, a microcode output, includes an EOB-interrupt signal (see FIGS. 8 and 9, and Table V).

As indicated in FIG. 17, the error status section 12a is represented by the diamond-shaped figure bearing the legend Error Status. The path labeled ERROR is the path corresponding to an error detection and leads to the Generate EOB-Interrupt section 17 at the lower portion of FIG. 17.

Execution by the computer unit CU of an EOB-interrupt instruction, stored in the preselected location in the main memory unit MMU, results in termination of the operation of the peripheral unit until the error condition is remedied.

If no device errors exist and the device is ready to receive input data, the peripheral-unit controller PUC responds to status signals to increment the ROM program counter RPC and access a new instruction from the microengine unit MEU which generates a data-service-interrupt signal (section 13) to request the output data from the computer unit CU. This interrupt signal is transferred over the input/output bus IOB to the multiplexer MUX where, when it attains top priority, and will be vectored to a preassigned interrupt location in the main memory unit MMU, as previously described.

As indicated in FIG. 17, in response to a data-service interrupt signal, the computer unit CU executes an automatic output instruction (section 14) to the peripheral-unit controller PUC selected in accordance with the software program. As previously discussed, the automatic output instruction is an interrupt instruction that has been stored in a preselected location in the main memory unit MMU and includes a data buffer address, a data transfer count and an indication of the type of operation to be performed with the peripheral-unit controller PUC.

The central processor unit CPU identifies the operation to be performed, which is identified by a signal stored in the preselected memory location, and transfers data from the memory unit to the peripheral-unit controller using the data buffer address pointer and the transfer count (section 15). The data buffer address pointer and the transfer count are each decremented by the central processor unit CPU as each byte of data is transferred to the peripheral-unit controller PUC. As the last data character in an entire group of data bytes being transferred, is transferred to the peripheral-unit controller, the transfer count is reduced to 0. The central processor unit CPU of the computer unit CU generates an echo signal ECHO, which is applied to the control bus CB and to the multiplexer MUX. As previously discussed in conjunction with FIG. 10B, the echo signal ECHO permits the generation of a double-duration command signal CMD which is transferred to the peripheral-unit controller PUC. The microengine unit then generates an EOB-interrupt signal in response thereto.

As indicated in FIG. 17, after each transfer of data to the peripheral device, the transfer count, which has been decremented by the central processor unit CPU in accordance with the programmed Automatic I/O instruction, is identified to determine whether or not it has been reduced to 0 (section 16). If it is not equal to 0, the entire output-transfer process is repeated starting at section 12, and includes a device status check, generation of the data service-interrupt-signal, execution of an automatic output instruction resulting in the transfer of an additional byte of data to the selected peripheral-unit controller, transfer of the additional byte of data to the device, and a determination of the transfer count.

Each time data is transferred to the peripheral-unit controller, the computer unit CU generates a command signal CMD to reset the interrupt signal in the microengine unit MEU. The command signal resets the interrupt signal by initiating the generation of a subsequent microcode word out of the microengine unit MEU.

If the command signal CMD is only 250 nanoseconds long, its nominal duration, the software and firmware programmed sequence is repeated. The sequence is repeated because the nominal duration command signal CMD is treated by the microengine unit as if it was the first command signal CMD generated at the beginning of data transfer operations. However, if the command signal CMD is 500 nanoseconds long, which is the double-duration command signal, the microengine unit MEU generates a microcoded word having an EOB-interrupt signal, as shown in section 17.

When the transfer count is decremented to 0 by the computer unit CU (section 16), indicating that all of the data has been transferred for that particular operation, the elongated command signal, generated by the multiplexer unit MUX, is transferred to the peripheral-unit controller PUC which, in response thereto, generates an EOB-interrupt signal (section 17) terminating the data transfer.

Each time signals representing a byte of data are transferred from the computer unit CU to the peripheral-unit controller PUC, the peripheral-unit controller in turn transfers the data byte signals to the peripheral unit PU (section 15). Typically, this data transfer from the peripheral-unit controller PUC to the peripheral unit PU is accomplished by means of a data-out signal OUTD which is asserted by the programmed computer unit CU to clock data signals out of the peripheral-unit controller and onto data lines of the peripheral-unit interface cable PUIC. The peripheral unit indicates that the data has been received by means of an acknowledge signal, or busy signal, on one of the status lines. Exact interface protocol is device dependent.

As indicated in FIG. 17, the last operation to be performed after the generation of an EOB-interrupt signal is to ascertain the device status (section 18) to determine the reason for termination of the operation. The device status can be requested by the central processor unit CPU under software control, to ascertain the reason for the EOB-interrupt signal. This is accomplished by the generation of a status control signal STAT executed by the programmed central processor unit CPU and transferred by the multiplexer MUX to the selected peripheral-unit controller PUC. The status word drivers STDRV in the peripheral-unit controller are enabled, thereby transferring the status word from that controller over the data lines of the input/output bus IOB to the multiplexer MUX and the computer unit CU. The individual status bits of the status word can then be tested by the central processor unit CPU to determine whether the peripheral-unit controller operation ended normally, completing transfer of the data, or whether it terminated because of an error.

TYPICAL OPERATION IN AN INPUT DATA TRANSFER

Figure 18:
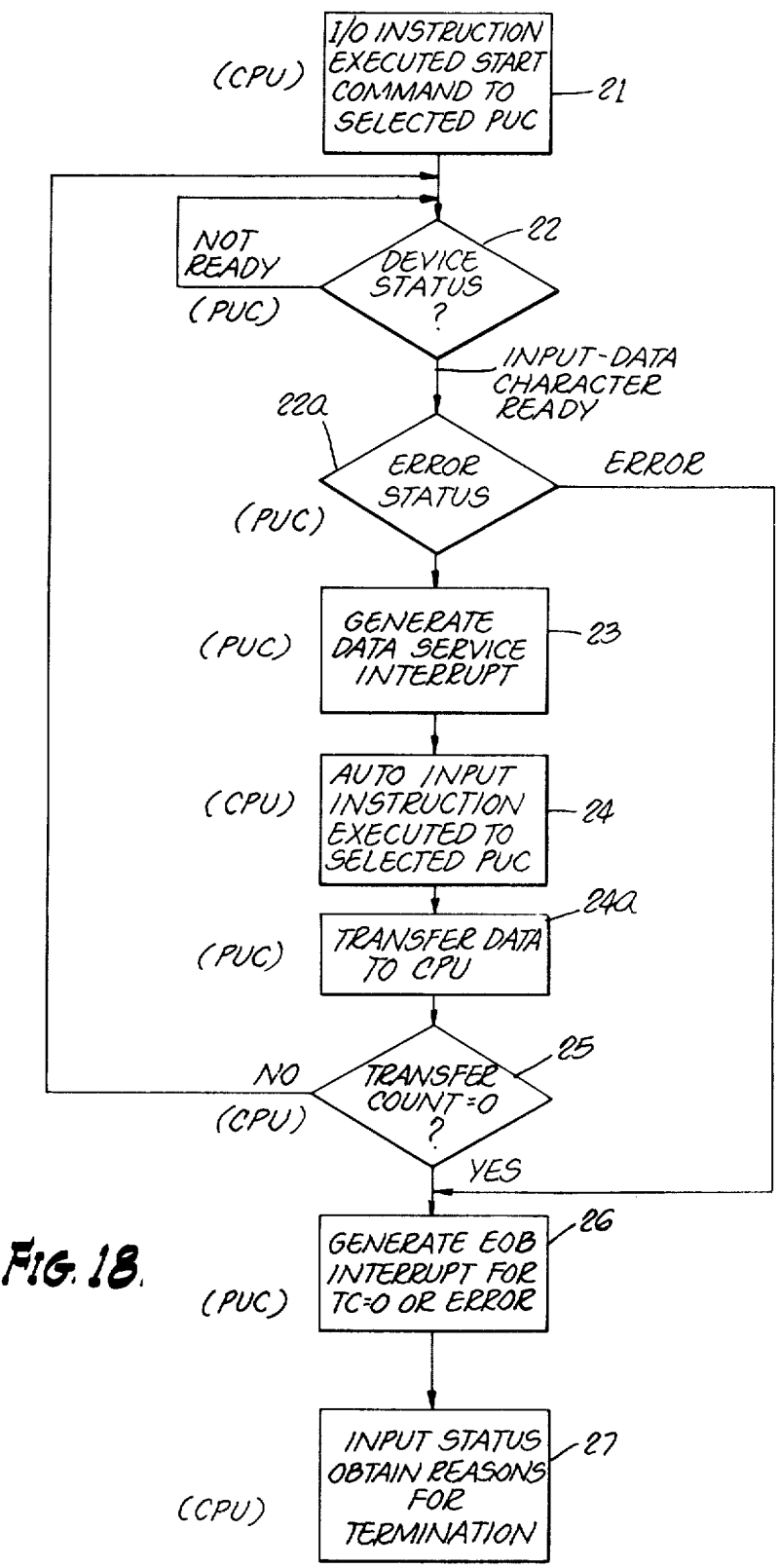
FIG. 18 is a flow diagram indicating the sequence of operations involved in a typical input-data transfer.

FIG. 18 is a flow chart showing parts of the system that operate as a distributed input/output system DIOS for performing a typical input-data transfer.

The starting of the input operation is similar to the starting of the output operation. The central processor unit CPU, in accordance with the software program stored in the main memory unit MMU, starts an input operation by executing an input instruction (section 21) to transfer a command word to the multiplexer unit MUX. The instruction includes a 3-bit code addressed to a selected peripheral-unit controller. The instruction also contains a function bit, the truth value of which indicates that a command is being issued. In response to the command word transferred from the computer unit to the multiplexer, a command control signal CMD is then generated by the multiplexer MUX, as described in conjunction with FIG. 10A, and transferred over the input/output bus IOB to the selected peripheral-unit controller PUC.

In a manner described previously in conjunction with FIG. 17, the command signal CMD, causes the selected-peripheral-unit controller PUC to ascertain the device status (section 22) to verify that the device is operational and that the device has data, ready to be transferred to the computer unit CU. However, if the device is operational but data is not yet ready to be transferred, the peripheral-unit controller PUC recycles the status check and thus waits for the data to become available. As in the case of an output-data transfer, any operational error (section 22A) causes the peripheral-unit controller PUC to generate an EOB-interrupt signal (section 26), resulting in the termination of the transfer operation. When data is ready to be transferred from the peripheral-unit controller to the computer unit, and if no status error exists, the peripheral-unit controller generates a data-service interrupt signal (section 23) which is transferred over the input/output bus IOB to the multiplexer MUX.

When the data-service interrupt signal attains top priority in the multiplexer, it is recognized by the computer unit CU and is vectored to a preselected location in the main memory unit MMU as described previously in conjunction with FIGS. 10A and 10B.

When the central processor unit CPU receives a data-service interrupt signal from the peripheral-unit controller PUC, an input transfer of data takes place directly between the peripheral device PU and the main memory unit MMU utilizing automatic input instructions (section 24). Operation involving automatic-input instructions is similar to that previously described for automatic-output instructions, except that the direction of data transfer is reversed.

After each data-service interrupt signal and input-data transfer, an interrupt-resetting command signal CMD is transferred to the peripheral-unit controller PUC. The resetting command signal is only 250 nanoseconds long if an ending condition has not occurred. However, it is 500 nanoseconds long if an ending condition has occurred, such as the transfer count being reduced to 0 (section 25). If the transfer count does not equal 0, the device status word is rechecked (section 22), and the peripheral device is sent signals, namely, peripheral-unit control signals which indicate that the previously transferred data byte has been accepted by the computer unit CU. The input-data transfers and data-service-interrupt signals are repeated at a rate determined by the peripheral unit and continue until the command signal of 500 nanoseconds duration is generated, thus indicating that an ending condition or transfer count has been reduced to 0 and that all the data to be transferred to the computer unit CU has been transferred.

When the 500 nanosecond command signal CMD is transferred to the peripheral-unit controller, the controller memory unit CMU generates an EOB-interrupt signal (section 26) resulting in the termination of the transfer operation. As in the typical output-data transfer, after the EOB-interrupt signal has been generated and processed, the computer unit CU tests the device status word to ascertain the reason for the termination if it has been previously programmed to do so (section 27).

The sequence of events and operations which occur in typical output-data and input-data transfers have been generally outlined. The particular operating sequences for various standard peripheral units will now be discussed in more detail. It is to be understood that the operation of the distributed input/output system DIOS, as described in conjunction with the flow charts of FIGS. 17 and 18, is essentially the same for any standard peripheral device, except for differences in the microcode that has been programmed into the controller memory unit CMU, and differences in the function of each device control signal and of each status signal and their timing relation to data transfer.

OPERATION OF THE DISTRIBUTED INPUT/OUTPUT SYSTEM DIOS WITH A STANDARD LINE PRINTER

In the following description, it is assumed that the line printer utilized in conjunction with the computer unit CU uses 8-bit parallel data. It is also assumed that the printer utilizes a Strobe signal to synchronize the input data to the printer electronics; a Busy signal that indicates that the line printer is in the process of operating on data previously transferred; a Power signal that indicates that AC and DC power has been applied to the printer; an Acknowledge signal that indicates that data, transferred to the line printer, has been accepted by it; a Paper-Low signal that indicates that the amount of paper still available in the line printer is low; and a Printer-Connected signal that indicates that the line printer peripheral-unit interface cable PUIC is properly connected to the peripheral-unit controller. Line printers of the type herein described in conjunction with this operation are, by way of example, the Centronics Model 101 or the Centronics Model 306, manufactured by the Centronics Data Computer Corporation of Hudson, New Hampshire. However, it will be apparent that many generally commercially available line printers can be operated in conjunction with the distributed input-/output system DIOS.

Figure 19:
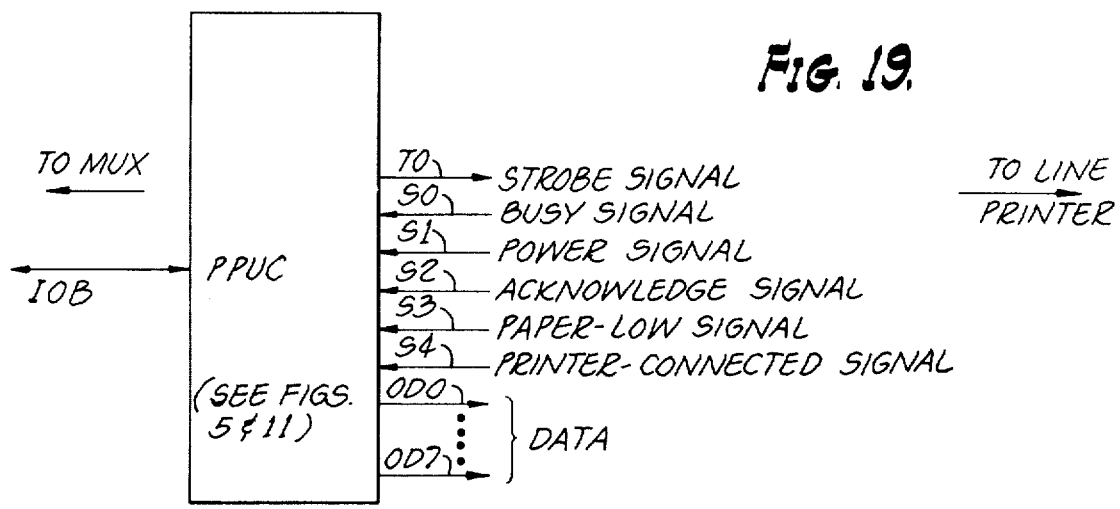
FIG. 19 is a simplified interface diagram indicating connections between the distributed input/output system and a standard line printer.

Since the line printer described is a parallel data device, the peripheral-unit controller utilized in conjunction with the line printer is one of the parallel versions represented by FIGS. 5 and 11. FIG. 19 is a simplified interface diagram indicating the status lines (marked S0, ..., S5 in FIG. 5), control lines (marked T0, ..., T3 in FIG. 5), and data lines (marked OD0, ..., OD7 and ID0, ..., ID15 in FIG. 5), that are connected between the parallel-peripheral-unit controller PPUC and a typical line printer.

As seen in FIG. 19, at the upper right-hand side of the parallel-peripheral-unit controller PPUC, there are eight unidirectional data lines OD0, ..., OD7 for data transfer from the peripheral-unit controller PUC to the line printer. Because the line printer functions only to print out information transferred from the computer unit to the line printer, data is transferred in only an output direction.

Of the remaining lines represented by arrowheads along the right side of the peripheral-unit controller PPUC, the control line T0 is transferred from the peripheral-unit controller PPUC to the line printer, and five are status lines S0, ..., S4 over which are transferred signals from the line printer to the peripheral-unit controller.

The control line T0 is used to transfer the strobe signal which is a 500 nanosecond signal that is generated as part of the controller memory unit CMU output word in the peripheral-unit controller to enter data into the line printer.

The status lines, which are used to transfer status signals from the line printer to the IO status subunit IOS (see FIG. 5), include a Busy line S0, a Power line S1, an Acknowledge line S2, a Paper-Low line S3, and a Printer-Connected line S4.

A Busy signal indicating that the line printer is still processing data from the previous operation, is transferred over the Busy line S0. The Busy line is normally tested under software control before starting the printer. The Power signal indicating that power has been applied to the line printer, is transferred over Power line S1. The Acknowledge signal indicating that the transferred data has been accepted by the line printer, is transferred over Acknowledge line S2. The Paper-Low signal signifying that the paper supply in the line printer is low or nearly empty, is transferred over Low line S3. The Printer-Connected signal indicating that the line printer cable is properly connected, is transferred over Printer-Connected line S4.

The manner in which the various status signals are generated, and in which the circuitry of a typical line printer is used to generate the status signals, is described in detail in technical manuals published by the manufacturers of line printers. Therefore, such information is not included herein. By way of example, reference may be had to the Technical Manual for the Model 101 Line Printer, published by the Centronics Data Computer Corporation in 1972.

Figure 20:
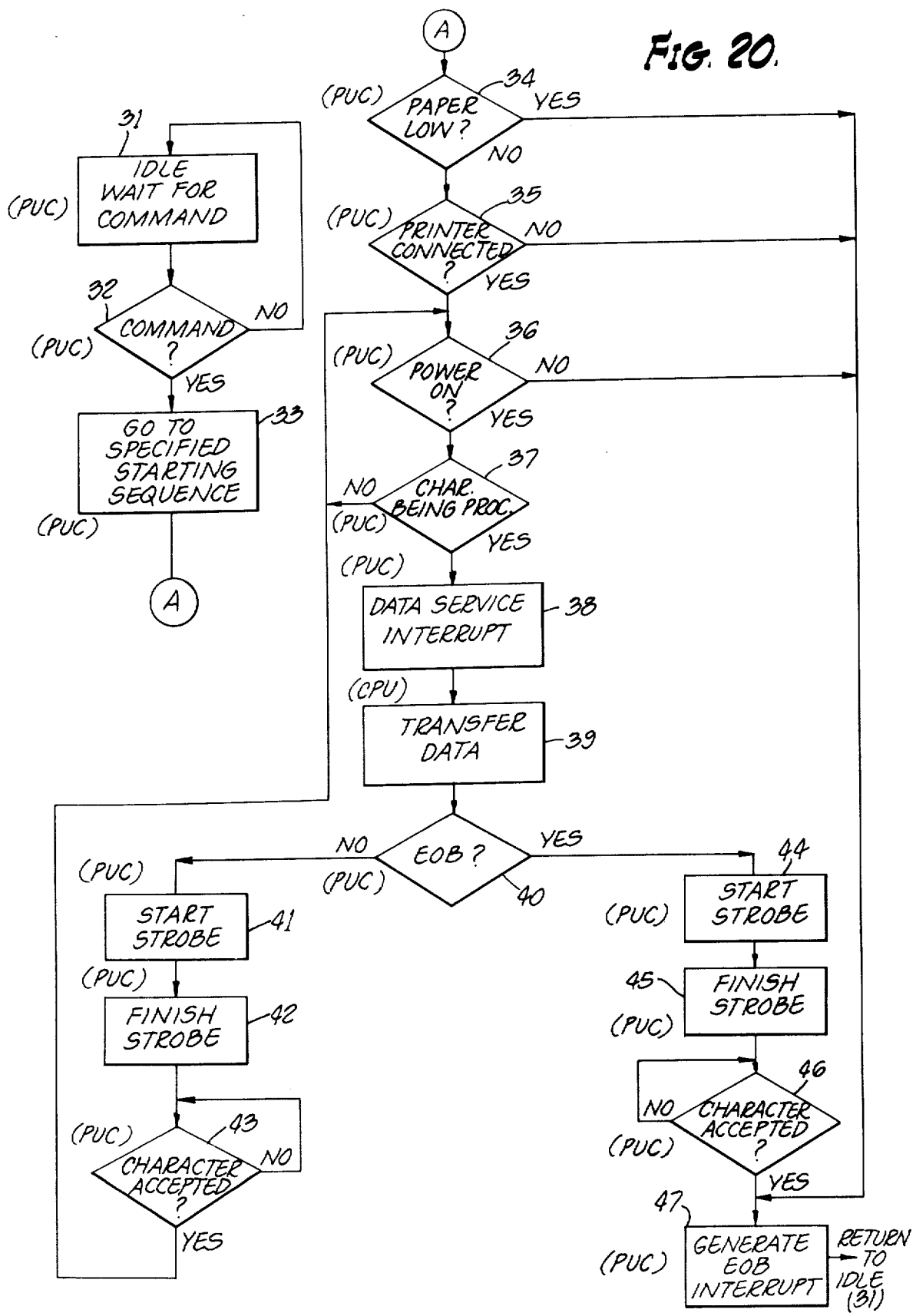
FIG. 20 is a flow chart diagram indicating operation of the distributed input/output system in conjunction with a standard line printer.

FIG. 20 is a flow chart showing parts of the system that operate as a distributed input/output system DIOS in conjunction with a standard line printer. As indicated in the upper left-hand corner of FIG. 20, initially the distributed IO system remains idle (section 31), waiting for a command word from the computer unit CU; and the line printer is also idle but is enabled for operation. As long as no command word is received (section 32), the distributed IO system remains in an idle condition. As soon as a command word is received, the distributed IO system goes to a starting sequence as specified by the central processor unit CPU (section 33), which is shown continued at the upper middle portion of FIG. 20, starting at the point in the figure indicated by (A). As indicated in the upper half of FIG. 20, initial status checks are first made by the peripheral-unit controller PUC. The first such status check is a check of the Paper-Low status line S3 for a determination of whether or not the paper is low (section 34).

If the Paper-Low status signal indicates that the available paper supply is low, as indicated in the flow diagram, a new count is loaded into the ROM program counter RPC (see FIG. 8), resulting in the generation of an EOB-interrupt signal (section 47), and operation is terminated. If the Paper-Low status signal indicates that the paper supply is adequate, then the ROM program counter RPC is incremented and another status signal is checked for a determination of whether or not the printer is properly connected to the peripheral-unit controller (section 35). If the line printer is not properly connected, the microengine unit MEU generates an EOB-interrupt signal as part of the next microcoded word produced by the controller memory unit CMU. If the line printer is properly connected, the peripheral-unit controller PUC will proceed in accordance with the programmed microcode in the controller memory unit CMU (see FIGS. 8 and 9), to test another status signal for an indication of whether or not printer power is on (section 36). If the printer power is not on, an EOB-interrupt signal is generated by the microengine unit MEU.

If the truth state of the signal on the Power status line S1 indicates that power had been applied to the device, the Acknowledge status line S2 is monitored (section 37) by the peripheral-unit controller for an Acknowledge signal in a logical zero state which indicates that the line printer is not processing a character previously transferred by the computer unit CU. If the Acknowledge line signal is in a logical one state, the peripheral-unit controller rechecks power and again monitors the Acknowledge line. This iterative process is repeated until the signal on the Acknowledge line S2 becomes a logical zero, indicating that the line printer has completed processing the previously transferred data character and is now ready for a subsequent transfer. When the signal on the Acknowledge line S2 becomes a logical zero, the peripheral-unit controller generates a data-service interrupt signal (section 38) that is transferred to the multiplexer MUX over the input/output bus IOB. When top priority is attained, the interrupt signal is vectored to programmed, preselected memory cells in the main memory unit MMU of the computer unit CU.

The central processor unit CPU then executes an automatic output instruction and places data on the data bus DB and the decrements the transfer count and the memory buffer address in the assigned locations of the main memory unit MMU (section 39).

In accordance with the mocrocoded program in the controller memory unit CMU (see FIGS. 8 and 9), and in response to a change in the count in the ROM program counter RPC, the peripheral-unit controller activates a 500 nanosecond Strobe signal on the Strobe Control line T0 to enter the data into the line printer (sections 41 and 42). When the printer acknowledges the data transfer by generating an Acknowledge signal (section 43), the peripheral-unit controller PUC repeats the data-transfer sequence starting with a power-on status check (section 36).

When the multiplexer MUX and computer unit CU has transferred the last data byte of all the data to be transferred to the line printer at that time, a prolonged command signal CMD is sent to the peripheral-unit controller PUC, thus indicating that no more data is to be transferred.

As indicated in FIG. 20, in an end-of-block operation (section 40), instead of looping back to a test of the power-on status signal after acknowledgment of received data by the line printer, the peripheral-unit controller PUC generates an EOB-interrupt signal (section 47) which, like the data-service-interrupt signal, is transferred to the multiplexer MUX over the input/output bus IOB and, when top priority is attained, it is vectored to programmed, preselected memory cells in the main memory unit MMU. As part of the EOB-interrupt sequence, the multiplexer MUX will issue a command signal CMD which will reset the peripheral-unit controller PUC to idle (section 31), making ready for subsequent operations.

Figure 21:
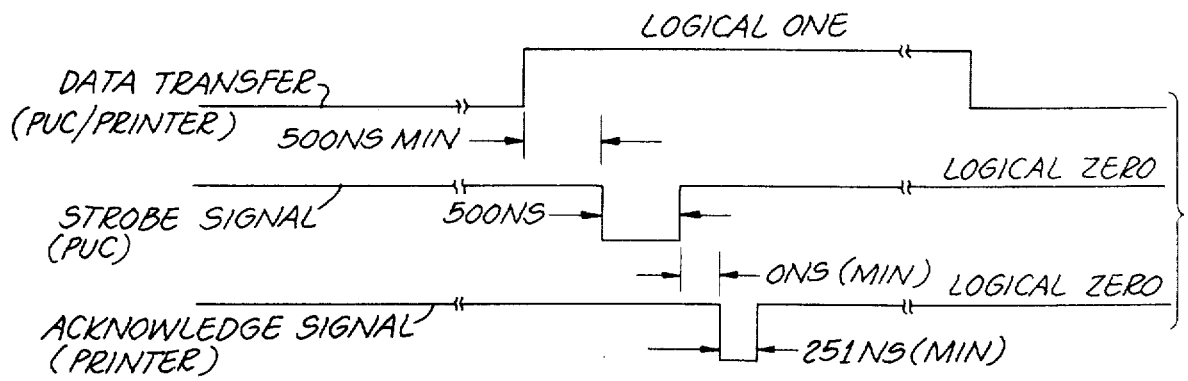
FIG. 21 is a timing diagram of signals utilized in transferring data to a standard line printer.

FIG. 21 is a timing diagram indicating the timing relationship of the data transfer, and the Strobe signal TO and the Acknowledge signal S2 utilized in each transfer of data to a line printer. As indicated in FIG. 21, data is available to the line printer for a minimum of 500 nanoseconds before the Strobe signal (one of the output signals comprising a microcoded word) is generated by the microengine unit MEU to enter the data into the line printer.

The printer's Acknowledge signal may occur immediately after the termination of the Strobe signal and indicates that data has been accepted by the line printer. The Acknowledge signal must have a minimum duration of at least 251 nanoseconds.

Typical Firmware Program

The following discussion of a typical firmware program is based in part upon the section entitled "The Microengine Unit". In this regard, it may be helpful at this point to refer back to that section and particularly to the discussion of FIG. 8 and Tables IV and V.

A typical firmware program for a standard line printer is listed in Table VII. Table VII includes a column indicating the count registered in the ROM program counter RPC (see FIG. 8) which can be in the range of 0 through 15, inclusive. The corresponding set of truth values of the binary microcode output of the controller memory unit CMU for each RPC Count is shown in the next column (having 16 bit positions) to the right, under the heading "CMU - Microcode Output". Counts 9, 10, 11, and 12 are not used in the program shown in Table VII.

The third column, having the heading "operation", includes an abbreviated description of the programmed operation taking place in response to the respective microcode output. Each operation occurs within the 250 nanosecond period of the clock signal CLK.

TABLE VII

TYPICAL FIRMWARE PROGRAM FOR STANDARD LINE PRINTER

| RPC Count | CMU Microcode Output | Operation | Program Sequnce |
|---|---|---|---|
| 0 | 1 0 1 1  0 0 1 1  1 1 1 0  0 0 0 0 | Idle, Wait for Command from Computer | A |
| 1 | 0 1 0 1  0 0 1 1  1 1 0 0  1 1 1 1 | Test "Paper Low" Status Signal | B |
| 2 | 0 1 0 1  0 0 1 1  1 1 0 1  1 1 1 1 | Test "Printer Connected" Status Signal | C |
| 3 | 1 1 0 1  0 0 1 1  1 0 0 1  1 1 1 1 | Test "Power On" Status Signal | D |
| 4 | 1 1 0 1  0 0 1 1  1 0 1 0  0 0 1 1 | Test for FALSE Acknowledge Signal | E |
| 5 | 0 1 0 1  0 1 1 1  0 1 1 0  0 1 0 1 | Generate Data Service Interrupt Signal | F |
| 6 | 1 1 0 0  0 0 1 1  1 1 1 0  1 1 0 1 | Test ECHO Signal for Zero Transfer Count, generate strobe | G |
| 7 | 0 1 0 0  0 0 1 1  1 0 0 0  1 0 0 0 | Generate Data Strobe Signal | H |
| 8 | 1 0 0 1  0 0 1 1  1 0 1 0  0 0 1 1 | Wait for TRUE Acknowledge Signal | I |
| 9 | Not Used With Line Printer In This Program | | |
| 10 | Not Used With Line Printer In This Program | | |
| 11 | Not Used With Line Printer In This Program | | |
| 12 | Not Used With Line Printer In This Program | | |
| 13 | 0 1 0 0  0 0 1 1  1 0 0 0  1 1 1 0 | Generate Last Data Strobe Signal | J |
| 14 | 0 1 0 1  0 0 1 1  1 0 1 0  1 1 1 0 | Wait for TRUE Acknowledge Signal | K |
| 15 | 0 1 0 1  0 0 1 0  1 1 1 0  1 1 1 1 | Generate End-of-Block Interrupt Signal | B',C',D',L |
| Microcode Bit No. (See Table V) | 15 14 13 12 11 10 9 8 7 6 5 4 3 2 1 0 | | |

The four columns of alphabetical symbols under the heading "Program Sequence Condition" indicate the sequence of operations that would be utilized in transferring data terms from the computer unit to a standard line printer. The letters under "Program Sequence Condition" are for purposes of discussion and represent the order in which the operations would take place in a particular example described below, the order being alphabetical.

The "CMU Microcode Output" column is best understood by referring to Table V which indicates the microcode format and the function of each bit in the microcode output.

It will be recalled that the microcode output of the controller memory unit CMU, consists of sixteen binary digit signals, or bits. Output bit Nos. 0-3 comprise the internal branch address. As shown in FIG. 8, the internal branch address signals are applied to the branch address multiplexer BAM and they may be applied to the ROM program counter RPC to produce an original count therein. Counter operation has also been discussed in conjunction with Table IV.

Output bit Nos. 4–6 of the controller memory unit CMU comprise the data select signals. As shown in FIG. 8, these signals are applied to the data selector SEL and select one of eight input signals for transfer to the output of the data selector, in accordance with the digital code represented by the logic levels of the data select signals. By way of example, if the data select signals are coded to represent a decimal 6 (110), the signal on the number 6 input line SLI6 to the data selector SEL will be transferred to the output line SELO of the data selector. As shown in FIG. 8, the signal on the number 6 input line is the command signal CMD.

Output bit Nos. 7 and 8 of the controller memory unit CMU are the data-service interrupt signal and end-of-block interrupt signal respectively.

Output bit Nos. 9–12 are control signals which include the Byte Select Signal BSS and signals that in parallel controllers are transferred to the peripheral unit and in serial controllers are applied to the universal asynchronous receiver/transmitter UART (see FIGS. 13 and 14).

Output bit Nos. 13–15 include the Select-Signal-A bit SSA which is applied to the branch address multiplexer BAM to cause selection of either an internal branch address or an external branch address; the Enable Increment bit EINC which is applied to the ROM program counter RPC to enable the counter's incrementing operation, and the Invert bit INV which is applied to the select inverter INVT to selectively invert the signal on the output line SELO of the data selector SEL.

As indicated in the program sequence columns by condition A, the peripheral-unit controller, being used in conjunction with a standard line printer, is initially in an idle condition, or mode, waiting for a command signal from the computer unit CU. In this idle mode, the RPC Count equals 0.

Comparing the four least significant bits (0–3) of the first row of the CMU microcode output with the corresponding bits in Table V, indicates that the internal branch address is 0, that neither interrupt signal is being generated and that the data select signals are set to number 6 which corresponds to the command line SLI6. The Select-Signal-A bit SSA (bit No. 13) is set to a logic one to select the external branch address that is generated by the computer unit CU (FIG. 1). Although not shown in Table VII, the external branch address transferred to the peripheral-unit controller PUC by the computer unit CU, in accordance with the software program stored in the mainmemory unit MMU, will be a decimal address 1. RPC Count 1 corresponds to the operation "paper low" status test, condition B in the program sequence indicated in Table VII. As also indicated in Table VII, the CMU microcode output for an RPC Count 1 includes an internal branch address (1111) equal to a decimal 15 and a set of data select signals (output bit Nos. 4–6) corresponding to a decimal 4. A decimal 4 on the data select signal lines causes selection of the status line to which the "paper low" status signal is applied.

If the "paper low" status signal has a logical one value, indicating that the paper supply is low, the next RPC Count is count 15, which corresponds to the last previous internal branch address of the microcode output corresponding to RPC count 1.

Accordingly, the next condition in the program sequence will be B', as indicated in the program sequence column. In the operation corresponding to condition B', an end-of-block interrupt signal EOB is generated. Generation of an end-of-block interrupt signal is evident in Table VII in that in the microcode output for RPC Count 15, bit No. 8 has changed to a zero state corresponding to an EOB-interrupt signal (see Table V).

If the "paper low" status signal has a logical zero value, indicating that the paper supply is adequate, the ROM program counter RPC is incremented, resulting in an RPC Count of 2. As indicated in Table VII, RPC Count 2 corresponds to the "printer connected" status test operation represented in the program sequence column as condition C. Since the Select-Signal-A bit SSA (Bit 13) is a logical zero in the microcode output for the "printer connected" status test operation, the next RPC Count must be either the increment of RPC Count 2, which would be RPC Count 3, or a branch to the internal branch address of 15 (1111) as shown in bits 0–3 of the microcode output corresponding to RPC Count 2.

In the latter case, if the printer is not connected, the RPC counter is loaded with the internal branch address 15 as specified in RPC Count 2, thereby resulting in sequence C' and an RPC Count of 15. The RPC Count of 15 performs the same end-of-block operation as previously described for sequence condition B'.

If the printer is connected, RPC Count 2 is incremented to the next step corresponding to RPC Count 3. RPC Count 3 corresponds to the "Power-on" status test operation represented in the program sequence column as condition D. Since the Select-Signal-A bit SSA (Bit 13) is a logical zero in the microcode output for the "Power-on" status test operation, the next RPC count must be either the increment of RPC Count 3, which would be RPC Count 4, or the internal branch address of 15 (1111) as shown in bits 0–3 of the microcode output corresponding to RPC Count 3.

In the latter case, if the power is not on, the RPC counter is loaded with the internal branch address of RPC Count 2 thereby resulting in a sequence condition D' and RPC Count 15. This count performs an end-of-block operation as previously described for B' and C'. Thus, the controller memory unit CMU either branches to sequence D' if power is not on, or increments to the next step (sequence E) if the power is on.

If the power is on, the RPC Count is incremented to the next step, RPC Count 4. RPC Count 4 corresponds to the operation "test for FALSE acknowledge signal", condition E in the program sequence. If the acknowledge signal is FALSE, the RPC Count 4 will be incremented to 5. If the acknowledge signal is TRUE, the internal branch address of 3 as specified by microcode bit Nos. 0–3 will be loaded into the RPC counter causing a branch back to sequence condition D and repetition of the test performed by RPC Count 3. If, however, the acknowledge is TRUE, the RPC Count 4 will be incremented to the next step, RPC Count 5.

The microcode output for RPC Count 5, sequence condition F, includes a 0 as bit No. 7, indicating that the data-service-interrupt signal is set to a logic one state. In addition, the data select signal bits, bit Nos. 4, 5, and 6, are set to decimal number 6 which corresponds to the command line SLI6. In this way, the peripheral-unit controller PUC is rendered ready to monitor the signal on the command line SLI6 which is set to a TRUE logic state after the data-service-interrupt signal has been processed by the computer unit CU, as described in conjunction with FIGS. 10A and 10B.

When the RPC Count is 5 and the command signal CMD is set to a TRUE logic state, the RPC Count is incremented to count 6, resulting in performance of the operation corresponding to program sequence condition G in the program sequence column. As indicated under the operation column, this operation generates a data strobe (data bit 12 equals zero) and involves an ECHO signal test. IF the ECHO signal is in a logic one state (transfer count equal zero), the program will branch to count 13, condition J, as indicated by the internal branch address of 1101 in bit position 0–3. Count 13 corresponds to generation of a data strobe signal to transfer the last term of a data block to the line printer before an end-of-block interrupt signal is generated. If, on the other hand, the ECHO signal is in a logic zero state (transfer count not equal to zero), the counter will increment to count 7, condition H.

As previously indicated in the discussion of FIGS. 10A and 10B, an echo signal ECHO is generated (that is, is changed to a logic one state) by the computer unit CU when the transfer count has reached zero, thus indicating that the last term of the data block is being transferred. On the other hand, if the echo signal ECHO is not generated (that is, remains in a logic zero state), that is an indication that the transfer count has still not reached zero and that one or more additional data terms of a data block are to be transferred to the line printer.

It is assumed for purposes of explanation that the transfer count has not yet reached zero and hence that additional data terms are to be transferred. In other words, it is assumed that the command signal CMD is in a FALSE state during condition G, which causes the peripheral-unit controller PUC to increment to sequence H, RPC Count 7. Condition H in the program sequence, corresponds to the operation of generating a data strobe signal (data bit 12 equals zero).

The data strobe signal (bit 12 equals zero), is generated for two clock periods corresponding to RPC Counts 6 and 7. Thus, the total duration of the data strobe signal, which corresponds to program sequence conditions G and H in Table VII, is about 500 nanoseconds. The ROM program counter RPC is then incremented to count 8, corresponding to the internal branch address bit Nos. 0–3 of the microcode output word of Count 7. As indicated in Table VII, the operation corresponding to RPC Count 8 is "wait for TRUE acknowledge signal", condition I in the program sequence.

It is apparent from the zero truth value of the EINC bit, bit No. 14, that this is a "wait" operation in which the microcode output remains the same until the signal on the selected status line changes its logic state from FALSE to TRUE. This is a wait operation in which the internal branch address represented by bits 0–3, is set to be equal to RPC Count 3. In this way, the microcode output continues to wait for a change on the selected status lines SLI0, . . . , or SLI6. When this change occurs, the new count corresponds to the internal branch address bits (0–3). The program will branch to count 3, sequence D, as indicated by the internal branch address of 3 (0011) in bit positions 0–3, and continue the previously defined sequence for each additional data transfer.

If the ECHO signal was a logical one in sequence G (RPC Count 6), indicating that the last data byte is being transferred, the program branches to sequence J, RPC Count 13, corresponding to the internal branch address bits (0–3) of RPC Count 6.

The last data strobe is generated for two clock periods corresponding to RPC Counts 6 and 13. Thus, the total duration of the data strobe signal, which corresponds to program sequence conditions G and J in Table VII, is about 500 nanoseconds. The ROM program counter RPC is then incremented to count 14, corresponding to the internal branch address bit Nos. 0–3 of the microcode output word of count 13. As indicated in Table VII, the operation corresponding to RPC Count 14 is "wait for TRUE acknowledge signal", condition K in the program sequence.

It is apparent from bits 13 and 14 and the indentity of the internal branch address and the RPC Count, that this is a "wait" operation in which the microcode output remains the same until the signal on the selected status line changes its logic state from FALSE to TRUE. This is a wait operation in which bit 14 equals one and bit 13 equals zero and the internal branch address represented by bits 0–3, is set to be equal to the RPC Count. In this way, the microcode output continues to branch to the same internal address of 14 and thus maintains its status while waiting for a change on the selected status line SLI0, . . . , or SLI6. When this change occurs, the count is incremented from 14 to 15. This step occurs when the line printer has received the last data term of the data block being transferred at that time and has acknowledged receipt thereof. After the Acknowledge signal has returned to a logic one state, that is, a TRUE state, the RPC Count is incremented to 15, which corresponds to a "generate end-of-block interrupt signal" instruction, condition L in the program sequence.

Since the internal branch address in the microcode output corresponding to the RPC Count 15, is a decimal 15, generation of the end-of-block interrupt signal, bit 8, continues until the command signal CMD is received by the peripheral-unit controller PUC in a TRUE, or logic one, state indicating that the computer unit CU has processed the end-of-block interrupt signal. At that time, the RPC Count is incremented from 15 to 0 which returns the controller to the idle state in which it "waits" for another logic one command signal from the computer unit, condition A in the program sequence.

The particular firmware program listed in Table VII does not utilize RPC Counts 9, 10, 11, and 12.

It will now be apparent that Table VII provides a typical firmware program that may be used in the Distributed Input/Output System DIOS operating with a standard line printer. The controller memory unit microcode output word corresponding to each RPC Count of the 16 possible counts generated by the ROM program counter RPC, is shown in Table VII. In addition, Table VII shows the corresponding operation for each such microcode output word and a particular sequence of conditions for the transfer of data terms of a data block from the computer unit CU to a standard line printer. It will now be also apparent that the feedback relationship between the controller memory unit CMU, the ROM program counter RPC, and the data selector SEL, provides a unique means for controlling a programmed sequence of operations. Furthermore, it will be understood that the firmware program is extremely flexible by being responsive to computer unit signals and peripheral unit status signals.

OPERATION OF THE DISTRIBUTED INPUT/OUTPUT SYSTEM DIOS WITH A STANDARD CARD READER

In the following description, it is assumed that the card reader utilized in conjunction with the computer unit CU uses 12-bit parallel data. It is also assumed that the card reader is of the type that will accept a PICK signal and respond thereto to start a card moving through the card reader. It is further assumed that the card reader described herein is of the type that generates a Busy signal to indicate that the card reader is in the process of reading or processing data and cannot then accept a PICK signal; a Ready signal that indicates that the card reader is clear and ready to accept the PICK signal; an Error signal that indicates that an error condition exists in the card reader; a Hopper Check signal that indicates when the card hopper is empty of cards; and an Index Mark signal generated once by the card reader for each column of data as the card moves through the reader. Card readers of the type herein described in conjunction with this operation are by way of example, the Documentation M-200, M-600, M-1000, or M-1200 card reader, each manufactured by Documation Incorporated of Melbourne, Florida. However, it will be apparent that many generally commercially available card readers can be operated in conjunction with the distributed input/output system DIOS.

Since the card reader described is a paralleldata device, the peripheral-unit controller utilized in conjunction with the card reader is one of the parallel versions, illustrated in FIGS. 5 and 11. A simplified interface diagram indicating the status lines, control lines, and data lines that are connected between the peripheral-unit controller and a typical card reader, appears in FIG. 22.

Figure 22:
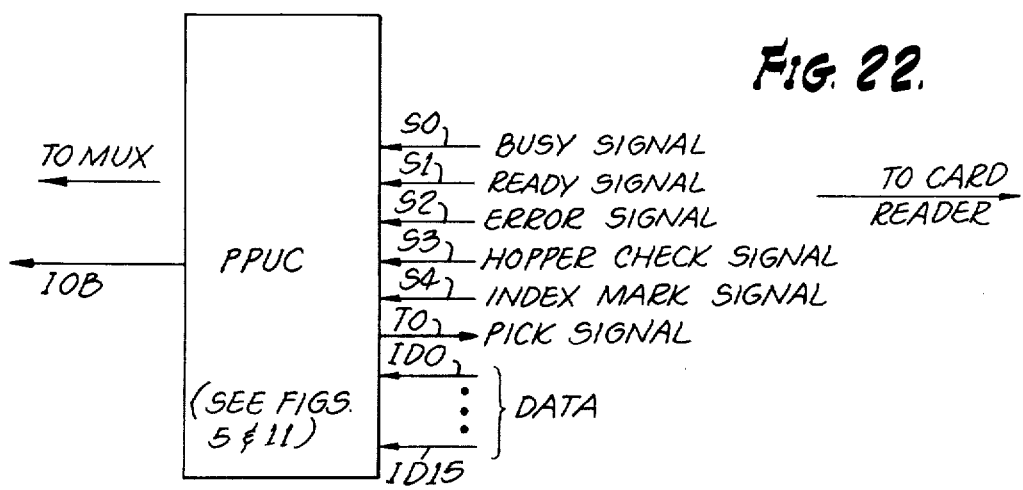
FIG. 22 is a simplified interface diagram indicating the connections between the distributed input/output system and a standard card reader.

As shown in FIG. 22, at the upper right-hand side of the parallel-peripheral-unit controller PPUC, there are 16 unidirectional data lines ID0, . . . , ID15 for data transfer from the card reader to the peripheral-unit controller. Since the card reader herein described is a 12-bit device, the four most significant data bist are made logical zero by being tied to ground. The card reader functions only to transfer information signals to the computer unit. Accordingly, data signals are transferred in only an input direction.

Of the remaining lines indicated in FIG. 22, along the right side of the parallel-peripheral-unit controller PPUC, PPUC, one is a pick control line T0 which is transferred from the peripheral-unit controller PUC to the card reader, and five are device status lines S0, . . . , S4 over which are transferred signals from the card reader to the peripheral-unit controller.

The control line T0 is a PICK line over which a PICK signal, when transferred to the card reader, starts a card moving through the card reader.

The status lines that are used to transfer status signals from the card reader to the IO status subunit IOS (see FIGS. 5 and 11), include the following: a Busy line S0, a Ready line S1, an Error line S2, a Hopper Check line S3, and an Index Mark line S4.

The Busy line S0, is used to transfer a Busy signal indicating that the card reader is still reading or processing data and cannot then accept a PICK signal. The Ready line S1 is used to transfer a Ready signal to indicate that the card reader is clear and ready to accept a PICK signal. The Error line S2 is used to transfer an Error signal that indicates that an error condition exists in the card reader. The Hopper Check line S3 is used to transfer a Hopper Check signal from the card reader when the card hopper is empty of cards. The Index Mark line S4 is used to transfer an Index Mark signal generated once by the card reader for each column of data as the card moves through the reader.

The manner in which the various status signals are generated, and in which the circuitry of a typical card reader is used to generate status signals, is described in detail in technical manuals published by the manufacturers of card readers. Therefore, such information is not included herein. By way of example, reference may be had to the Technical Manual for the Model M-1000L card Reader, published by Documentation Incorporated, in 1973.

Figure 23:
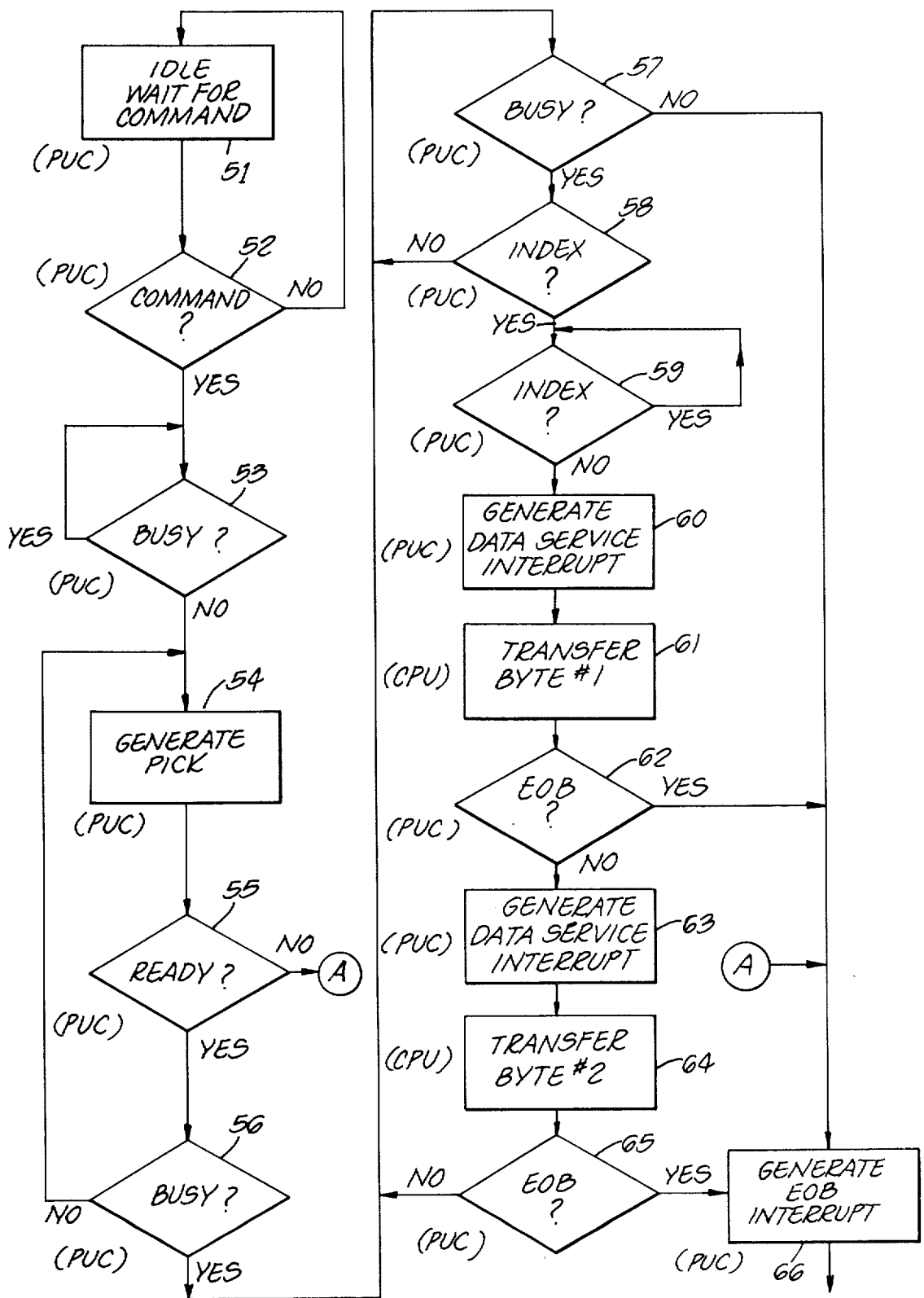
FIG. 23 is a flow diagram indicating the operation of the distributed input/output system in conjunction with a standard card reader.

FIG. 23 is a flow chart showing parts of the system that operate as a distributed input/output system DIOS in conjunction with a standard card reader. As indicated in the upper left-hand corner of FIG. 23, initially the distributed input/output system remains idle (section 51) waiting for a command word from the computer unit. As long as no command word is received, the distributed input/output system remains in an idle condition. As soon as a command word is generated by the computer unit CU and received by the multiplexer MUX, the command control signal CMD and external branch address are transferred to the microengine unit MEU which commences the data transfer sequence, the first step of which is a test of the status of the Busy line S0 (section 53).

If a logical 0 or a FALSE signal is present on the Busy line S0, indicating that the card reader is not then processing a card, the peripheral-unit controller then generates a PICK signal to start the next card through the reader (section 54). The Ready status line is then tested by the peripheral-unit controller (section 55). If a logical one or a TRUE signal is present on the Ready status line, this is an indication that the card reader is ready to read data. iI the signal on the Ready status line is a logical zero or FALSE, the peripheral-unit controller generates an EOB-interrupt signal to terminate the operation. In FIG. 23, the path between section 55 and section 66, corresponding to the generation of an EOB-interrupt signal, is indicated by A.

If a logical one or TRUE signal is on the Ready line, the peripheral-unit controller again tests the Busy line (section 56). If a logical zero or FALSE signal is on the Busy line, the peripheral-unit controller PUC again generates a PICK signal (section 54), and it also repeats a Ready signal status test and a Busy signal status test (sections 55 and 56). If, on the other hand, the Busy signal is a logical one or TRUE, a second Busy status test is made (section 57). This second Busy status test (section 57) is indicated in the upper right section of FIG. 23. A change in the Busy status signal to a FALSE or logical zero condition, indicates an error condition and causes the generation of an EOB-interrupt signal and termination of the operation (section 66). If, on the other hand, the second Busy signal status test indicates a TRUE or logical one Busy signal, the card reader has begun to read data from the card.

The peripheral-unit controller PUC then tests the status of the signal on the Index-Mark status line (section 58).

If the Index-Mark signal is FALSE or logical zero, a Busy signal status test is repeated. However, if the Index-Mark signal is TRUE or logical one, the peripheral-unit controller then makes a second Index-Mark signal status test (section 59) to ascertain whether or not the Index-Mark signal has changed from a TRUE or logical one level to a FALSE or logical zero level on the Index-Mark status line. An Index-Mark signal is detected by first checking for a TRUE level and then for a FALSE level on the Index-Mark status line.

When the Index-Mark signal is detected in the manner just described, the peripheral-unit controller generates a data-service-interrupt signal which is transferred to the multiplexer MUX over the input/output bus IOB (section 60). When the interrupt signal attains top priority, it is vectored to programmed, preselected memory cells in the main memory unit MMU of the computer unit CU. The central processor unit CPU then executes an automatic input instruction and the computer unit CU generates a data-in control signal IND. One byte of data is then transferred to the computer unit CU (section 61) and the transfer count and memory buffer are decremented by the central processor unit CPU. If the data transfer of a first byte does not decrement the transfer count to 0, a second data-service-interrupt signal is generated (section 63) to transfer a second (section 64), least significant, byte to the computer unit CU.

Since the card reader is a 12-bit device, the upper four bits of the first byte are filled with zeros and sent to the multiplexer MUX and the central processor unit CPU. When a second byte is transferred (section 64), the central processor unit CPU again checks for a transfer count of 0. If the transfer count has been reduced to 0, the peripheral-unit controller generates an EOB-interrupt signal (section 66). If the transfer count has not been decremented to 0, the peripheral-unit controller again performs a Busy signal status test (section 57), and then it generates additional data-service-interrupt signals after detection of the index mark occurs. This process continues until all data to be transferred at that particular time from the card reader to the computer unit CU, has been transferred. If the transfer count is equal to 0, the peripheral-unit controller generates and EOB-interrupt signal which results in termination of the data transfer operation and return of the peripheral-unit controller to an idle state (section 51).

Figure 24:
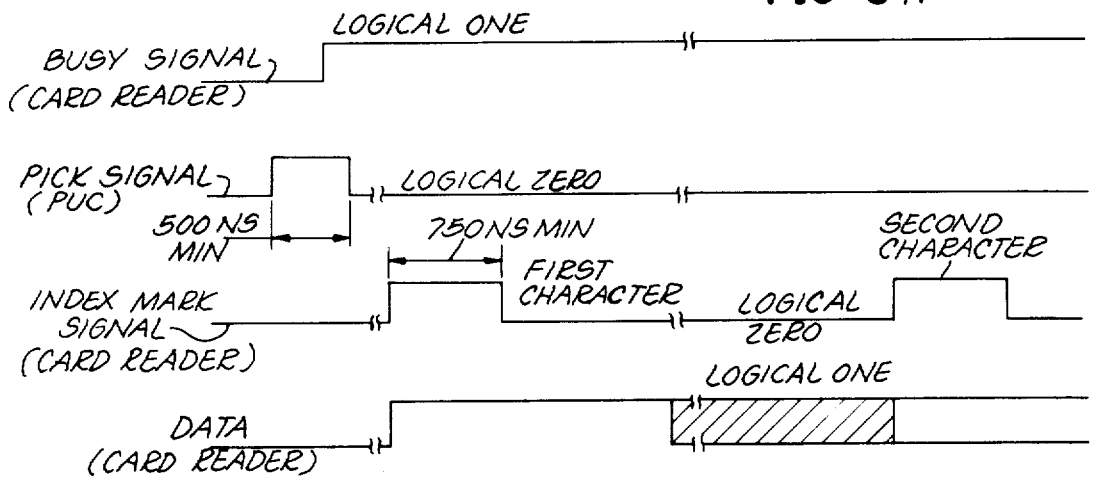
FIG. 24 is a timing diagram of the signals involved in a data transfer from a standard card reader.

FIG. 24 is an interface timing diagram for the card reader, and indicates the timing relationship of the Busy status signal, the PICK control signal, the Index-Mark status signal and data transfer. As indicated in FIG. 24, the peripheral-unit controller PUC generates a PICK control signal to start a card moving through the card reader. The Busy signal goes to a logical one or TRUE state when the card ready starts the card in motion. After the PICK control signal attains a logical one or TRUE state, the Busy signal follows suit and retains a TRUE state while transferring data from the card. As indicated in FIG. 24, the PICK control signal will remain a logical one or TRUE for a minimum of 500 nanoseconds and until the Busy signal is sent by the card reader. When the card reader data is stable and ready to be read, the card reader sends the Index-Mark signal for a minimum of 750 nanoseconds. It is not until after the Index-Mark signal has returned to a logical zero or negative state, that data is transferred. Data must be held stable by the card reader for at least two automatic input instruction by the central processor unit CPU after the trailing edge of the Index-Mark signal.

OPERATION OF THE DISTRIBUTED INPUT/OUTPUT SYSTEM DIOS WITH A STANDARD HIGH-SPEED PAPER-TAPE READER

In the following description, it is assumed that the high-speed paper tape-reader utilized in conjunction with the computer unit CU uses 8-bit parallel data. It is also assumed that the paper-tape reader is of the type that generates a Data-Ready signal which, when a logical one or TRUE, indicates that the data track outputs from the paper-tape reader are in the "on character" position and when a logical zero or false, indicates that the data track outputs of the paper-tape reader are in the "between character" position where data outputs have no signifcance; and a System Ready signal which, when a logical one or TRUE, indicates that AC and DC power has been applied to the paper-tape reader and that the reader is in the run mode, and when a logical zero or FALSE, indicates that the reader is either in the load mode or is out of tape. The reader is in the load mode when a front panel switch called "load" is depressed and the reader is inhibited while the tape is being loaded onto the tape reader. It is also assumed that the tape reader of the type herein described, responds to a drive-left signal to start the tape moving in the reader in the left-hand direction and responds to a drive-right signal to start the tape moving in the reader in the right-hand direction. High-speed paper tape readers of the type herein described in conjunction with this operation are, by way of example, the Remex Model RAB 6375BA1/661/551/U000 reader manufactured by the EX-CELL-O Corporation of Santa Ana, California. However, it will be apparent that many generally commercially available high-speed paper-tape readers may be operated in conjunction with the distributed input-/output system DIOS.

Since the high-speed paper-tape reader described is a parallel-data device, the peripheral-unit controller utilized in conjunction with the high-speed paper-tape reader is one of the parallel versions illustrated in FIGS. 5 and 11. A simplified interface diagram indicating the status lines, control lines, and data lines that are connected between the peripheral-unit controller and a typical high-speed paper-tape reader, appears in FIG. 25.

Figure 25:
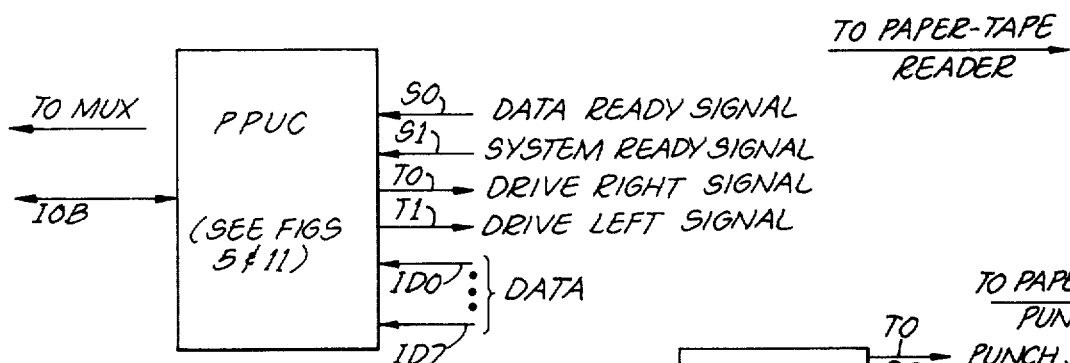
FIG. 25 is a simplified interface diagram indicating the connections between the invention and a standard high speed paper-tape reader.

As shown in FIG. 25, at the upper right-hand side of the parallel-peripheral-unit controller PPUC, there are eight unidirectional data lines ID0, . . . , ID7 for data transfer from the high-speed paper-tape reader to the peripheral-unit controller. The high-speed paper-tape reader functions only to transfer data to the computer unit. Accordingly, data signals are indicated to be transferred only in an input direction.

Of the remaining lines indicated in FIG. 25, along the right side of the parallel-peripheral-unit controller PPUC, two are control lines T0 and T1 overwhich are transferred signals from the peripheral-unit controller to the high-speed paper-tape reader, and two are status lines S0 and S1 over which are transferred signals from the high-speed paper-tape reader to the peripheral-unit controller. Four other status lines are available, but are not used by this particular paper-tape reader.

The control lines T0 and T1 include a Drive-Right line T0 over which a Drive-Right signal is transferred to start the tape moving in the reader in the right-hand direction; a Drive-Left line T1 over which a Drive-Left signal is transferred to start the tape moving in the reader in the left-hand direction.

the device status lines that are used to transfer status signals from the paper-tape reader to the IO status subunit IOS (see FIGS. 5 and 11), include a Data-Ready line S0, and a System-Ready line S1.

The signal on the Data-Ready line S0, when a logical one or TRUE, indicates that the data track outputs from the paper-tape reader are in the "on character" position. When the signal on the Data-Ready line is a logical zero or FALSE, that is an indication that the data track ouputs of the papertape reader are in the "between character" position where data outputs have no significance. The signal on the System-Ready line S1, when a logical 1 or TRUE, indicates that power is applied to the reader and that the reader is in the run mode. When this signal is a logical zero or FALSE, the reader is either in the load mode or out of tape.

The manner in which the various status signals are generated, and in which the circuitry of a typical paper-tape reader is used to generate the status signals, is described in detail in technical manuals published by the manufacturers of paper-tape readers. Therefore, such information is not included herein. By way of example, reference may be had to specifications and interface brochure on the Remex Model 3075 Serial Taper Perforator/-Reader Combination Systems published by the EX-CELL-O Corporation in 1972.

Figure 26:
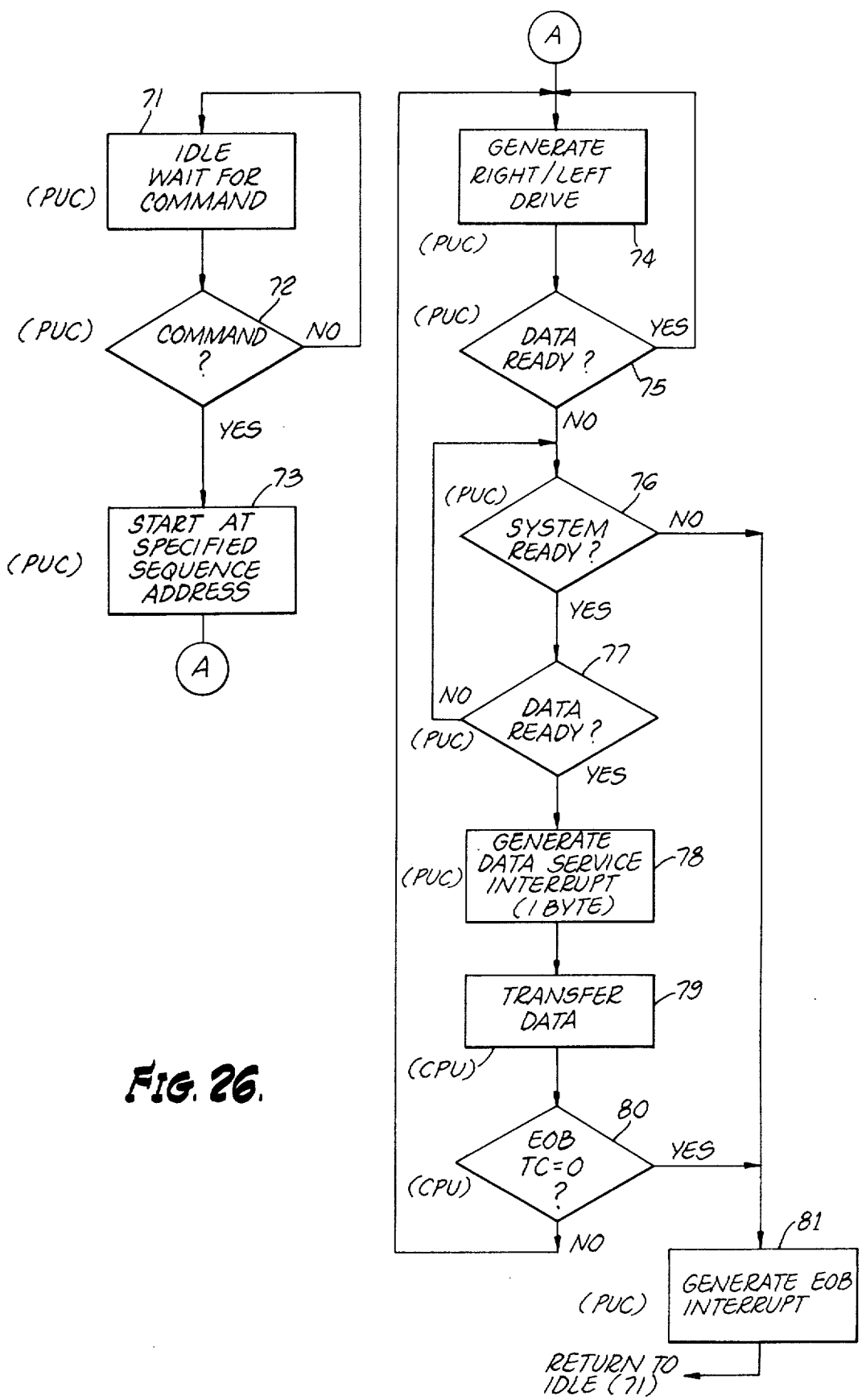
FIG. 26 is a flow diagram indicating the operation of the distributed input/output system in conjunction with a standard high speed paper-tape reader.

FIG. 26 is a flow chart showing parts of the system that operate as a distributed input/output system DIOS in conjunction with a standard high-speed paper-tape reader. As indicated in the upper left-hand corner of FIG. 26, initially the distributed IO system remains idle (section 71) waiting for a command word from the computer unit CU. As long as no command word is received, the distributed IO system remains in an idle condition. As soon as a command word is generated by the computer unit CU and received by the multiplexer MUX, the command control signal CMD and external branch address are transferred to the microengine unit MEU which commences a data transfer sequence as indicated in FIG. 26 (section 73), starting at the point in the figure indicated by A. The command word includes a program responsive code that selects a start sequence for either a drive-right or a drive-left operation. Since the operation sequence is the same in both tape directions, they are shown combined in FIG. 26 as a Generate Right/Left Drive operation (section 74).

A Drive-Right or Drive-Left command word is issued to start tape motion and a Data-Ready status test is made (section 75). If the signal on the Data-Ready status line is a logical one, the reader head is on the previous tape character and no new data is available. When the Data-Ready signal is a logical zero, the System-Ready status line is then tested. The signal on the System-Ready status line is a logical one if power has been applied to the reader system and the Reader/Load switch is in the run position. If the signal on the System-Ready status line is a logical zero, the peripheral-unit controller PUC generates an EOB-interrupt signal (section 81) to terminate the operation, but if the signal is a logical one, the peripheral-unit controller again tests the Data-Ready status line (section 77). A logical one level of the Data-Ready status signal at this point indicates that the reader head is "positioned on a new character".

When the signal on the Data-Ready status line becomes a logical one, the peripheral-unit controller generates a data-service-interrupt signal (section 78) which is transferred over the input/output bus IOB to the multiplexer MUX. When the data-service-interrupt signal attains top priority, it is vectored to programmed, preselected memory cells in the main memory unit MMU of the computer unit CU. The central processor unit CPU then executes an automatic input instruction. Data from the paper-tape reader is then transferred into the computer unit CU and the transfer count and memory buffer are decremented (section 79). If the transfer count has not been reduced to 0, or an ending condition has not been detected by the central processur unit CPU and the multiplexer, the peripheral-unit controller again generates Right/Left drive (section 74), tests the status of the Data-Ready line (section 75), checks the System-Ready line (section 76), and, when the Data-Ready status signal changes state from a logical zero to a logical one (section 77), generates another data-service-interrupt signal (section 78). This sequence is repeated until all data bytes to be transferred at that time, have been transferred from the paper-tape reader to the computer unit.

When all the data bytes have been transferred, the transfer count is decremented to 0, resulting in the generation and transfer of a prolonged command signal CMD to the peripheral-unit controller PUC (see discussion of FIGS. 10A and 10B). As a result, the peripheral-unit controller generates an EOB-interrupt signal to terminate operations and return the peripheral-unit controller to an idle state in which it will wait for the next command word.

Figure 27:
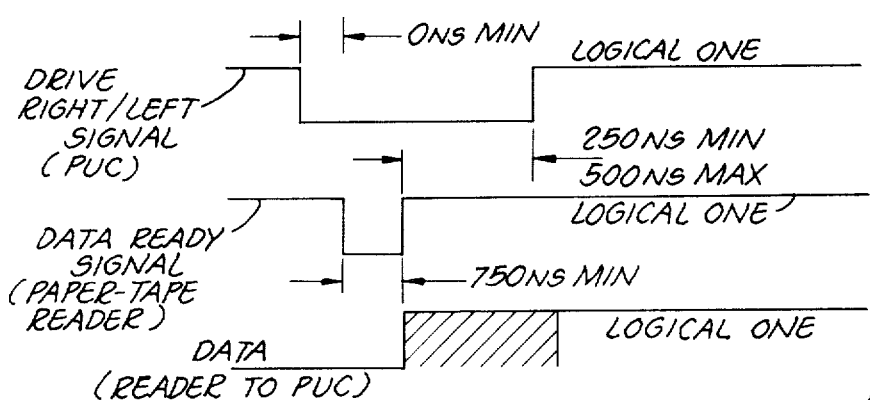
FIG. 27 is a timing diagram of signals involved in a data transfer between a high speed paper-tape reader and the distributed input/output system.

FIG. 27 is a timing diagram indicating the timing relationship of the drive right/left control signals, the Data-Ready status signal and data transfer. As indicated in FIG. 27, the drive right/left signal, which is a logical zero, is generated by the microengine unit MEU, until at least 250 nanoseconds after the Data-Ready signal has become a logical one, indicating that the data-track outputs are in the "on character" position. As soon as the Data-Ready signal goes to a logical one level, data must be held stable until acceptance of the interrupt request and the execution of automatic IO instructions by the central processor unit CPU.

OPERATION OF THE DISTRIBUTED INPUT/OUTPUT SYSTEM DIOS WITH A STANDARD HIGH-SPEED PAPER-TAPE PUNCH

In the following description, it is assumed that the paper-tape punch utilized in conjunction with computer unit CU uses 8-bit parallel data. It is also assumed that the paper-tape punch described herein is of the type that responds to a Punch signal to start the tape moving and to initiate punching of the tape. Furthermore, it is assumed that the paper-tape punch is of the type which generates a System-Ready signal, which when a logical one level, indicates that AC power has been applied to the paper-tape punch and that the internal voltages of the paper-tape punch have stabilized to their correct values; an Error signal, which when a logical one level, indicates either that the punch is not in the run mode or that the paper tape is broken, too loose, or too tight, or that the chad drawer is full; a Data-Ready signal, which when a logical one level, indicates that the punch is ready to accept a punch command; and a Tape Low signal, which when a logical one level, indicates that the tape supply is nearly exhausted. Paper-tape punches of the type herein described in conjunction with this operation are, by way of example, the Remex Model RAB 6375BA1/661/551,U000, manufactured by EX-CELL-O Corporation of Santa Ana, California. However, it will be apparent that many generally commercially available, high-speed paper-tape punches may be operated in conjunction with the distributed input/output system DIOS.

Since the paper-tape punch described is a parallel data device, the peripheral-unit controller utilized in conjunction with the paper-tape punch is one of the parallel versions illustrated in FIGS. 5 and 11. A simplified interfact diagram indicating status lines, control lines, and data lines that are connected between the parallel-peripheral-unit controller PPUC and the paper-tape punch, appears in FIG. 28.

Figure 28:
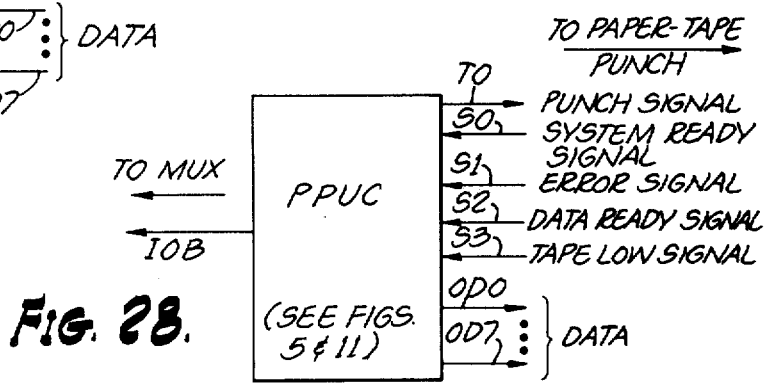
FIG. 28 is a simplified interface diagram indicating the connections between the distributed input/output system and a standard paper-tape punch.

As shown in FIG. 28, at the upper right-hand side of the parallel-peripheral-unit controller PPUC, there are either unidirectional data lines OD0, . . ., OD7 for data transfer from the peripheral-unit controller to the paper-tape punch. The paper-tape punch functions only to punch out data or tape that is transferred from the computer unit CU to the punch. Accordingly, data is transferred in only an output direction.

Of the remaining lines along the right side of the parallel-peripheral-unit controller PPUC, one is control line T0 over which is transferred a signal from the from the peripheral-unit controller to the paper-tape punch, and four are status lines S0, . . ., S3, over which are treansferred signals from the paper-tape punch to the peripheral-unit controller.

The control line T0 is a punch line over which is transferred a Punch signal which, when a logical one level, starts the tape moving and initiates punching.

The status lines that are used to transfer status signals from the paper-tape punch to the IO status subunit IOS (see FIGS. 5 and 11,) include the following: A system-Ready line S0, an Error lines S1, a Data-Ready line S2, and a Tape-Low line S3.

A System-Ready signal is transferred over the System-Ready line S0 and, when TRUE, indicates that AC power has been applied to the paper-tape punch and that the internal voltages have stabilized. An Error signal is transferred over the Error line S1 and, when TRUE, indicates either that the punch is not in the run mode or that the paper tape is broken, too loose, or too tight, or that the chad drawer is full. A Data-Ready signal is transferred over the Data-Ready line S2 and, when TRUE, indicates that the punch is ready to accept a punch command. A Tape-Low signal is transferred over the Tape-Low line S3 and, when TRUE, indicates that the tape supply is nearly exhausted.

The manner in which the various status signals are generated, and in which the circuitry of a typical paper-tape punch is used to generate the status signals, is described in detail in technical manuals published by the manufacturers of paper-tape punches. Therefore, such information is not included herein. By way of example, reference may be had to the specifications and interface brochure on the Remex 1075 Series Tape Perforator Systems published by the EX-CELL-O Corporation in 1971.

Figure 29:
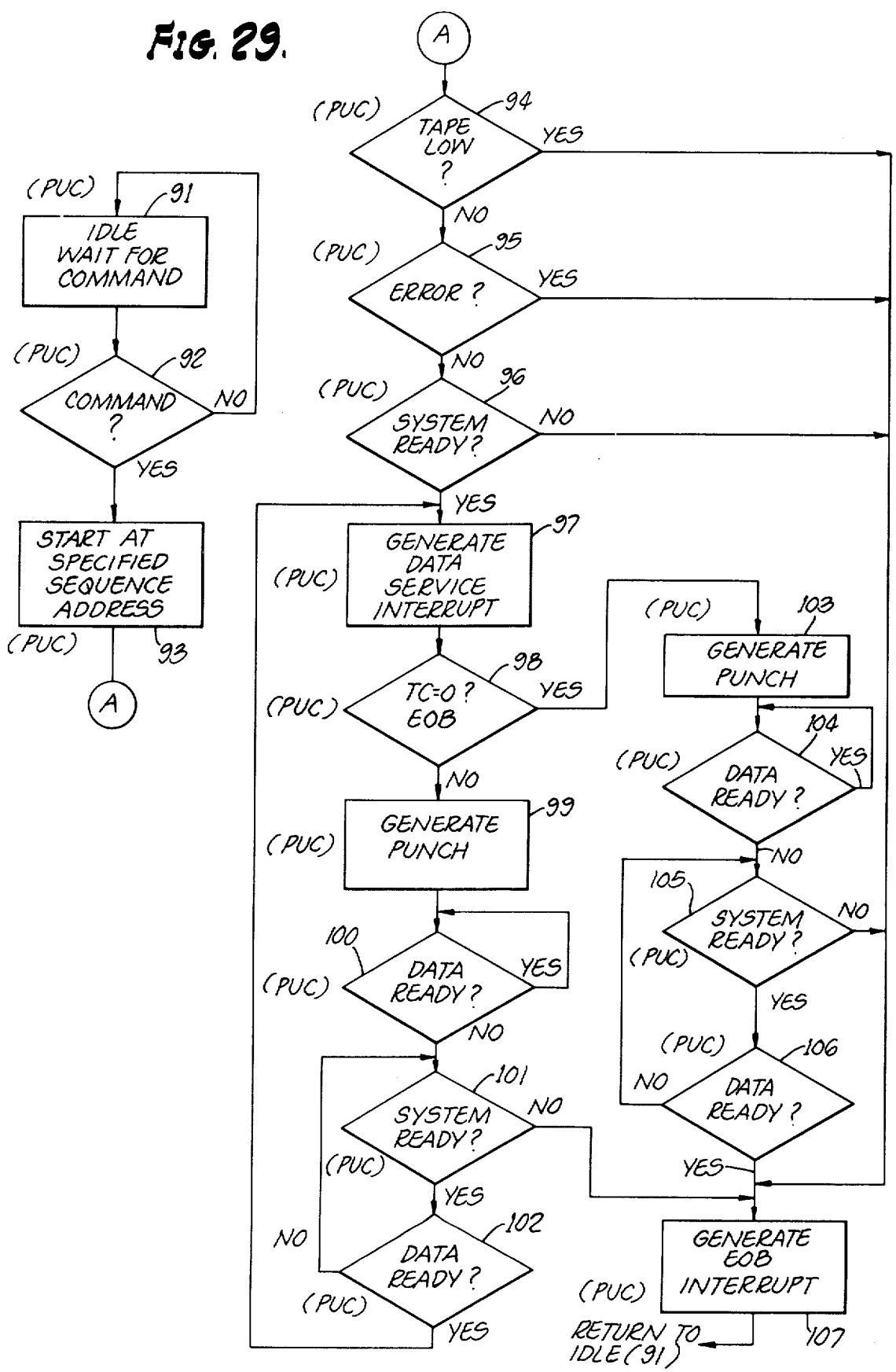
FIG. 29 is a flow diagram indicating the operation of the distributed input/output system in conjunction with a standard high speed paper-tape punch.

FIG. 29 is a flow chart showing parts of the system that operate as a distributed input/output system DIOS in conjunction with a standard high-speed paper-tape punch. As indicated in FIG. 29, initially the distributed IO system remains idle waiting for a command word from the computer unit CU (section 91). As long as no command word is received, the distributed IO system remains in an idle condition. As soon as a command word is generated by the computer unit CU and received by the multiplexer MUX, the command control signal CMD and external branch address are transferred to the microengine unit MEU which commences a data transfer sequence. A data transfer sequence is shown continued in FIG. 29, starting at the point in FIG. 29 indicated by (A).

As indicated in the upper half of FIG. 29, initially, status tests are made by the peripheral-unit controller PUC. system. The first such status test provides an indication of whether or not the tape is low (section 94). If the tap is low, the peripheral-unit controller generates an EOB-interrupt signal and operation is terminated. If the tape is not low, then the Error status line is tested by the peripheral-unit controller (section 95). If the Error status line is a logical one level, indicating that the tape is either broken, too loose, or too tight, or that the chad box is full, the peripheral-unit controller generates an EOB-interrupt signal. Otherwise the System-Ready status line is tested next (section 96). A logical zero System-Ready status signal is an indication that AC power has not been applied to the paper-tape punch, or that the internal voltages of the paper-tape punch have not yet stabilized. In response to a logical zero System-Ready status signal, the peripheral-unit controller generates an EOB-interrupt signal (section 107). On the other hand, if the System-Ready status signal is a logical one level, the peripheral-unit controller generates a data-service-interrupt signal (section 97).

The data-service-interrupt signal is transferred to the multiplexer unit MUX over the input/output bus IOB. When it attains top priority, the interrupt signal is vectored to programmed, preselected memory cells in the main memory unit MMU of the computer unit CU. In response to the interrupt signal, the central processor unit CPU then executes an automatic output instruction, and in response thereto, the central processor unit places data on the data bus DB and decrements the transfer count and memory buffer address stored in assigned locations of the main memory unit MMU.

If the transfer count is decremented to 0, a prolonged, that is, 500 nanosecond, command control signal CMD is generated and transferred to the peripheral-unit controller. This prolonged command control signal indicates that the transfer count has been incremented to 0. If, on the other hand, the transfer count is not reduced to 0, a nominal-duration, 250 nanosecond command control signal CMD is transmitted to the peripheral-unit controller and to the microengine unit MEU to reset the data-service-interrupt signal. In either case, the Punch signal is activated and sustained (sections 99 and 103) until the peripheral-unit controller receives a logical zero Data-Ready signal (sections 100 and 104) and then still sustaining a logical one or TRUE level, the Punch signal, the peripheral-unit controller tests the status of the System-Ready line (sections 101 and 105). If the signal on the System-Ready line becomes a logical zero level, an EOB-interrupt signal is generated by the microengine unit MEU. Otherwise, data is transferred to the high-speed paper-tape punch when the Data-Ready signal goes to a logical one level (sections 102 and 106). At this point, the peripheral-unit controller generates either another data-service-interrupt signal (section 97), or an EOB-interrupt signal (section 107), depending upon whether or not the transfer count was reduced to 0 prior to the generation of the Punch signal. If the transfer count has not been reduced to 0, the data transfer operation is repeated and data-service-interrupt signals are generated until the transfer count is decremented to 0, or an ending condition is detected. When the last transfer count is reduced to 0, a transfer of the last byte of data to be transferred from the computer unit CU to the paper-tape punch at that time takes place, and an EOB-interrupt signal is generated by the microengine unit MEU, and then the central processor unit CPU terminates the operation and the peripheral-unit controller PUC returns to an idle state to await the next command word.

Figure 30:
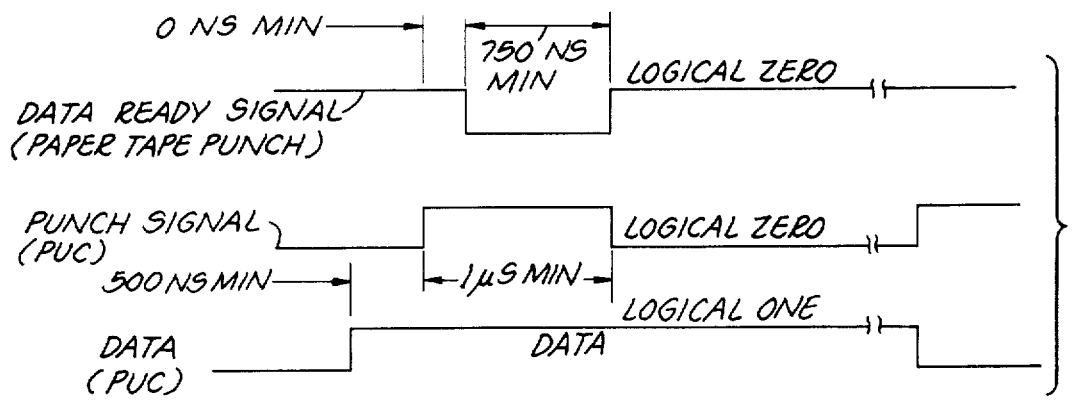
FIG. 30 is a timing diagram of signals involved in a data transfer between the distributed input/output system and a paper-tape punch.

FIG. 30 is a timing diagram indicating the timing relationship of the Data-Ready signal, the Punch signal, and data transfer. As indicated in FIG. 30, data is made available a minimum of 500 nanoseconds before the Punch signal is generated. Immediately after the Punch signal is generated, the Data-Ready signal becomes a logical zero or FALSE level and remains in this state until the Paper-Tape Punch can accept a new data transfer.

OPERATION OF THE DISTRIBUTED INPUT/OUTPUT SYSTEM DIOS WITH A STANDARD TELETYPEWRITER UNIT

In the following description, it is assumed that the teletypewriter unit utilized in conjunction with computer unit CU operates in half-duplex manner. It is also assumed that the teletypewriter unit of the type herein described responds to a teletypewriter motor control signal to initiate operation of the teletypewriter motor and also responds to a Reader Step signal which enables the paper-tape reader portion of the teletypewriter unit to read a character of data. It is further assumed that the teletypewriter unit has a keyboard that includes a Break Key, which when depressed, causes a framing error. Teletypewriter units of the type herein described in conjunction with this operation are, by way of example, the ASR-33 ASR Teletype unit manufactured by the Teletype Corporation of Skokie, Illinois. However, it will be apparent that many general commercially available teletypewriter units may be operated in conjunction with the distributed input/output system DIOS. Since the teletypewriter unit described is a serial data device, the peripheral-unit controller utilized in conjunction with the teletypewriter is one of the serial verions SPUC2.

Figure 31:
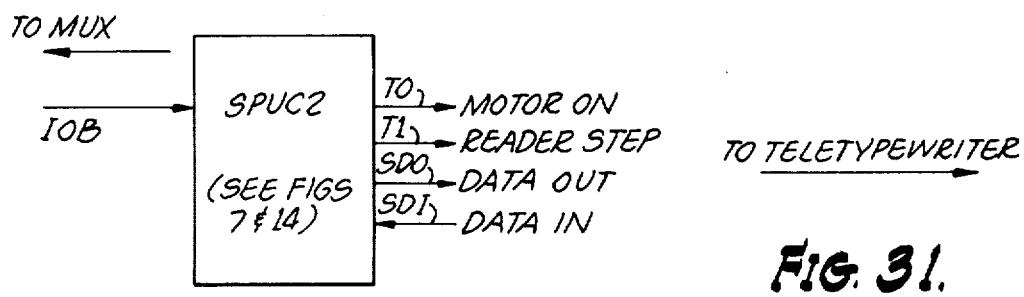
FIG. 31 is a simplified interface diagram indicating the connections between the distributed input/output system and a standard teletypewriter.

FIG. 31 is a simplified interface diagram indicating the control lines and data lines that are connected between the serial-peripheral-unit controller SPUC2 and a teletypewriter unit.

As seen in FIG. 31, there is one serial input-data line SDI, one serial output-data line SDO, a control line T0 to the teletypewriter motor, and a control line T1 to the paper-tape reader portion of the teletypewriter unit. There are three internal status lines (not shown in FIG. 31), the signals on which are used to form the status word which is transferred to the computer unit CU. However, unlike the parallel-peripheral-unit controllers PPUC, the status word in the Serial-peripheral-unit controller SPUC is developed within the controller itself and, more specifically, in the universal asynchronous receiver/transmitter UART (see FIGS. 7 and 14).

The three status signals include the following: a Framing Error status signal, a Data-Ready status signal, and a Transmitter Empty status signal. The Framing Error status signal, when a logical one level, indicates that a valid stop bit was missing from the character received by the peripheral-unit controller from a teletypewriter unit. The Data-Ready status signal, when a logical one level during an input operation, indicates that an entire character has been received by the peripheral-unit controller and, more specifically, by the universal asynchronous receiver/transmitter UART. The Transmitter Empty status signal, when a logical one level during an output operation, indicates that the transmitter portion of the universal asynchronous receiver/transmitter UART is empty and a new character can be loaded into the universal asynchronous receiver/transmitter for serial transmission to the teletypewriter unit.

The teletypewriter motor control signal and teletypewriter reader control signal are generated by the serial mode register SMR in the peripheral-unit controller, as previously explained in conjunction with FIG. 14. The serial mode register SMR also develops two additional control signals that are used within the peripheral-unit controller. One of these signals is a Ready-To-Send signal RTS, which is transferred to the E terminals of the read-only-memory units ROM1 and ROM2 in the microengine unit MEU (see FIG. 9). The Ready-To-Send signal is set to a logic level 1 for data-output transfer and is set to a logic level 0 for data-input transfer. One of the two 16-word sets of output instructions in the read-only-memory units ROM1 and ROM2 of the controller memory unit CMU, will be selected depending upon the logic level of the Ready-To-Send signal. The fourth control signal generated by the serial mode register SMR is called a Data-copy signal DRS, and is also used only within the peripheral-unit controller. When the Data-copy signal DRS is set to a logic level 1 in accordance with software programming, the data-copy mode of operation is selected in which serial input data is returned to the teletypewriter unit as it is received by the peripheral-unit controller. The data-copy mode is used typically to obtain a printback of input data generated on the teletypewriter keyboard, but it will cause the return of data from the paper-tape reader portion. The Data-copy signal is not significant during output operations.

The manner in which the various control signals are utilized within the teletypewriter unit and the specific details of the operation of a typical teletypewriter unit, is described in technical manuals published by the manufacturers of teletypewriter units. Therefore, such information is not included herein. By way of example, reference may be had to the technical manual for the Model 33 Teletypewriter Sets, Bulletin 310B, Vols. 1 and 2, published by the Teletype Corporation in 1971.

Figure 32:
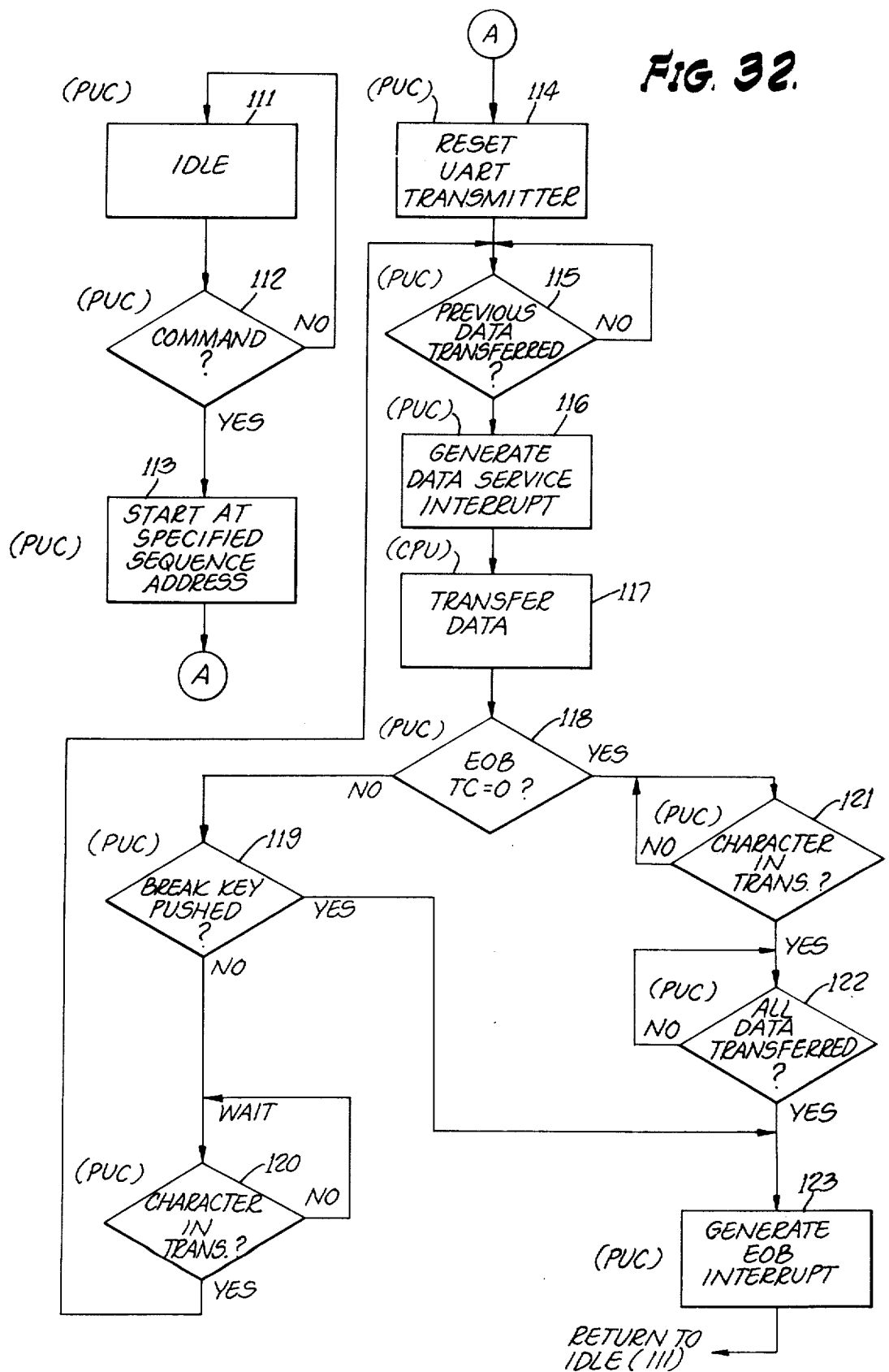
FIG. 32 is a flow diagram indicating output-data transfer operation of the distributed input/output system in conjunction with a standard teletypewriter.

FIG. 32 is a flow chart showing parts of the system that operate as a distributed input/output system DIOS in conjunction with output-data transfer to a standard teletypewriter unit. As indicated in FIG. 32, initially, the peripheral-unit controller in the distributed IO system remains idle waiting for a command word from the computer unit CU and the teletypewirter unit is also idle but enabled for operation (section 111). As long as no command word is received (section 112) the distributed IO system remains in an idle condition. As soon as a command word is received, the distributed IO system goes to a specified starting sequence (section 113), which is shown continued at the upper middle portion of FIG. 32, starting at the point in the fiture indicated by A.

As indicated in the upper half of FIG. 32, peripheral-unit controller operation in a teletypewriter unit output transfer, starts with the generation of an internal master reset pulse MR to reset the peripheral-unit universal asynchronous receiver/transmitter UART (section 114) (see FIGS. 7 and 14).

The serial-peripheral-unit controller SPUC2 then tests a status line from the transmitter buffer, namely, the Transmitter Empty line which is a logical one level when all data previously transferred from the computer unit has been serially shifted out of a teletypewriter unit. The peripheral-unit controller waits until the signal on the Transmitter Empty status line is a logical one level (section 115), and then the microengine unit MEU generates a data-service-interrupt signal (section 116).

The data-service-interrupt signal is transferred over the input/output bus IOB to the multiplexer MUX and when top priority is attained, it is vectored to programmed, preselected memory cells in the main memory unit MMU. A programmed automatic output instruction, at the selected location, is executed by the central processor unit CPU and one byte, or term, of data is transferred from the computer unit CU to the serial-peripheral-unit controller SPUC2 (section 117). The transfer count and memory address pointer are then decremented by the central processor unit CPU.

If the data was not the last transfer of data to be transferred out to the teletypewriter unit at that particular time, the transfer count will not have been decremented to 0, and the nominal duration command signal CMD (250 nanoseconds) is transferred to the microengine unit MEU (section 118). The peripheral-unit controller then performs a status test of the Framing Error status line to determine whether or not the Break Key as been depressed. If it has been depressed, the microengine unit MEU generates an EOB-interrupt signal to terminate transfer of the operation (section 119). If, on the other hand, the teletypewriter keyboard Break Key has not been depressed, the serial-peripheral-unit controller SPUC2, performs a status test of the Transmitter Empty line (section 120) and, in effect, waits for the Transmitter Empty signal to go a logical zero, indicating that the data transferred as a result of the previously generated data-service-interrupt signal is then in the transmitter portion of the universal asynchronous receiver/transmitter UART.

The data transfer operation then continues at the beginning of the next output sequence, starting with again testing the Transmitter Empty status line (section 15), the signal on which becomes a logical one, indicating that the entire previous data character has been serially transferred to the teletypewriter unit. At this point, the Serial-peripheral-unit controller SPUC2 generates another data-service-interrupt signal to transfer another byte of data from the computer unit CU to the teletypewriter unit.

When the last output-data character to be transferred at that particular time has been transferred from the computer unit CU to the serial-peripheral-unit controller SPUC2, the peripheral-unit controller tests the Transmitter Empty status line. In this sequence of operation, the peripheral-unit controller first waits for the Transmitter Empty status signal to become a logical zero level, indicating that the byte of data transferred from the computer unit CU is not in the transmitter portion of the universal asynchronous receiver/transmitter UART (section 121), and it then waits for the signal on the Transmitter Empty status line to become a logical one level, indicating that the term has been serially shifted out to the teletypewriter unit (section 122).

After the data term has been shifted out of the transmitter portion of the universal asynchronous receiver/transmitter to the teletypewriter unit, the peripheral-unit controller generates an EOB-interrupt signal (section 123). The EOB-interrupt signal is transferred over the input/output bus IOB to the multiplexer MUX where, when it attains top priority, it is vectored to preselected, programmed memory cells in the main memory unit MMU, where it initiates the execution of an end-of-block interrupt sequence returning to the peripheral-unit controller to the idle state, in which it remains ready for a subsequent operation in conjunction with the teletypewriter unit.

Figure 33:
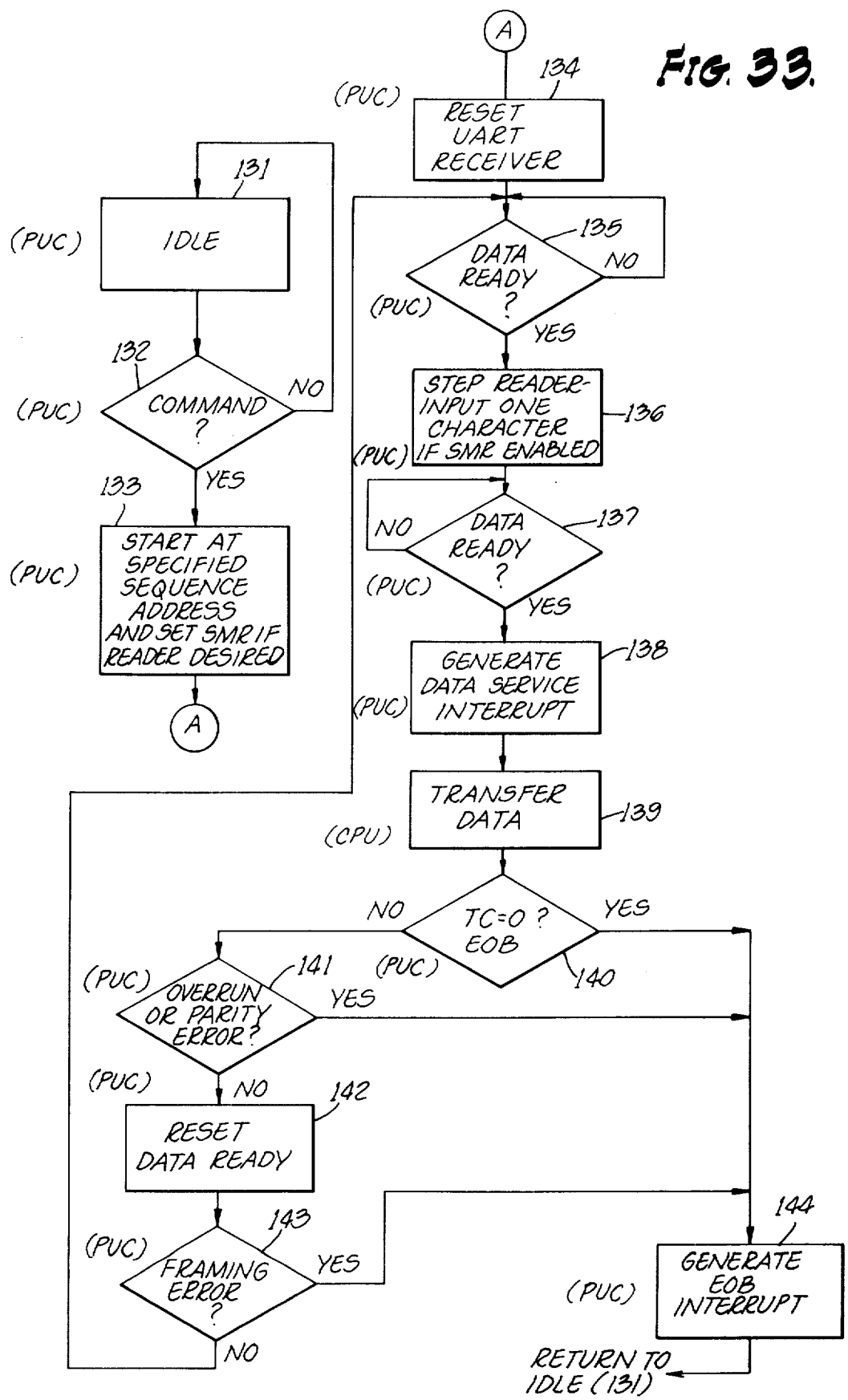
FIG. 33 is a flow diagram indicating input-data transfer operation of the distributed input/output system in conjunction with a standard teletypewriter.

FIG. 33 is a flow diagram of input-data transfer operation of the distributed input/output system DIOS in conjunction with the standard teletypewriter unit. As indicated in the upper left-hand portion of FIG. 33, initially, the serial-peripheral-unit controller in the distributed IO system remains idle (section 131) waiting for a command word from the computer unit CU and the teletypewriter unit is also idle, but enabled for operation. As long as no command word is transferred from the computer unit CU to the multiplexer MUX, the serial-peripheral-unit controller SPUC2 remains in an idle condition (section 121). As soon as a command word is received, a command control signal CMD is transferred from the multiplexer MUX to the serial-peripheral controller SPUC2 and a transfer operation commences at a specified sequence (section 133), which is shown continued at the upper middle portion of FIG. 33, starting at the point in the figure indicated by A. If reader operation is to be employed, a register in the serial mode register SMR is set at this point in the sequence.

As indicated in the upper half of FIG. 33, serial-peripheral-unit controller operation in a teletypewriter unit input-data transfer, starts with the generation of an internal master reset pulse MR to reset and initialize the peripheral-unit controller universal asynchronous receiver/transmitter UART (section 134) (see also FIG. 14). The serial-peripheral-unit controller SPUC2 then tests the universal asynchronous receiver/transmitter's Ready status line (see FIG. 14) (section 135) to determine whether or not a holding register in the receiver portion of the universal asynchronous receiver/transmitter UART is empty.

If the receiver portion of the universal asynchronous receiver/transmitter UART is empty, and if the serial mode register SMR has been set to step the teletypewriter reader, the peripheral-unit controller, under software program control from the computer unit, enables the mode register SMR to transfer an Enable Teletype Reader signal ETR to the teletypewriter unit to step the teletypewriter reader one character position (section 136) (see FIG. 7 and 14). Data, in serial form, is then transferred from the teletypewriter unit into the peripheral-unit controller until the receiver portion of the universal asynchronous receiver/transmitter UART receives an entire character in its input-data holding register. A full input-data holding register is indicated by a TRUE signal on the Data Ready status line (section 137). The serial-peripheral-unit controller SPUC2, then generates a data-service-interrupt signal (section 138) which is transferred over the input/output bus IOB to the multiplexer MUX where, when top priority is achieved, it is vectored to programmed, preselected memory cells in the main memory unit MMU of the computer unit CU. The central processor unit CPU then executes an automatic input instruction, resulting in the transfer of the data term from the peripheral-unit controller to the computer unit CU (section 139).

If the transfer count has not been decremented to 0, and thus if the data term was not the last to be transferred at that particular time, the input-data term is tested for an overrun error, or parity error, which are indicated by status signals on status lines available at the Universal asynchronous receiver/transmitter UART (section 141).

A parity error occurs when one designated bit of a data term, which is always even or always odd in a correctly transmitted data character, is even when it should be odd or odd when it should be even, indicating an error in the data transfer.

An overrun error occurs when the previous character was not completely unloaded by the universal asynchronous receiver/transmitter's holding register in the peripheral-unit controller PUC before the next character is received from the teletypewriter and therefore the previous character is lost. Overruns do not occur in step reader mode. If overrun or parity errors occur, the microengine unit MEU responds to the error status signal by generating an EOB-interrupt signal (section 144), which terminates the serial-peripheral-unit controller's operation.

If no error of that type has occurred, the Data Ready status line is reset by the peripheral-unit controller (section 142) and then the Framing Error status line is tested (section 143) (see discussion of FIGS. 13 and 14). If the Framing Error status signal is a logical one level, the microengine unit generates an EOB-interrupt signal to terminate operation. If, on the other hand, the Framing Error status signal is a logical zero level, the serial-peripheral-unit controller SPUC2 operation recommences at the next input sequence (section 135), the first step of which is a test of the Data-Ready status signal to ascertain whether the receiver portion of the universal asynchronous receiver/transmitter UART has become clear. The serial-peripheral-unit controller than waits for a new data character to be received from the teletypewriter unit.

If the character to be transferred from the teletypewriter unit to the computer unit was the last to be transferred at that particular time, the serial-peripheral-unit controller SPUC2 generates an EOB-interrupt signal which is transferred over the input/output bus IOB to the multiplexer MUX where, when top priority is attained, it is vectored to programmed, preselected memory cells in the main memory unit MMU where the central processor unit CPU executes an end-of-block-interrupt sequence, terminating operation and returning the peripheral-unit controller to an idle state.

Figure 34:
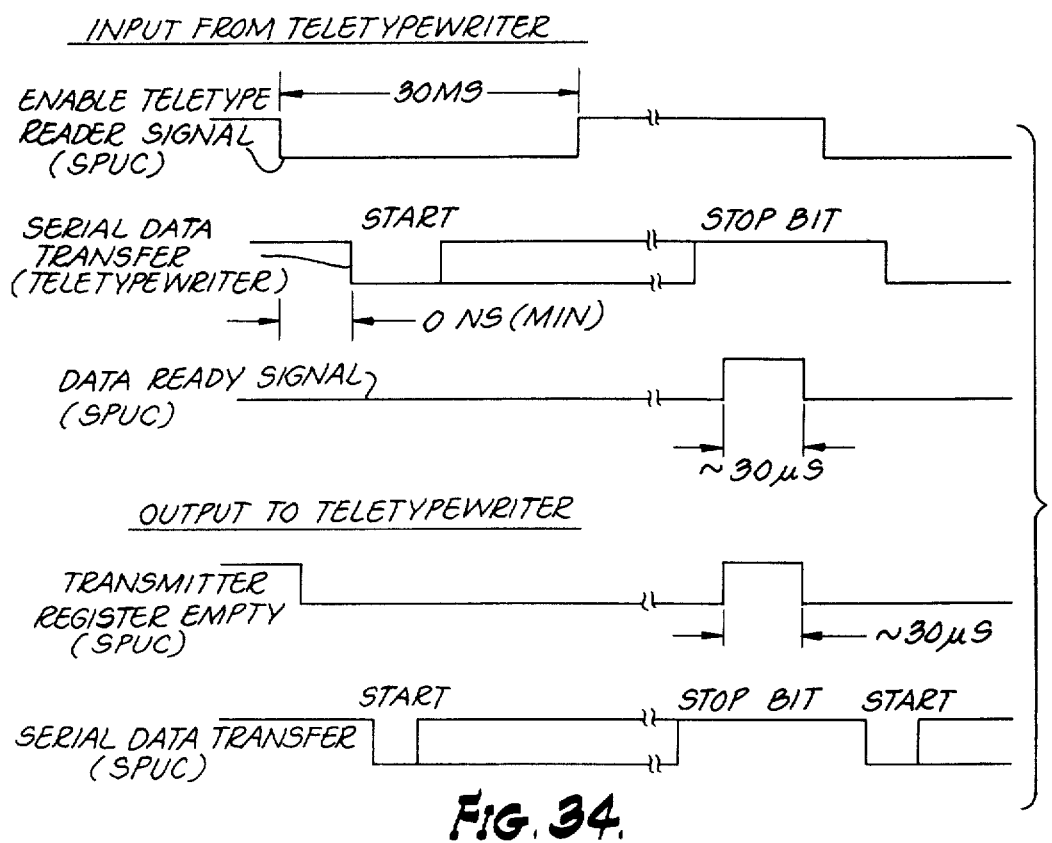
FIG. 34 is a timing diagram of signals involved in input-data and output-data transfers between the distributed input/output system and a standard teletypewriter.

FIG. 34 is a timing diagram indicating the timing relationships for signals involved in both input- and output-data transfers between the computer unit CU and a teletypewriter unit. The upper portion of the figure indicates the timing relationships for an input-data, or character, transfer and specifically the relationship between the Enable Teletype Reader signal ETR generated by the serial mode register SMR, the data transfer and the Data Ready status signal. The lower portion of the figure indicates the timing relationship for an output-data transfer and, more specifically, the relationship between the Transmitter Empty status signal and the output-data transfer.

As indicated at the top portion of FIG. 34, in an input-data, or character, transfer between a teletypewriter unit and the peripheral-unit controller, initially, there may be a reader step in response to an Enable Teletype Reader signal ETR, which is indicated in FIG. 34 to be a 30 millisecond negative going pulse. Immediately thereafter, input data is transferred from the teletypewriter unit to the receiver portion of the universal asynchronous receiver/transmitter UART in the serial-peripheral-unit controller SPUC2. Immediately after the last stop bit in the serial-data character is received, the Data-Ready status signal becomes TRUE to indicate that a data character has been received by the peripheral-unit controller and is available to be transferred to the computer unit CU. The Data-Ready status signal remains TRUE for approximately 30 microseconds, which is the time required for the execution of an automatic input instruction by the computer unit CU.

The lower portion of FIG. 34 indicates the relative timing of the Transmitter Empty status signal which is reset prior to the transfer of output data terms to the teletypewriter unit. As indicated in FIG. 34, the Transmitter Empty status signal becomes positive for approximately 30 microseconds after the last stop bit of the data transfer, and indicates that the peripheral-unit controller and, more specifically, the transmitter portion of the universal asynchronous receiver/transmitter UART, has serially transmitted an entire character to the teletypewriter unit.

OPERATION OF THE DISTRIBUTED INPUT/OUTPUT SYSTEM DIOS WITH A STANDARD CATHODE-RAY-TUBE-TERMINAL UNIT CRT OR MODEM

In the following description, it is assumed that the cathode-ray-tube-terminal unit CRT or modem (modulator-demodulator), utilized in conjunction with the computer unit CU, uses half-duplex serial mode. It is also assumed that the CRT, or modem, is the type that will respond to a Data-Terminal Ready signal that indicates to the device that the computer unit CU is ready to transmit data or receive data from the CRT or modem. It is also assumed that the modems of the type herein described, are responsive to a Ready-To-Send signal that is transferred from the serial peripheral-unit controller to the modem to indicate, when in the logical one state, that output data is to be transmitted to the CRM or modem. Furthermore, it is assumed that in response to the Data-Terminal Ready signal, the cathode-ray-tube-terminal unit CRT, or modem, is of the type which generates a Clear-To-Send status signal which, when logically TRUE, indicates that the CRT, or modem, is ready to accept data. It is further assumed that the modems of the type herein described generate Carrier-Detect status signals to indicate that they are receiving communication signals which meet suitability requirements for an input operation to the computer unit CU. Furthermore, it is assumed that the modem of the type herein described generates a Data-Set-Ready status signal to indicate that it is connected to a communications channel and is not in a test, talk, or dial, mode and that it has completed any applicable timing functions required to complete establishment of a call. Cathode-ray-tube-terminal units CRTs and modems of the type herein described in conjunction with this operation are, by way of example, the ADDS Model 580 CRT Display Terminal manufactured by Applied Digital Data Systems, Incorporated, of Hauppage, New York, or the Bell Model 103 modem manufactured by American Telephone and Telegraph Corporation of New York City, New York, or equivalent. However, it will be apparent that many generally commercially available CRTs and modems or other peripheral units using the RS232 interface may be operated in conjunction with the distributed input/output system DIOS. Since the CRT and modem disclosed herein are serial data devices, the peripheral-unit controller utilized in conjunction with the CRT or modem is one of the serial versions SPUC1.

FIG. 35 is a simplified interface diagram indicating status lines, control lines, and data lines that are connected between the serial-peripheral-unit controller SPUC and a cathode-ray-tube-terminal unit CRT, or a modem.

As seen in FIG. 35, there is one serial output-data line SDO, one serial input-data line SDI, a control line T0 for transfer of Data Terminal Ready signals, a control line T1 for transfer of Ready-To-Send signals (used with modems only), and three status lines S0, S1, and S2, for transfer of a Clear-To-Send signal, a Carrier Detect Signal and a Data Set Ready signal (used in modems only) respectively.

The Data Terminal Ready Control line T0 and the Ready-To-Send control line T1, are used to transfer control signals generated by the serial-peripheral-unit controllers SPUCs serial mode register SMR. In addition, the serial mode register SMR generates a signal which is used only within the peripheral-unit controller, namely, a Data-Return Signal DRW which serves the same purpose as the equivalent signal in serial-peripheral-unit controllers utilized in conjunction with teletypewriter units. (Also see FIG. 13).

The Data Terminal Ready line T0 is used to transfer a signal to a cathode-ray-tube-terminal unit CRT, or modem, to indicate that the serial-peripheral-unit controller SPUC1 is ready to accept or send device data. The Ready-To-Send line T1, used only with modems, transfers a signal to the modem which, when in a logical one state, initiates an output-data operation by the modem. The Ready-To-Send signal is also used within the serial-peripheral-unit controller SPUC1 to control the operating sequence to perform either an input operation or an output operation. The signal on the Clear-To-Send status line S0, when a logical one state, is used by the cathode-ray-tube-terminal unit CRT or modem to indicate that that device is ready to accept data for transmission over communication lines. The Carrier Detect status line S1, is generated by the modem to indicate that it is receiving a signal which meets suitability requirements for an input operation.

The Data Set Ready status line S2, is used only by the modems during an input operation or an output operation, to indicate modem status. The signal on this line, when in a logical one state, indicates that the modem is connected to a communications channel and is not in a test, talk, or dial mode, and that it has completed any applicable timing functions required to complete call establishment.

The manner in which the various status signals are generated, and in which the circuitry of typical cathode-ray-tube-terminal units CRTs and modems are used to generate the status signals, is described in detail in technical manuals published by the manufacturers of CRTs and modems. Therefore, such information is not included herein. By way of example, reference may be had to the Operator's Guide and Interface Manual entitled "How to Use the Console 580 and MRD 380" published by Applied Digital Data Systems, Inc. of Hauppauge, New York. And reference may be had to the Bell System's Data Communication Technical Reference Manual (No. 41101) for the Model 103 modem, published by American Telephone and Telegraph, Inc., in 1967.

FIG. 36 is a flow chart showing parts of the system that operate as a distributed input/output system DIOS in conjunction with output-data transfer to a standard cathode-ray-tube-terminal unit CRT, or modem. As indicated in the upper left-hand portion of FIG. 36, initially, the serial peripheral-unit controller SPUC1 remains idle waiting for a command word from the computer unit CU and the cathode-ray-tube-terminal unit CRT or modem is also idle but enabled for operation (section 151). As long as no command word is received, the serial-peripheral-unit controller SPUC1 remains in an idle condition (section 152). As soon as a command word is received, the SPUC's microengine unit MEU commences a specified starting sequence (section 153), represented at the top of FIG. 36, starting at the point in the figure indicated by a A.

As indicated in FIG. 36, serial-peripheral-unit controller SPUC1 operation in an output-data transfer, starts with a status test of the Data-Set Ready status line (section 154). As indicated at the top of FIG. 36, the sequence beginning with an affirmative Data-Set Ready signal, continuing with the start of the output operation and terminating with the generation of an EOB-interrupt signal, is called a ring-out in the case of operation with modems. The terms ring-in and ring-out are commonly used in the data communications art in conjunction with modems, to indicate the establishment of communications between a computer or other data set and the modem to which the computer unit CU is connected, for either input-data transfer or output-data transfer in conjunction with the communication system being used.

When the Data-Set Ready signal becomes a logical one, the SPUC's transmitter portion of the universal asynchronous receiver/transmitter UART is reset (section 155) by an internal master reset pulse MR generated by the microengine unit MEU in the serial-peripheral-unit controller SPUC1 (see discussion of FIG. 13). The internal Transmitter-Empty status line is then tested (section 156) to determine whether or not previous data has been completely transferred to the cathode-ray-tube-terminal unit CRT, or modem. If the SPUC's Transmitter-Empty status signal is TRUE or a logical one level, another character can be transferred from the computer unit CU to the transmitter portion of the Universal asynchronous receiver/transmitter UART.

When the SPUC's Transmitter-Empty status line check is a TRUE or logical one level, the Clear-to-Send status line is tested (section 157) by the serial-peripheral-unit controller SPUC1, to ascertain whether or not the modem is ready to transmit data over the communications line. The Clear-To-Send status check is made only in conjunction with modems. If the signal on the Clear-To-Send status line is a FALSE or logical Zero, the SPUC's microengine unit MEU generates an EOB-interrupt signal to terminate the transfer operation (section 167). If the Clear-to-Send status signal is in the TRUE or logical one level the serial-peripheral-unit controller SPUC1 generates a data-service-interrupt signal (section 158) which is transferred over the input-/output bus IOB to the multiplexer MUX where, when top priority is attained, it is vectored to programmed, preselected memory cells in the main memory unit MMU of the computer unit CU. An automatic output instruction is executed by the central processor unit CPU, and data is transferred to the serial-peripheral-unit controller SPUC1 (section 159).

As in other distributed I/O data-service-interrupt sequences, the transfer count and memory address pointer are decremented by the central processor unit CPU. If the decremented transfer count is not equal to 0, indicating that the data term to be transferred out to the modem or CRT is not the last in a data block (section 160), the operational sequence follows the path indicated in the lower left portion of FIG. 36. The serial-peripheral-unit controller SPUC1 tests the status of the Framing Error status line (section 161) to ascertain whether or not the keyboard Break Key has been depressed. If it has been depressed, the microengine unit MEU generates an EOB-interrupt signal to terminate the operation (section 167). If the Break Key has not been depressed, the serial-peripheral-unit controller SPUC1 again tests the status of the Transmitter-Empty signal (section 162) and waits for this signal to become FALSE or a logical zero, indicating that the data transferred in response to the data-service-interrupt signal has been accepted by the transmitter portion of the SPUC's universal asynchronous receiver/transmitter UART.

When the Transmitter Empty signal does become FALSE, the data is transmitted, in serial form, out of the asynchronous receiver/transmitter and into the cathode-ray-tube-terminal unit CRT, or modem.

As indicated in FIG. 36, after the transfer of data to the device, operation then continues at the beginning of the next output sequence, starting again with the testing of the Transmitter Empty status line (section 156) which becomes TRUE when the entire term to be transferred has been serially transferred to the cathode-ray-tube-terminal unit CRT, or modem. After a test of the Clear-To-Send status line, the serial-peripheral-unit controller SPUC1 generates another data-service-interrupt signal to transfer another term of data from the computer unit CU to the modem, or cathode-ray-tube-terminal unit.

When the last output data term to be transferred at that particular time, has been transferred from the computer unit CU to the serial-peripheral-unit controller SPUC1 (section 160), the serial-peripheral-unit controller first waits for the Transmitter Empty status signal to become a logical zero, indicating that the character from the computer unit CU is now in the transmitter portion of the universal asynchronous receiver/transmitter UART. The last output-data term to be transferred at that time is then transferred to the cathode-ray-tube-terminal unit CRT, or modem (section 165). The peripheral-unit controller then waits for the signal on the Transmitter Empty status line to become TRUE, indicating that the entire term has been serially shifted out to the cathode-ray-tube-terminal unit CRT, or modem (section 166).

After the last data term of a data block to be transferred, has been shifted out of the transmitter portion of the universal asynchronous receiver/transmitter, the serial-peripheral-unit controller SPUC1, generates an EOB-interrupt signal (section 167). The EOB-interrupt signal is transferred over the input/output but IOB to the multiplexer MUX where, when it attains top priority, it is vectored to programmed, preselected memory cells in the main memory unit MMU. In response, the central processor unit CPU, executes an EOB-interrupt sequence, returning the serial-peripheral-unit controller SPUC1 to an idle state ready for a subsequent operation in conjunction with the cathode-ray-tube-terminal unit CRT, or modem.

Figure 37:
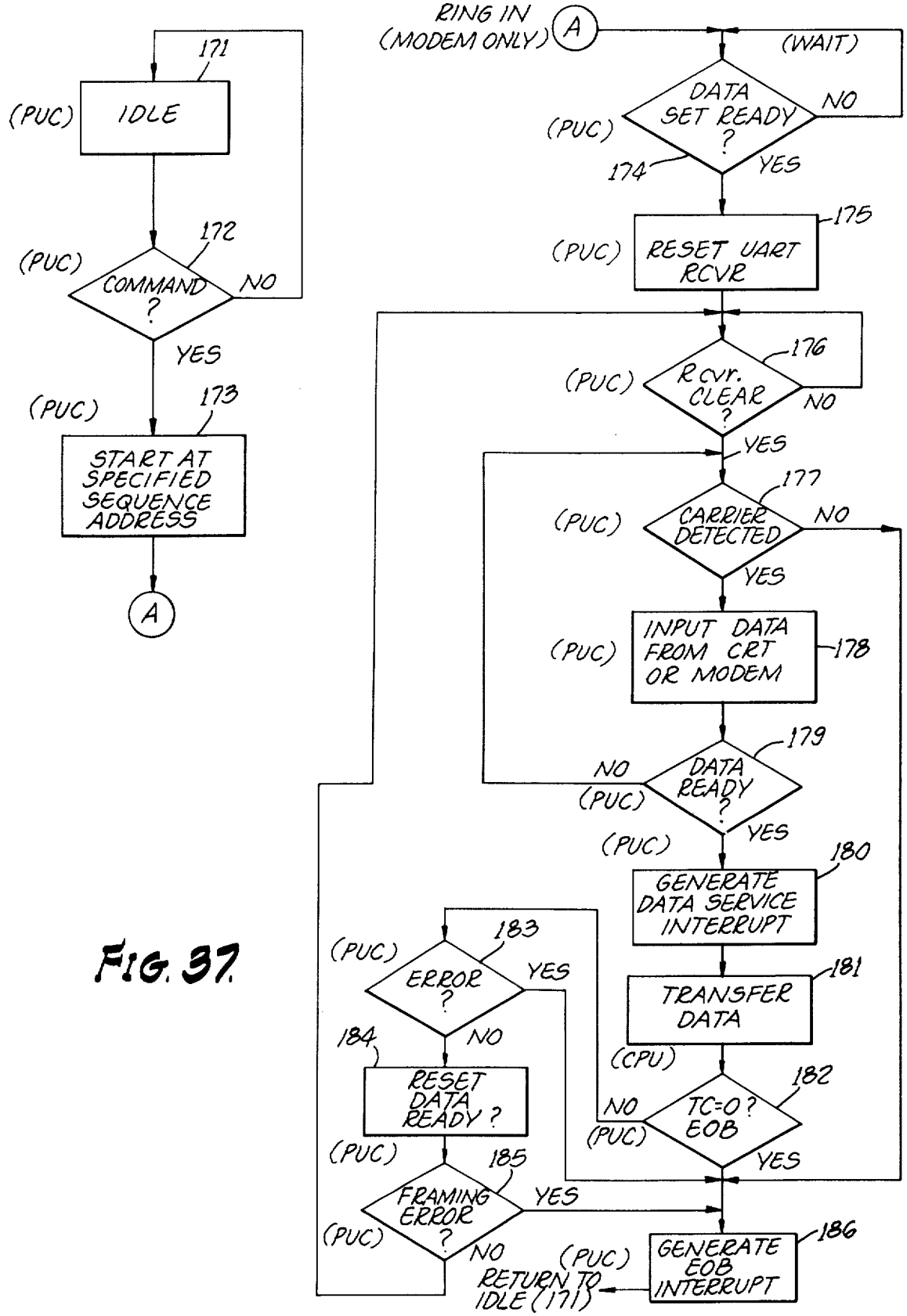
FIG. 37 is a flow diagram indicating input-data transfer operation of the distributed input/output system in conjunction with a standard cathode-ray-tube terminal unit or modem.

FIG. 37 is a flow chart showing parts of the system that operate as a distributed input/output system DIOS in conjunction with input-data transfer from a standard cathode-ray-tube-terminal unit CRT, or modem. As indicated in the upper left-hand portion of FIG. 37, initially, the distributed IO system remains idle, waiting for a command word from the computer unit CU and the cathode-ray-tube-terminal unit CRT, or modem, is also idle, but it is enabled for operation (section 171). As long as no command word is received, the distributed IO system remains in an idle condition (section 172). As soon as a command word is received, the microengine unit MEU commences a specified starting sequence (section 173), which is shown continued at the upper middle portion of FIG. 37, starting at the point in the figure indicated by A.

As indicated in FIG. 37, serial-peripheral-unit controller SPUC1 operation in a cathode-ray-tube-terminal unit CRT, or modem, input-data transfer, starts with a ring-in operation which is a status test of the Data-Set Ready status line (section 174). If the Data-Set Ready status signal is a logical one, the serial-peripheral-unit controller SPUC1 generates an internal master reset pulse MR to reset the serial-peripheral-unit controller universal asynchronous receiver/transmitter UART (section 175) (see discussion of FIG. 13). The serial-peripheral-unit controller SPUC1 then tests the Data-Ready status line to determine whether or not the holding register in the receiver portion of the universal asynchronous receiver/transmitter UART is empty (section 176). The Carrier-Detect status line is then tested (section 177). If the signal on the Carrier-Detect status line is a logical zero, the serial-peripheral-unit controller generates an EOB-interrupt signal resulting in the termination of the operation (section 186). If, however, the signal on the Carrier-Detect status line is TRUE, this indicates that serial input-data is being received by the device. Serial data is then transferred from the device to the receiver portion of the universal asynchronous receiver/transmitter UART (section 178). The serial-peripheral-unit controller SPUC1 next tests the Data Ready line (section 179), the signal on which becomes TRUE when an entire input-data term has been received by the receiver portion of the universal asynchronous receiver/transmitter UART. If the Data Ready line signal remains a logical zero, serial data is still being received. The serial-peripheral-unit controller SPUC1, then retests the Carrier-Detect status signal and generates an EOB-interrupt signal if the carrier signal is no longer present.

When the Data Ready status signal becomes a logical one, the serial-peripheral-unit controller generates a data-service-interrupt signal (section 180) that is transferred over the input/output bus IOB to the multiplexer MUX where, when top priority is attained, it is transferred to programmed, preselected memory cells in the main memory unit MMU of the computer unit CU. The central processor unit CPU then initiates an automatic input instruction to transfer the data term from the serial-peripheral-unit controller SPUC1 to the computer unit CU (section 180).

If the transfer count has not been decremented to 0, the data term was not the last to be transferred to the computer unit at that particular time, and the input-data character is then tested for an overrune error, or parity error, which is indicated by a signal on status lines within the peripheral-unit controller (section 183) available at the universal asynchronous receiver/transmitter UART (see FIG. 13). If either of these errors occurs, the microengine unit MEU generates an EOB-interrupt signal (section 186) to terminate the operation.

If no error of that type has occurred, the Data-Ready status line is reset by the serial-peripheral-unit controller in the manner described in conjunction with FIG. 13 (section 184), and then the Framing Error status line is tested (section 185). If the signal on the Framing Error status line is a logical one, the microengine unit generates an EOB-interrupt signal to terminate the operation. If, on the other hand, there is no framing error, the serial-peripheral-unit controller SPUC1 loops to the next input data sequence where it waits for the receiver portion of the universal asynchronous receiver/transmitter UART to become clear (section 176), and then proceeds to transfer another character from the modem, or cathode-ray-tube-terminal unit CRT, to the computer unit CU (sections 177 through 182).

If the data term transferred from the cathode-ray-tube-terminal unit CRT, or modem, to the computer unit CU was the last to be transferred at that particular time, the serial-peripheral-unit controller SPUC1 generates an EOB-interrupt signal (section 186), which is transferred over the input/output bus IOB to the multiplexer MUX where, when top priority is attained, it is vectored to programmed, preselected memory cells in the main memory unit MMU. In response, the central processor unit CPU executes an EOB-interrupt sequence, terminating operation and returning the serial-peripheral-unit controller to an idle state (section 171).

FIG. 38 is a timing diagram indicating the timing relationships of signals involved in input-data and output-data transfers between the computer unit CU and a standard cathode-ray-tube-terminal unit CRT. The upper portion of FIG. 38 indicates the timing relationship for an input-data transfer and specifically indicates the relationship between a data transfer and the Data Ready status signal. The lower portion of the figure indicates the timing relationship for an output-data transfer and, more specifically, the relationship between the Transmitter Register Empty status signal and serial output-data transfer to the device.

As indicated at the top portion of FIG. 38, in an input-data transfer between a cathode-ray-tube-terminal unit CRT and the serial-peripheral-unit controller SPUC1, immediately after the last serial stop bit in a data term is received by the receiver portion of the universal asynchronous receiver/transmitter UART, the Data Ready status signal becomes a logical one, indicating that an entire data term has been received by the serial-peripheral-unit controller and is available to be transferred to the computer unit CU. The Data Ready status signal is reset after approximately 30 microseconds, which is the approximate time for the transfer of data into the computer unit.

The lower portion of FIG. 38 indicates the relative timing of the Transmitter Empty status signal which is reset prior to the transfer of output-data to a cathode-ray-tube-terminal unit CRT. As indicated, the Transmitter Empty status signal because a logical one after the last stop bit of the data is transferred to the device, and indicates that the serial-peripheral-unit controller SPUC1 and, more specifically, the transmitter portion of the universal asynchronous receiver/transmitter UART, has serially transmitted an entire character to the cathode-ray-tube-terminal unit CRT.

Figure 39:
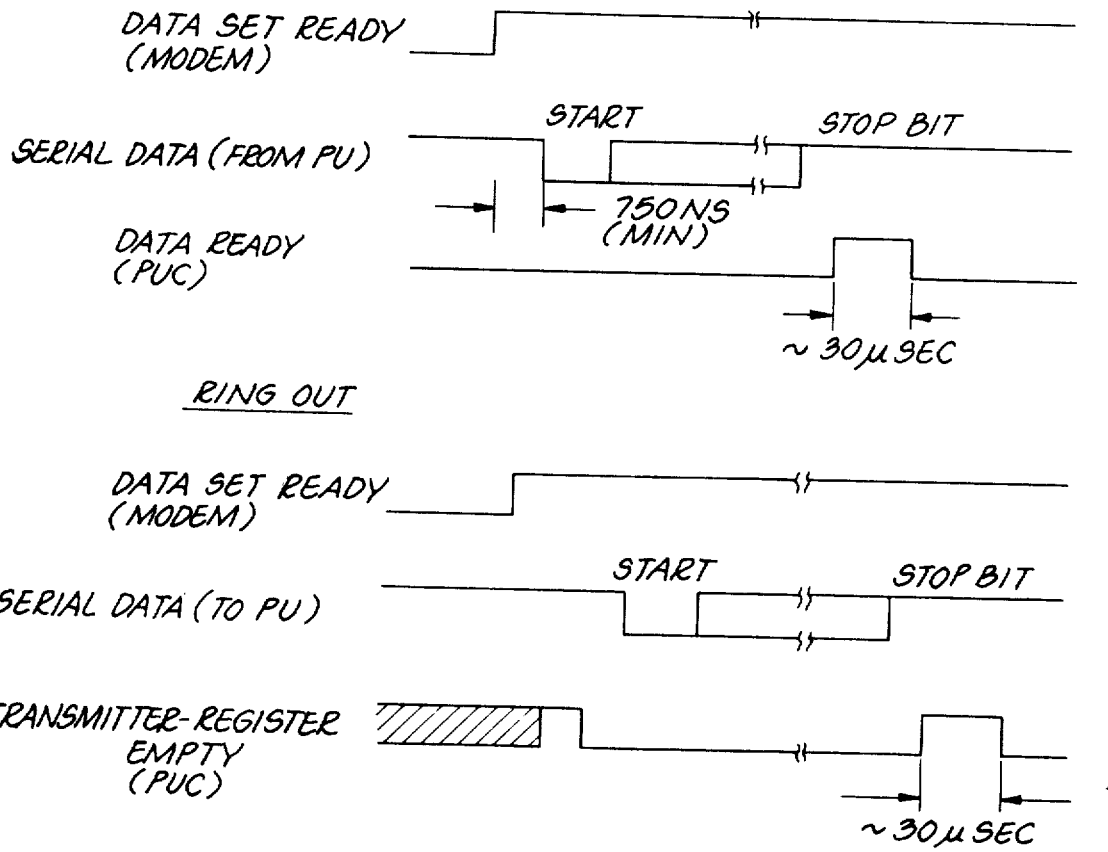
FIG. 39 is a timing diagram of signals involved in input-data and output-data transfers between the distributed input/output system and a modem.

FIG. 39 is a timing diagram indicating the timing relationships of signals involved in both input-data and output-data transfers between the computer unit CU and a modem. The upper portion of the figure indicates the timing relationships for an input-data transfer and specifically, the relationship between the Data Set Ready status signal, the data transfer, and the Data Ready status signal.

As indicated in the upper portion of FIG. 39, for input-data transfer, the Data Set Ready signal is in a TRUE state at least 750 nanoseconds before serial data is transferred from the modem into the universal asynchronous receiver/transmitter UART. Sometime after the last stop bit of a particular data term is received by the universal asynchronous receiver/transmitter, the Data-Ready status signal becomes a logical one, indicating that the serial-data character transfer has taken place. The Data-Ready status signal remains a logical one for approximately 30 microseconds during which time the automatic input instruction is executed and data is transferred into the computer unit CU.

As indicated in the lower portion of FIG. 39, in output-data transfers, the Data Set Ready signal is also a logical one before data transfers to the modem take place. In addition, as indicated in the figure, the Transmitter Empty status signal will be positive, indicating that any previous data to be transferred out to the peripheral device has been completely transferred and that the universal asynchronous receiver/transmitter UART is ready to transfer an additional term of data. The Transmitter Empty signal becomes a logical zero when data, transferred from the computer unit CU to the serial-peripheral-unit controller SPUC1 in response to a data-service-interrupt signal, is in the transmitter portion of the universal asynchronous receiver/transmitter UART and is ready to be transferred, in serial format, out to the modem. As also indicated in FIG. 39, after the last stop bit of the serial output data character is transferred to the peripheral unit, the Transmitter Empty status signal again becomes a logical one, indicating that the transmitter portion of the universal asynchronous receiver/transmitter UART, is again ready to transfer another data term to the modem.

OPERATION OF MULTIPLE DISTRIBUTED INPUT/OUTPUT SYSTEMS

Figure 40:
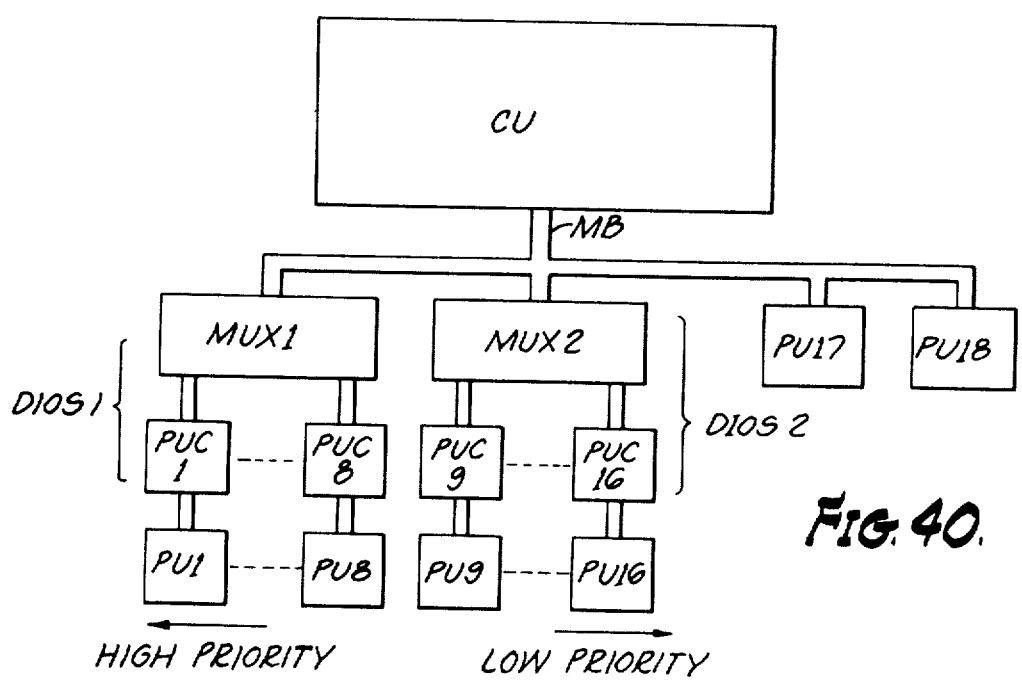
FIG. 40 is a general system block diagram indicating a computer unit to which is connected a plurality of distributed input/output systems and peripheral units.

FIG. 40 is a simplified block diagram showing a computer unit CU connected to eighteen peripheral units, sixteen of which are connected to the computer unit by means of two distributed input/output systems. Peripheral units PU1 through PU8 are connected to the computer unit CU by means of distributed input/output system DIOS1 which includes multiplexer MUX1 and peripheral unit controllers PUC1 through PUC8.

Peripheral units PU9 through PU16 are connected to the computer unit by means of distributed input/output system DIOS2 which includes multiplexer MUX2 and peripheral unit controllers PUIC9 through PUIC16. The two multiplexers MUX1 and MUX2 are connected to the computer unit by means of main buses MB. As indicated in FIG. 40, two additional peripheral units, PU17 and PU18, are connected directly to the computer unit and do not employ a distributed input/output system. It is assumed, for discussion purposes, that by virtue of the order of connection to the computer unit, peripheral unit PU18 has lower interrupt signal priority than peripheral unit PU17 and peripheral unit PU17, in turn, has lower interrupt signal priority than multiplexer MUX2 which, in turn, has lower interrupt signal priority than multiplexer MUX1. Furthermore, it will be assumed that by virtue of their respective order of connection to their multiplexers, peripheral units with lower numbers have greater interrupt signal priority than peripheral units with higher numbers. Therefore, of the peripheral units connected to multiplexer MUX2, peripheral unit PU16 has the lowest priority, and peripheral unit PU9 has the highest priority, and of the peripheral units connected to multiplexer MUX1, peripheral unit PU8 has the lowest priority and PU1 the highest priority.

The PRIN signal for multiplexer MUX1 is transferred from the computer unit CU directly to multiplexer MUX1 over the control bus CB. A PROT signal is developed in multiplexer MUX1 and transferred to multiplexer MUX2 where it becomes the PRIN signal for that multiplexer. Multiplexer MUX2 generates a PROT signal which then becomes the PRIN signal for peripheral unit PU17, and so on for peripheral units PU17 and PU18.

It will be recalled, from the prior discussion of FIGS. 10A and 10B regarding interrupt circuitry in a multiplexer MUX, that within a distributed input/output system DIOS, all data-service interrupt signals have higher priority than all end-of-block interrupt signals. Thus, even though peripheral-unit controller PUC1 has higher interrupt signal priority than peripheral unit controller PUC8 in distributed input/output system DIOS1, a data-service interrupt signal generated by peripheral unit controller PUC8, at the same time an end-of-block interrupt signal is generated by peripheral unit controller PUC1, will be processed first because data-service interrupt signals have higher priority than end-of-block interrupt signals within each distributed input/output system.

It will be recalled that each time a data-service interrupt signal or an end-of-block interrupt signal is generated by a microengine unit of a peripheral unit controller PUC connected to a peripheral device, the interrupt signal is not vectored to the main memory unit MMU until it attained top priority. It will be understood that top priority is attained when there are no higher priority interrupt signals pending in the same multiplexer unit or in multiplexer units of higher priority, or in peripheral units of higher priority, that are not connected to the computer unit by means of a distributed input/output system DIOS, but are instead connected directly to the computer unit by conventional techniques.

The question of priority arises only when more than one interrupt signal is generated. If only one peripheral unit is in the process of transferring data to the computer unit CU, or is in the process of receiving data from the computer unit CU, the priority question does not arise since there is no competition for the attention of the computer unit.

It will be understood that before input/output operations utilizing a distributed input/output system, can commence, various portions of the main memory unit MMU will be programmed by employing a peripheral unit capable of introducing data into the computer and into the main memory unit. In addition, the controller memory unit CMU, in each peripheral unit controller PUC, will be programmed by means of firmware microcodes, such as those described previously in conjunction with FIGS. 8 and 9.

Typically, software programming is accomplished by means of an input data device, such as a standard care reader or a standard paper-tape reader of the types previously described. Typically, the microcoded firmwave is introduced into the microengine unit by installing at least one read-only-memory device, programmed either by the manufacturer of the integrated circuit chip constituting the memory device, or by a user.

Once the distributed input/output systems are made operational by software programming the computer unit and firmware programming each peripheral unit controller, a user's main line program may be entered into the computer unit CU by any one of the peripheral units connected to a distributed input/output system and that is capable of transferring data into the computer unit. Such devices include a standard card reader, a standard paper-tape reader, a teletypewriter unit, or a cathode-ray-tube-terminal unit CRT. Alternatively, a peripheral unit connected directly to the computer unit and that may have been used to program the main memory unit for operation of the distributed output system, may also be used to enter a user's main line program into the computer unit.

Typically, input/output operations with more than one peripheral unit occur either because the user's main line program calls for input/output operations with a plurality of peripheral units, or because the computer unit CU is being used by more than one user at a time, or because, while the computer unit CU is being used to carry out on user's main line program, a second user's main line program is being transferred into the computer unit for later use. In any case, operation of a distributed input/output system, with a plurality of peripheral units, is the same as previously described in conjunction with FIGS. 17-39. The only difference in operation is that lower priority interrupt signals are not processed until the computer unit processes higher priority interrupt signals generated by higher priority peripheral-unit controllers or higher priority peripheral units. When a peripheral-unit controller generates an interrupt signal that is not processed immediately by the computer unit CU because the computer unit is then processing an interrupt signal of another peripheral unit controller, or peripheral unit, the count generated by the ROM program counter RPC within the peripheral-unit controller waiting for the computer unit CU, remains constant. The count, and therefore the output word of the controller memory unit CMU, continues to remain constant until the interrupt signal generated by the writing peripheral-unit controller is accepted and processed by the computer unit, and a resetting command signal CMD is generated by the multiplexer MUX to which the waiting peripheral-unit controller is connected.

SUMMARY

The distributed input/output system DIOS of this invention constitutes an input/output device management system adapted for use with general purpose digital computers and with input/output devices.

The distributed input/output system comprises a plurality of peripheral-unit controllers, each being adapted to be connected to a peripheral unit and each being programmed to respond to signals generated by a programmed digital computer to perform a sequence of data-transfer operations in conjunction with the particular peripheral unit to which it is connected. The plurality of peripheral-unit controllers are all connected to a common multiplexer which is, in turn, connected to the main buses of the computer. Each of the peripheral-unit controllers is connected to the multiplexer by an elongated cable, permitting location of the peripheral-unit controller at or near the peripheral unit being controlled, and each peripheral-unit controller comprises a substantially identical microengine unit that includes a controller memory unit which is programmed to execute and control data-transfer operations of at least one peripheral device.

GENERAL REMARKS

While the invention has been described with particular reference to the use of general purpose programmable computers and permanently programmed read-only memory units, it will be understood that many features of the system which are presently programmed in software program form may be embodied in hardwired form. Likewise, those parts of the system which have been described as utilizing hardwired programs may be embodied in software program form.

For purposes of simplifying the explanation, language has been utilized which may sound like it is concerned with mental processes but which, in fact, is concerned with physical processes. For example, the terms "information" and "data", and particularly where reference is made to storage and transfer thereof, refer specifically to information signals and data signals or other manifestations of information and data which are capable of physical manipulation. In the embodiment of the invention described, the signals in question are stored in the computer unit in binary form in magnetized cells, such cells usually being magnetized in one direction to represent a value 0, and in the opposite direction to represent a value 1 in the binary system. The term "transfer of data" and similar expressions, refer to the manipulation of those signals or manifestations.

It is to be understood that while the invention has been described with particular reference to signals in binary form, signals in other logic forms, such as trinary form, may be considered within the scope of this invention. Furthermore, it is to be understood that while binary signals described herein in conjunction with this invention are considered to be in a positive, or TRUE, state when in a constant voltage level such as +5 volts DC, and are considered to be in a negative, or FALSE, state when in a constant voltage level, such as 0 volts DC, the scope of this invention also includes binary signals, the states of which depend upon their direction of change from one voltage level to another.

Many details of a type which would be obviously supplied by one skilled in the art, have been omitted. For example, many of the precautions that would obviously be taken in order to assure accuracy and reliability of the data transfer processes, such as initializing values of bits in various cells in the main memory unit MMU, have not been mentioned. Likewise, arrangements for causing operations to occur at predetermined times, in predetermined sequences, or at specified intervals, have not all been described. All of these and other details are of such a nature that they can be supplied by anyone skilled in the art of designing and programming computers.

Although the embodiment of the invention disclosed includes controllers that are located at or near peripheral units to which they are respectively connected, it will now be apparent to those of ordinary skill in the computer arts that some of the advantages of the invention would still be attained from use of a controller of the type disclosed, though a large distance separates a controller and a peripheral unit to which it is connected. By way of example, a serial-peripheral-unit controller, which utilizes current or voltage mode transmission, may be as much as 500 feet from the peripheral unit to which it is connected, without added termination circuits. Such transmission modes are far less sensitive to noise or other interference than the open-collector transistor-transistor-logic (TTL) transmission mode used with parallel devices.

Other types of transmission would permit even greater distances between a controller and a peripheral unit. For example, by employing optical couplers, the separation between a controller and a peripheral unit may be 5,000 feet or more before data transfer operation is affected.

The invention described herein may be employed in many different ways than those specifically set forth and many variations may be made therein within the scope of the appended claims.

We claim:

1. In a distributed input/output system adapted for use with a digital computer and a plurality of peripheral units having different characteristics, said peripheral units including means for generating status signals which system comprises:
   a multiplexer unit adapted to be connected to said computer,
   a plurality of perhipheral-unit controllers, each such peripheral unit controller being located proximate to an associated peripheral unit, each such controller having a programmed firmware device therein for generating a plurality of series of microcode control words,
   means in said controller for selecting a particular series of control words in accordance with computer generated control signals and said peripheral-unit generated signals that represent the electrical status of a particular peripheral unit to which it is operatively dedicated, and
   a plurality of input/output buses, each such bus interconnecting a said particular peripheral-unit with said multiplexer unti through the controller that is dedicated to it with the part of said each bus connected to said particular peripheral unit being shorter than the remainder of said each bus.

2. A distributed input/output system as defined in claim 1, wherein at least one of said peripheral-unit controllers comprises means for the transfer of serial data, and at least one of said peripheral-unit controllers comprises means for the transfer of parallel data.

3. A distributed input/output system as defined in claim 1, wherein said firmware devices in respective controller units, are substantially identical except for differences residing only in their respective programs.

4. A distributed input/output system as defined in claim 1, wherein said firmware device comprises at least one read-only-memory unit having an array of said control words stored therein and wherein said controller is adapted to be responsive to a plurality of signals generated by said computer to generate and transfer a series of control words to a peripheral unit, some of said control words being different, each such control word of said series being selected from said array of control words in accordance with an address manifested by said plurality of computer generated signals.

5. In a distributed input/output system as defined in claim 1 wherein each such bus is electrically identical to all other buses in said system.

6. In a distributed input/output system as defined in claim 1 in which each said bus comprises a first cable connecting the corresponding controller to said multiplexer unit and a second cable connects each said controller to the peripheral unit to which it is dedicated and in which said second cable is very short compared with said first cable and in which all said first cables are substantially identical electrically.

7. A distributed input/output system adapted for use with a digital computer and a plurality of peripheral units, said peripheral units including means for generating status signals which system comprises:
- a multiplexer unit adapted to be connected to said computer,
- a plurality of peripheral-unit controllers, each such controller having a programmed firmware device therein, and each such controller being designed for connection to a peripheral unit to which it is dedicated, said firmware device of said each controller being responsive to control signals from said computer and status signals from the peripheral unit to which it is dedicated to manage transfer of data between said multiplexer unit and the peripheral unit to which said each controller is dedicated,
- a plurality of first relatively long buses, each such first bus being electrically identical to all other first buses in said plurality, and each such first bus interconnecting a peripheral-unit controller with said multiplexer unit, and
- a plurality of second relatively short busses proximately interconnecting each such peripheral unit controller with the peripheral unit to which it is dedicated.

8. A distributed input/output system adapted for use with a digital computer and a plurality of peripheral units, said peripheral units including means for generating status signals which system comprises:
- a multiplexer unit adapted to be connected to said computer,
- a plurality of peripheral-unit controllers, each such controller having a programmed firmware device and associated logic components therein, and each such controller being designed for connection to a peripheral unit to which it is dedicated, each such peripheral unit controller being located proximate to an associated peripheral unit, said firmware device and said associated logic components of said each controller being responsive to control signals from said computer and status signal from the peripheral unit to which it is dedicated to manage transfer of data between said multiplexer unit and the peripheral unit to which said each controller is dedicated,
- a plurality of input/output buses, each such bus being electrically identical to all other buses in said plurality, and each bus being designed to interconnect a peripheral-unit controller to which it is dedicated with said multiplexer unit, and
- each said controller comprising a printed-circuit board bearing a corresponding firmware device and associated logic components, and a separate box-like structure for housing said controller separate from said digital computer, said multiplexer unit, and said peripheral units.

9. An input/output control system adapted for interconnecting a digital computer and a plurality of peripheral devices, said peripheral devices including means for generating status signals, said control system being adapted for selectively transferring data signals, control signals, and status signals between the computer and the peripheral devices, the control system comprising:
- a multiplexer unit having
    - first means for receiving and amplifying data signals and control signals transferred from said computer to said multiplexer unit,
    - second means for selectively transmitting amplified data signals and control signals from said first means to any one of said peripheral devices,
    - third means for selectively receiving and amplifying data signals and status signals transferred from said peripheral devices to said multiplexer unit,
    - fourth means for transmitting amplified data signals and status signals from said third means to said computer; and
- a plurality of controller units for control of said peripheral devices respectively, each such controller unit being electrically interposed between one of said peripheral devices and said multiplexer, each such controller unit being located proximate to an associated peripheral device.
- each such controller unit containing a microengine unit that comprises a programmable memory device having a firmware program stored therein and that is responsive to said status signals generated by a peripheral device to control signal transfer between such a peripheral device and said digital computer in accordance with said status signals, said program being correlated to the operations of the respective periperal device to which the controller unit is connected.

10. An input/output control system as defined in claim 9, all of said microengine units being substantially identical, and some of the programs stored in respective memory devices being different from each other.

11. An input/output control system as defined in claim 9, each said controller unit being connected to said multiplexer by a first cable, and each said controller unit being connected to a peripheral device by a second cable, said first cable being substantially longer than said second cable, all of said first cables being substantially identical electrically.

12. An input/output control system as defined in claim 9, said computer having a software-programmable memory unit and said microeingine unit being adapted to execute said stored firmware program in accordance with a software program stored in said software-programmable memory unit.

13. An input/output control system as defined in claim 11, said computer having a direct current power source adapted to transfer direct current power to said multiplexer and said multiplexer and said first cable being adapted for the tranfer of direct current power from said multiplexer to said controller units.

14. An input/output control system as defined in claim 11, wherein said second means comprises a plurality of tri-state drivers and wherein each such tri-state driver is adapted to transmit data signals simultaneously to all said controller units.

15. An input/output control system as defined in claim 11, said multiplexer unit further comprising:
fifth means for generating a plurality of baud clock signals, each at a different baud frequency, and
sixth means for selecting and transferring a different one of said baud clock signals to each said respective controller unit.

16. An input/output control system as defined in claim 11, said multiplexer unit further comprising:
fifth means for generating a plurality of baud clock signals, each at a different baud frequency, and
sixth means for selecting and transferring one of said baud clock signals to one of said controller units and for selecting and transferring another of said baud signals to another of said controller units.

17. An input/output control system as defined in claim 9, wherein each said controller unit is in substantial proximity to a peripheral device to which the controller is connected.

18. A peripheral device management system in combination with a digital computer and a plurality of peripheral devices, the computer having means for selecting any one of the peripheral devices for signal transfer, the computer and the peripheral devices each being adapted for receiving and transmitting data signals and control signals and each of the peripheral devices including means for generating at least one status signal representative of a device-operating parameter, said management system comprising:
a multiplexer unit having
means for transmitting data signals and control signals being transferred from said computer to any of said devices and for transmitting data signals and status signals being transferred from any of said devices to said computer,
means responsive to said selecting means for transmitting said data signals and said control signals from said computer to a selected one of said peripheral devices and for transmitting said data signals and said status signals from a selected one of said devices to said computer;
a plurality of controller units, each such controller unit being interposed electrically between said multiplexer and a peripheral device, and each such controller unit having means for transmitting data signals from said multiplexer to said device and for transmitting data signals from said device to said multiplexer; and
a plurality of substantially identical interface cables, each such cable interconnecting said multiplexer and one such controller unit;
each said controller unit being substantially in proximity with the peripheral device to which it is connected and each said controller comprising:
means for storing a plurality of device-control words;
means responsive to said control signals transferred from said computer for generating a selected sequence of said device-control words;
means for transmitting portions of said device-control words to said peripheral device for control of data transfer from said device to said controller unit and from said controller unit to said device; and
means responsive to a peripheral device status signal for altering said selected sequence in accordance with said status signal.

19. The combination of an input/output control system interconnecting a digital computer and a plurality of peripheral units, the control system having a multiplexer connected to the computer and a peripheral-unit controller connected to each of the peripheral units, the combination comprising:
means within said computer for executing an input/output instruction stored in said computer to generate a plurality of computer signals and to transfer said computer signals to said multiplexer;
means within said multiplexer, responsive to said computer signals, to enable the transfer of sets of data signals from said computer to a selected peripheral unit or from a selected peripheral unit to said computer;
means for testing a status of said selected peripheral unit to ascertain whether said peripheral unit is ready for a transfer of data signals and whether said unit has an error status;
means for generating a terminating interrupt signal when said status testing means ascertains that said peripheral unit has an error status;
means responsive to said terminating interrupt signal when said status testing means ascertains that said peripheral unit has an error status for delaying data transfer until said peripheral unit becomes ready for data transfer;
means for generating a data-service interrupt signal when said status testing means ascertains that said peripheral unit is ready for the transfer of data signals and that said peripheral unit does not have an error status;
means responsive to said data-service interrupt signal for executing an input/output instruction stored in said computer, whereby execution of said instruction causes a transfer of data signals between said selected peripheral unit and said digital computer;
means for transferring a set of data signals and for detecting whether said set is the last to be then transferred and for transferring additional sets of data signals when said last mentioned set of data signals is not the last to be then transferred; and
means for terminating data transfer operations when a set of data signals is the last to be then transferred.

20. A data transfer apparatus adapted for being electrically interposed between a computer unit and a peripheral unit for transferring data signals from one of said units to another of said units, the peripheral unit having means for generating a status signal which indicates whether the peripheral unit is ready for the transfer of data signals, the data transfer apparatus comprising:
data signal transmitters;
data signal receivers;
first means for generating a command signal for initiating data transfer operations;
means responsive to an initiating command signal and also responsive to said status signal for setting an interrupt signal for transfer to said computer unit whereby said computer unit receives a status signal indicating that said peripheral unit is ready for the transfer of data signals;
means for generating enabling signals for enabling transmitters of data signals;
means for generating enabling signals for enabling receivers of data signals;
means for coupling sets of data signals transmitted by enabled transmitters in one of said units to enabled receivers in another of said units;
second means for generating a command signal for resetting said interrupt signal setting means after each transfer but the last in a set of said data signals; and third means responsive to the last of said data signals, for generating a command signal for resetting said interrupt signal setting means after transfer of the last in a set of data signals and for terminating data transfer operations; and command signals generated by said third generating means occurring subsequent to and being different in duration from, command signals generated by said first and second generating means, respectively.

21. A data transfer apparatus as defined in claim 20, further comprising:

means for separately receiving and storing status signals, each such status signal being representative of the status of a condition of said peripheral unit; and means for generating a status transfer enabling signal for enabling the transfer of said status signals to said computer unit.

22. A data transfer apparatus as defined in claim 20, further comprising:

means responsive to command signals generated by said third means for generating an interrupt signal for signaling said computer unit that said data transfer operations are terminating; and means for resetting said last-mentioned interrupt signal generating means for rendering said peripheral unit responsive to a subsequent initiating command signal.

23. A data transfer apparatus as defined in claim 20, and further comprising:

means for generating synchronous control signals, and means for generating asynchronous control signals, said synchronous control signals and said asynchronous control signals being generated for control of a sequence of operations whereby data signals may be transferred from one of said units to another of said units.

24. A data transfer apparatus as defined in claim 23, and further comprising:

a controller device adapted to control data transfer from one of said units to another of said units, and a cable adapted to transfer said command signals, said data signals, said interrupt signals, said status signals, said synchronous control signals, and said asynchronous control signals, some of said signals being transferred to said controller device and some other of said signals being transferred from said controller device.

25. A data transfer apparatus as defined in claim 24, further comprising:

means for receiving power from said computer unit, and means in said cable for transferring said received power to said controller device.

* * * * *